(12) United States Patent
Kawanobe et al.

(10) Patent No.: US 6,751,215 B1
(45) Date of Patent: Jun. 15, 2004

(54) AUDIO BAND SIGNAL TRANSMISSION SYSTEM AND METHOD

(75) Inventors: Takeshi Kawanobe, Kanagawa (JP);
Toshiya Suganuma, Kanagawa (JP);
Masao Aoki, Kanagawa (JP); Hidetoshi Fuse, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 952 days.

(21) Appl. No.: 09/593,325

(22) Filed: Jun. 13, 2000

(30) Foreign Application Priority Data

Sep. 1, 1999 (JP) ............................................ 11-247975

(51) Int. Cl.⁷ .............................................. H04L 12/66
(52) U.S. Cl. ........................ 370/352; 370/412; 370/477; 710/68
(58) Field of Search ................................ 370/352–356, 370/400, 401, 386, 375, 389, 477, 428, 429, 412–418

(56) References Cited

U.S. PATENT DOCUMENTS 6,600,741 B1 * 7/2003 Chrin et al. ................. 370/375
6,628,652 B1 * 9/2003 Chrin et al. ................. 370/386

FOREIGN PATENT DOCUMENTS

| JP | 9-55753 | 2/1997 |
|---|---|---|
| JP | 9-261239 | 3/1997 |
| JP | 10-23573 | 1/1998 |

* cited by examiner

Primary Examiner—John Pezzlo
(74) Attorney, Agent, or Firm—Pearne & Gordon LLP

(57) ABSTRACT

An identification number inserting portion 26 in a multiplexing portion 33 in an audio transmission system 10 inserts a connection identification number for own connection into an audio band signal cell which is to be transmitted via an up line 60. An identification number detecting portion 30B detects that the connection identification number is transmitted again from a switching system 1 to the audio transmission system 10 via a down line 70. When an identification number detecting portion 30 confirms based on this detection that a communication path is extended in sequence over 37 the audio transmission system 10, the switching system 1, and the audio transmission system 10", it controls a slot/channel number converting portion 22 and a change-over switch to correct a routine such that a cell which is to be transmitted the up line 60 in the multiplexing portion 33 can be transmitted to a cell multiplexing portion 34 via a change-over switch 23 on the up line 60, a slot/channel number converting portion 22, and a change-over switch on the down line 70.

40 Claims, 21 Drawing Sheets

AUDIO BAND SIGNAL TRANSMISSION SYSTEM AND METHOD

BACKGROUND OF THE INVENTION

The present invention relates to an audio band signal transmission system having an audio transmission system which is arranged between a switching system and a cell switching system to transmit an audio band signal via an up line from the cell switching system to the switching system and a down line from the switching system to the cell switching system every connection, and an audio band signal transmission method.

In the prior art, in transmitting the audio signal, such a system is employed that high-efficiency audio compressed coding/decoding processes are performed so as to achieve effective use of the capacity of lines and also one channel is allocated to an audio compressed signal on one line by using time-division multiplex.

However, according to such time-division multiplex, idleness of the lines is generated since channels are still occupied in their idle state. Therefore, in order to achieve the effective use of the lines by such idleness of the lines, the audio signal is divided into compressed-coded audio frames and then transmitted as cells.

According to such system configuration, the method is utilized which enables other lines to utilize the idle transmission lines by transmitting no cell over the idle transmission lines to thus improve statistically a transmission efficiency.

Meanwhile, since compressed-coding cannot be applied to an audio band data signal employed in FAX, MODEM, etc. unlike the audio signal, the audio band data signal is formulated into the cells without compression and then transmitted as it is. Each cell consists of a header area which indicates supplementary information such as an address, data type, etc. and a data area which contains the compressed-coded audio signal or the audio signal per se.

In such above prior art, if the audio band signal transmission system is composed of a large scale network, as disclosed in Patent Application Publication (KOKAI) Hei 9-261239 as shown in FIG. 22, the audio band signal is transmitted to a telephone 103 as a calling destination to pass through relay principal points of a switching system 102 via an audio transmission system 100 and a transmission line 101. At this time, line switching of the audio is carried out at the relay principal points by the switching system 102.

Therefore, the audio transmission system 100 must absorb cell delay variationcell delay variation by delayed-reading the audio band signal, which is subjected to audio compressed coding by an audio compressed coding portion 2B, by using a cell delay variationcell delay variation absorbing buffer 3B, then decode the audio cells into the original state by audio compressed-decoding the audio band signal, which is subjected to cell delay variation absorption by using an audio compressed decoding portion 1B, and then transfer the decoded audio to the switching system 102.

Therefore, according to such audio band signal transmission system in the prior art, the message can be transferred between these telephones 103 in the communication network for the relay transmission, nevertheless various processes such as the audio compressed coding process, the audio compressed decoding process, the cell delay variation absorbing process, etc. are carried out repeatedly by the audio compressed coding portion 2B, the audio compressed decoding portion 1B, the cell delay variation absorbing buffer 3B, etc. respectively every audio transmission system 100 even if such processes are not needed. As a result, there is such a problem that, because of such useless processes, not only degradation of the audio quality but also the delay time in process is increased.

SUMMARY OF THE INVENTION

The present invention has been made in view of the above problems, and it is an object of the present invention to provide an audio band signal transmission system and an audio band signal transmission method, which are capable of suppressing a process delay time to the lowest minimum without degradation of audio quality of an audio band signal.

In order to achieve the above object, according to the present invention, there is provided an audio band signal transmission system having an audio transmission system which is arranged between a switching system and a cell switching system, and transmits an audio band signal via an up line from the cell switching system to the switching system and a down line from the switching system to the cell switching system every connection, and has a cell delay variation absorbing buffer for delayed-reading the audio band signal which is transmitted via the up line, comprising a connection identification number inserting portion provided for every connection, for setting a connection identification number which is to be identified every connection, and inserting own connection identification number into an audio band signal cell which is to be transmitted to the switching system via the up line for own connection; a connection identification number detecting portion provided for every connection, for detecting the connection identification number contained in the audio band signal cell which is to be transmitted from the switching system via the down line for own connection; and a routine correcting portion provided for every connection, for correcting a routine before the audio band signal cell, which is transmitted to the switching system via the up line for own connection in response to a predetermined control signal, is input into the connection identification number inserting portion corresponding to this connection, to thus transmit the audio band signal cell via the down line corresponding to own connection without intervention of the switching system and the cell delay variation absorbing buffer; wherein, when one connection identification number detecting portion of connection identification number detecting portions provided for every connection detects the connection identification number via the down line for own connection, it informs the connection identification number detecting portion which corresponds to the connection identification number to output the predetermined control signal.

Therefore, according to the audio band signal transmission system of the present invention, when it is decided in response to notification issued from other connection identification number detecting portion that the audio band signal cell which is to be transmitted to own connection is transmitted via the communication path which is extended over "the audio transmission system, the switching system, and the audio transmission system" in sequence, the routine of the cell is corrected before the audio band signal cell which is to be transmitted to the switching system via the up line for own connection is input into the connection identification number inserting portion which corresponds to this connection. Hence, the audio band signal cell can be transmitted via the down line corresponding to this own connection, without intervention of the switching system and the cell delay variation absorbing buffer. As a result, a process delay time can be suppressed to the lowest minimum without degradation of the audio quality of the audio band signal by omitting useless processes such as cell disassembling/assembling processes, etc. generated when the cell is transmitted to the switching system, cell delay variation absorbing process by the cell delay variation absorbing buffer, etc.

Also, according to the present invention, there is provided an audio band signal transmission method of transmitting an audio band signal via an up line from a cell switching system to a switching system and a down line from the switching system to the cell switching system every connection by using an audio transmission system arranged between the switching system and the cell switching system, and then delayed-reading the audio band signal, which is transmitted via the up line, by using a cell delay variation absorbing buffer in the audio transmission system, comprising the steps of setting a connection identification number which is to be identified every connection, and inserting own connection identification number into an audio band signal cell, which is to be transmitted to the switching system via the up line for own connection, by using a connection identification number inserting portion provided for every connection; detecting the connection identification number contained in the audio band signal cell, which is to be transmitted from the switching system via the down line for own connection, by using a connection identification number detecting portion provided for every connection; correcting a routine before the audio band signal cell, which is transmitted to the switching system via the up line for own connection in response to a predetermined control signal, is input into the connection identification number inserting portion corresponding to this connection by using a routine correcting portion provided for every connection, to thus transmit the audio band signal cell via the down line corresponding to own connection without intervention of the switching system and the cell delay variation absorbing buffer; and informing the connection identification number detecting portion, which corresponds to the connection identification number, to output the predetermined control signal by one connection identification number detecting portion of connection identification number detecting portions provided for every connection when such connection identification number detecting portion detects the connection identification number via the down line for own connection.

Therefore, according to the audio band signal transmission method of the present invention, when it is decided in response to notification issued from other connection identification number detecting portion that the audio band signal cell which is to be transmitted to own connection is transmitted via the communication path which is extended over "the audio transmission system, the switching system, and the audio transmission system" in sequence, the routine of the cell is corrected before the audio band signal cell which is to be transmitted to the switching system via the up line for own connection is input into the connection identification number inserting portion which corresponds to this connection. Hence, the audio band signal cell can be transmitted via the down line corresponding to this own connection, without intervention of the switching system and the cell delay variation absorbing buffer. As a result, a process delay time can be suppressed to the lowest minimum without degradation of the audio quality of the audio band signal by omitting useless processes such as cell disassembling/assembling processes, etc. generated when the cell is transmitted to the switching system, cell delay variation absorbing process by the cell delay variation absorbing buffer, etc.

There is provided, as set forth in the first aspect of the present invention, an audio band signal transmission system having an audio transmission system which is arranged between a switching system and a cell switching system, and transmits an audio band signal via an up line from the cell switching system to the switching system and a down line from the switching system to the cell switching system every connection, and has a cell delay variation absorbing buffer for delayed-reading the audio band signal which is transmitted via the up line, comprising: a connection identification number inserting portion provided for every connection, for setting a connection identification number which is to be identified every connection, and inserting own connection identification number into an audio band signal cell which is to be transmitted to the switching system via the up line for own connection; a connection identification number detecting portion provided for every connection, for detecting the connection identification number contained in the audio band signal cell which is to be transmitted from the switching system via the down line for own connection; and a routine correcting portion provided for every connection, for correcting a routine before the audio band signal cell, which is transmitted to the switching system via the up line for own connection in response to a predetermined control signal, is input into the connection identification number inserting portion corresponding to this connection, to thus transmit the audio band signal cell via the down line corresponding to own connection without intervention of the switching system and the cell delay variation absorbing buffer; wherein, when one connection identification number detecting portion out of connection identification number detecting portions provided for every connection detects the connection identification number via the down line for own connection, it informs the connection identification number detecting portion which corresponds to the connection identification number to output the predetermined control signal.

Therefore, according to the audio band signal transmission system set forth in the first aspect of the present invention, when it is decided in response to notification issued from other connection identification number detecting portion that the audio band signal cell which is to be transmitted to own connection is transmitted via the communication path which is extended over "the audio transmission system, the switching system, and the audio transmission system" in sequence, the routine of the cell is corrected before the audio band signal cell which is to be transmitted to the switching system and the cell delay variation absorbing buffer via the up line for own connection is input into the connection identification number inserting portion which corresponds to this connection. Hence, the audio band signal cell can be transmitted via the down line corresponding to this own connection, without intervention of the switching system and the cell delay variation absorbing buffer. As a result, a process delay time can be suppressed to the lowest minimum without degradation of the audio quality of the audio band signal by omitting useless processes such as cell disassembling/assembling processes, etc. generated when the cell is transmitted to the switching system, cell delay variation absorbing process by the cell delay variation absorbing buffer, etc. In this case, the similar advantage can also be achieved by the audio band signal transmission method set forth in the twenty-first aspect of the present invention.

In an audio band signal transmission system set forth in the second aspect of the present invention, in addition to a configuration according to the first aspect of the invention, the audio transmission system includes a switching system interface portion for transmitting the audio band signal between the switching system and the audio transmission system, a transmission line interface portion for transmitting the audio band signal between the cell switching system and the audio transmission system, and a multiplexing portion arranged between the switching system interface portion and the transmission line interface portion, for transmitting the audio band signal between the switching system and the cell switching system, wherein the switching system interface portion has the cell delay variation absorbing buffer for delayed-reading the audio band signal which is transmitted via the up line.

Therefore, according to the audio band signal transmission system set forth in the second aspect of the present invention, the audio transmission system consists of three portions of the switching system interface portion, the transmission line interface portion, and the multiplexing portion. In this case, the similar advantage can also be achieved by the audio band signal transmission method set forth in the twenty-second aspect of the present invention.

In an audio band signal transmission system set forth in the third aspect of the present invention, in addition to a configuration according to the second aspect of the invention, the multiplexing portion of the audio transmission system contains a connection identification number inserting portion, a connection identification number detecting portion, and a routine correcting portion every connection, and the connection identification number detecting portion outputs the predetermined control signal to the routine correcting portion which corresponds to own connection when it confirms in response to notification from other connection identification number detecting portion that a communication path for own connection is extended in sequence over "the audio transmission system, the switching system, and the audio transmission system", and the routine correcting portion corrects the routine of the audio band signal from the up line in response to the predetermined control signal to transmit the audio band signal to the down line without intervention of the switching system interface portion and the switching system.

Therefore, according to the audio band signal transmission system set forth in the third aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system interface portion and the switching system. As a result, the process delay time can be suppressed to the lowest minimum without degradation of the audio quality of the audio band signal by omitting useless processes such as the cell disassembling/assembling processes, the cell delay variation absorbing process, etc. generated in the switching system interface portion, the process generated in the switching system, etc. In this case, the similar advantage can also be achieved by the audio band signal transmission method set forth in twenty-third aspect of the present invention.

In an audio band signal transmission system set forth in the fourth aspect of the present invention, in addition to a configuration according to the third aspect of the invention, the switching system interface portion of the audio transmission system includes a compressed coding portion for compressed-coding the audio band signal transmitted from the switching system via the down line, and a compressed decoding portion for compressed-decoding the audio band signal which is delayed-read by the cell delay variation absorbing buffer.

Therefore, according to the audio band signal transmission system set forth in the fourth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system interface portion and the switching system. As a result, the process delay time can be suppressed to the lowest minimum without degradation of the audio quality of the audio band signal by omitting useless processes such as the cell disassembling/assembling processes, the cell delay variation absorbing process, and the audio compressed coding/decoding processes in the switching system interface portion, the process generated in the switching system, etc. In this case, the similar advantage can also be achieved by the audio band signal transmission method set forth in the twenty-fourth aspect of the present invention.

In an audio band signal transmission system set forth in the fifth aspect of the present invention, in addition to a configuration according to the second aspect of the invention, the switching system interface portion of the audio transmission system contains a connection identification number inserting portion, a connection identification number detecting portion, and a routine correcting portion, all are arranged at a preceding stage of the cell delay variation absorbing buffer, every connection, the connection identification number detecting portion outputs a predetermined control signal to the routine correcting portion which corresponds to own connection when it confirms that a communication path for own connection is extended in sequence over "the audio transmission system, the switching system, and the audio transmission system", and the routine correcting portion corrects the routine of the audio band signal from the up line in response to the predetermined control signal to thus transmit the audio band signal to the down line without intervention of the cell delay variation absorbing buffer and the switching system.

Therefore, according to the audio band signal transmission system set forth in the fifth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system and the cell delay variation absorbing buffer. As a result, the process delay time can be suppressed to the lowest minimum without degradation of the audio quality of the audio band signal, and also the switching system interface portion can be disconnected easily from the system at the time of failure or maintenance if this function is attached to the switching system interface portion in place of the multiplexing portion serving as a control system of the audio band signal transmission system. In this case, the similar advantage can also be achieved by the audio band signal transmission method set forth in the twenty-fifth aspect of the present invention.

In an audio band signal transmission system set forth in the sixth aspect of the present invention, in addition to a configuration according to the fifth aspect of the invention, the switching system interface portion of the audio transmission system includes a compressed coding portion for compressed-coding the audio band signal which is transmitted from the switching system via the down line to then transmit a compressed-coded audio band signal to the connection identification number detecting portion, and a compressed decoding portion for compressed-decoding the audio band signal which is delayed-read by the cell delay variation absorbing buffer.

Therefore, according to the audio band signal transmission system set forth in sixth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system and the cell delay variation absorbing buffer. As a result, the process delay time can be suppressed to the lowest minimum without degradation of the audio quality of the audio band signal, and also the switching system interface portion can be disconnected easily from the system at the time of failure or maintenance if this function is attached to the switching system interface portion in place of the multiplexing portion serving as a control system of the audio band signal transmission system. In this case, the similar advantage can also be achieved by the audio band signal transmission method set forth in the twenty-sixth aspect of the present invention.

In an audio band signal transmission system set forth in the seventh aspect of the present invention, in addition to a configuration according to the second aspect of the invention, the transmission line interface portion of the audio transmission system contains a connection identification number inserting portion, a connection identification number detecting portion, and a routine correcting portion every connection, the connection identification number detecting portion outputs the predetermined control signal to the routine correcting portion which corresponds to own connection when it confirms in response to notification from other connection identification number detecting portion that a communication path for own connection is extended in sequence over "the audio transmission system, the switching system, and the audio transmission system", and the routine correcting portion corrects the routine of the audio band signal from the up line in response to the predetermined control signal to thus transmit the audio band signal to the down line without intervention of the multiplexing portion, the switching system interface portion, and the switching system.

Therefore, according to the audio band signal transmission system set forth in the seventh aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the multiplexing portion, the switching system interface portion and the switching system. As a result, the process delay time can be suppressed to the lowest minimum without degradation of the audio quality of the audio band signal by omitting useless processes such as the multiplexing process in the multiplexing portion, the cell disassembling/assembling processes and the cell delay variation absorbing process in the switching system interface portion, the process generated in the switching system, etc. In this case, the similar advantage can also be achieved by the audio band signal transmission method set forth in the twenty-seventh aspect of the present invention.

In an audio band signal transmission system set forth in the eighth aspect of the present invention, in addition to a configuration according to the seventh aspect of the invention, the switching system interface portion of the audio transmission system includes a compressed coding portion for compressed-coding the audio band signal which is transmitted from the switching system via the down line, and a compressed decoding portion for compressed-decoding the audio band signal which is delayed-read by the cell delay variation absorbing buffer.

Therefore, according to the audio band signal transmission system set forth in the eighth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the multiplexing portion, the switching system interface portion and the switching system. As a result, the delay time of the audio band signal can be suppressed to the lowest minimum among the audio transmission systems by omitting useless processes such as the multiplexing process in the multiplexing portion, the cell disassembling/assembling processes, the cell delay variation absorbing process, and the audio compressed coding/decoding processes in the switching system interface portion, the process generated in the switching system, etc., and in addition degradation of the audio quality of the audio band signal can be prevented without fail. In this case, the similar advantage can also be achieved by the audio band signal transmission method set forth in the twenty-eighth aspect of the present invention.

In an audio band signal transmission system set forth in the ninth aspect of the present invention, in addition to a configuration according to the first aspect of the present invention, the cell switching system contains a connection identification number inserting portion, a connection identification number detecting portion, and a routine correcting portion every connection, and the connection identification number detecting portion outputs the predetermined control signal to the routine correcting portion which corresponds to own connection when it confirms in response to notification from other connection identification number detecting portion that a communication path for own connection is extended in sequence over "the cell switching system, the audio transmission system, the switching system, the audio transmission system, and the cell switching system", and the routine correcting portion corrects the routine of the audio band signal from the up line in response to the predetermined control signal to then transmit the audio band signal to the down line without intervention of the audio transmission system and the switching system.

Therefore, according to the audio band signal transmission system set forth in the ninth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal can be transmitted to the down line, without the intervention of the audio transmission system and the switching system. As a result, the delay time of the audio band signal can be suppressed to the lowest minimum among the audio band signal transmission systems by omitting useless processes such as the cell transmitting process, the cell multiplexing process, the cell delay variation absorbing process, and the cell disassembling/assembling processes in the audio transmission system, the process generated in the switching system, etc., and in addition degradation of the audio quality of the audio band signal can be prevented without fail. In this case, the similar advantage can also be achieved by the audio band signal transmission method set forth in the twenty-ninth aspect of the present invention.

In an audio band signal transmission system set forth in the tenth aspect of the present invention, in addition to a configuration according to the ninth aspect of the invention, the audio transmission system includes a compressed coding portion for compressed-coding the audio band signal which is transmitted from the switching system via the down line, and a compressed decoding portion for compressed-decoding the audio band signal which is delayed-read by the cell delay variation absorbing buffer.

Therefore, according to the audio band signal transmission system set forth in the tenth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal can be transmitted to the down line, without the intervention of the audio transmission system and the switching system. As a result, the delay time of the audio band signal can be suppressed to the lowest minimum among the audio band signal transmission systems by omitting useless processes such as the audio compressed coding/decoding processes in the audio transmission system, the process generated in the switching system, etc., and also degradation of the audio quality of the audio band signal can be prevented without fail. In this case, the similar advantage can also be achieved by the audio band signal transmission method set forth in the thirtieth aspect of the present invention.

There is provided, as set forth in the eleventh aspect of the present invention, an audio band signal transmission system having an audio transmission system which is arranged between a switching system and a cell switching system, and transmits an audio band signal via an up line from the cell switching system to the switching system and a down line from the switching system to the cell switching system every connection, and has a cell delay variation absorbing buffer for delayed-reading the audio band signal which is transmitted via the up line, comprising: a connection identification number cell transmitting portion provided for every connection, for setting a connection identification number which is to be identified every connection, and transmitting a control cell containing own connection identification number, which is paired with the audio band signal cell, separately from the audio band signal cell which is to be transmitted to the switching system via the up line for own connection; a connection identification number cell detecting portion provided for every connection, for detecting a control cell which is paired with the audio band signal cell to be transmitted from the switching system via the down line for own connection, and then detecting the connection identification number contained in the control cell; and a routine correcting portion provided for every connection, for correcting a routine before the audio band signal cell, which is transmitted to the switching system via the up line for own connection in response to a predetermined control signal, is input into the connection identification number cell transmitting portion corresponding to this connection, to thus transmit the audio band signal cell via the down line corresponding to this own connection without intervention of the switching system and the cell delay variation absorbing buffer; wherein, when one connection identification number cell detecting portion out of connection identification number detecting portions provided for every connection detects the connection identification number via the down line for own connection, it informs the connection identification number cell detecting portion which corresponds to the connection identification number to output the predetermined control signal.

Therefore, according to the audio band signal transmission system set forth in the eleventh aspect of the present invention, when it is decided in response to notification issued from other connection identification number detecting portion that the audio band signal cell which is to be transmitted to own connection is transmitted via the communication path which is extended over "the audio transmission system, the switching system, and the audio transmission system" in sequence, the routine of the cell is corrected before the audio band signal cell which is to be transmitted to the switching system and the cell delay variation absorbing buffer via the up line for own connection is input into the connection identification number inserting portion which corresponds to this connection. Hence, the audio band signal cell can be transmitted via the down line corresponding to this own connection, without intervention of the switching system and the cell delay variation absorbing buffer. As a result, a process delay time can be suppressed to the lowest minimum without degradation of the audio quality of the audio band signal by omitting useless processes such as cell disassembling/assembling processes, etc. generated when the cell is transmitted to the switching system, cell delay variation absorbing process by the cell delay variation absorbing buffer, etc. In this case, the similar advantage can also be achieved by the audio band signal transmission method set forth in the thirty-first aspect of the present invention.

In an audio band signal transmission system set forth in the twelfth aspect of the present invention, in addition to a configuration according to the eleventh aspect of the invention, the audio transmission system includes a switching system interface portion for transmitting the audio band signal between the switching system and the audio transmission system, a transmission line interface portion for transmitting the audio band signal between the cell switching system and the audio transmission system, and a multiplexing portion arranged between the switching system interface portion and the transmission line interface portion, for transmitting the audio band signal between the switching system and the cell switching system, wherein the switching system interface portion has the cell delay variation absorbing buffer for delayed-reading the audio band signal which is transmitted via the up line.

Therefore, according to the audio band signal transmission system set forth in the twelfth aspect of the present invention, the audio transmission system consists of three portions of the switching system interface portion, the transmission line interface portion, and the multiplexing portion. In this case, the similar advantage can also be achieved by the audio band signal transmission method set forth in the thirty-second aspect of the present invention.

In an audio band signal transmission system set forth in the thirteenth aspect of the present invention, in addition to a configuration according to the twelfth aspect of the invention, the multiplexing portion of the audio transmission system contains a connection identification number cell transmitting portion, a connection identification number cell detecting portion, and a routine correcting portion every connection, the connection identification number cell detecting portion outputs the predetermined control signal to the routine correcting portion which corresponds to own connection when it confirms in response to notification from other connection identification number cell detecting portion that a communication path for own connection is extended in sequence over "the audio transmission system, the switching system, and the audio transmission system", and the routine correcting portion corrects the routine of the audio band signal from the up line in response to the predetermined control signal to transmit the audio band signal to the down line without intervention of the switching system interface portion and the switching system.

Therefore, according to the audio band signal transmission system set forth in the thirteenth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system interface portion and the switching system. As a result, the process delay time can be suppressed to the lowest minimum without degradation of the audio quality of the audio band signal by omitting useless processes such as the cell disassembling/assembling processes, the cell delay variation absorbing process, etc. generated in the switching system interface portion, the process generated in the switching system, etc. In this case, the similar advantage can also be achieved by the audio band signal transmission method set forth in the thirty-third of the present invention.

In an audio band signal transmission system set forth in the fourteenth aspect of the present invention, in addition to a configuration according to the thirteenth aspect of the invention, the switching system interface portion of the audio transmission system includes a compressed coding portion for compressed-coding the audio band signal which is transmitted from the switching system via the down line, and a compressed decoding portion for compressed-decoding the audio band signal which is delayed-read by the cell delay variation absorbing buffer.

Therefore, according to the audio band signal transmission system set forth in the fourteenth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system interface portion and the switching system. As a result, the process delay time can be suppressed to the lowest minimum without degradation of the audio quality of the audio band signal by omitting useless processes such as the cell disassembling/assembling processes, the cell delay variation absorbing process, and the audio compressed coding/decoding processes in the switching system interface portion, the process generated in the switching system, etc. In this case, the similar advantage can also be achieved by the audio band signal transmission method set forth in the thirty-fourth aspect of the present invention.

In an audio band signal transmission system set forth in the fifteenth aspect of the present invention, in addition to a configuration according to the twelfth aspect of the invention, the switching system interface portion of the audio transmission system contains a connection identification number cell transmitting portion, a connection identification number cell detecting portion, and a routine correcting portion, all are arranged at a preceding stage of the cell delay variation absorbing buffer, every connection, the connection identification number cell detecting portion outputs a predetermined control signal to the routine correcting portion which corresponds to own connection when it confirms in answer to notification from other connection identification number cell detecting portion that a communication path for own connection is extended in sequence over "the audio transmission system, the switching system, and the audio transmission system", and the routine correcting portion corrects the routine of the audio band signal from the up line in answer to the predetermined control signal to thus transmit the audio band signal to the down line without intervention of the cell delay variation absorbing buffer and the switching system.

Therefore, according to the audio band signal transmission system set forth in the fifteenth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system and the cell delay variation absorbing buffer. As a result, the process delay time can be suppressed to the lowest minimum without degradation of the audio quality of the audio band signal, and also the switching system interface portion can be disconnected easily from the system at the time of failure or maintenance if this function is attached to the switching system interface portion in place of the multiplexing portion serving as a control system of the audio band signal transmission system. In this case, the similar advantage can also be achieved by the audio band signal transmission method set forth in the thirty-fifth aspect of the present invention.

In an audio band signal transmission system set forth in the sixteenth aspect of the present invention, in addition to a configuration according to the fifteenth aspect of the invention, the switching system interface portion of the audio transmission system includes a compressed coding portion for compressed-coding the audio band signal which is transmitted from the switching system via the down line to then transmit a compressed-coded audio band signal to the connection identification number cell detecting portion, and a compressed decoding portion for compressed-decoding the audio band signal which is delayed-read by the cell delay variation absorbing buffer.

Therefore, according to the audio band signal transmission system set forth in the sixteenth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system and the cell delay variation absorbing buffer. As a result, the process delay time can be suppressed to the lowest minimum without degradation of the audio quality of the audio band signal, and also the switching system interface portion can be disconnected easily from the system at the time of failure or maintenance if this function is attached to the switching system interface portion in place of the multiplexing portion serving as a control system of the audio band signal transmission system. In this case, the similar advantage can also be achieved by the audio band signal transmission method set forth in the thirty-sixth aspect of the present invention.

In an audio band signal transmission system set forth in the seventeenth aspect of the present invention, in addition to a configuration according to the twelfth aspect of the invention, the transmission line interface portion of the audio transmission system contains a connection identification number cell transmitting portion, a connection identification number cell detecting portion, and a routine correcting portion every connection, the connection identification number cell detecting portion outputs the predetermined control signal to the routine correcting portion which corresponds to own connection when it confirms in response to notification from other connection identification number cell detecting portion that a communication path for own connection is extended in sequence over "the audio transmission system, the switching system, and the audio transmission system", and the routine correcting portion corrects the routine of the audio band signal from the up line in response to the predetermined control signal to thus transmit the audio band signal to the down line without intervention of the multiplexing portion, the switching system interface portion, and the switching system.

Therefore, according to the audio band signal transmission system set forth in the seventeenth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the multiplexing portion, the switching system interface portion and the switching system. As a result, the process delay time can be suppressed to the lowest minimum without degradation of the audio quality of the audio band signal by omitting useless processes such as the multiplexing process in the multiplexing portion, the cell disassembling/assembling processes and the cell delay variation absorbing process in the switching system interface portion, the process generated in the switching system, etc. In this case, the similar advantage can also be achieved by the audio band signal transmission method set forth in the thirty-seventh aspect of the present invention.

In an audio band signal transmission system set forth in the eighteenth aspect of the present invention, in addition to a configuration according to the seventeenth aspect of the invention, the switching system interface portion of the audio transmission system includes a compressed coding portion for compressed-coding the audio band signal which is transmitted from the switching system via the down line, and a compressed decoding portion for compressed-decoding the audio band signal which is delayed-read by the cell delay variation absorbing buffer.

Therefore, according to the audio band signal transmission system set forth in the eighteenth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the multiplexing portion, the switching system interface portion and the switching system. As a result, the delay time of the audio band signal can be suppressed to the lowest minimum among the audio transmission systems by omitting useless processes such as the multiplexing process in the multiplexing portion, the cell disassembling/assembling processes, the cell delay variation absorbing process, and the audio compressed coding/decoding processes in the switching system interface portion, the process generated in the switching system, etc., and in addition degradation of the audio quality of the audio band signal can be prevented without fail. In this case, the similar advantage can also be achieved by the audio band signal transmission method set forth in the thirty-eighth aspect of the present invention.

In an audio band signal transmission system set forth in the nineteenth aspect of the present invention, in addition to a configuration according to the eleventh aspect of the invention, the cell switching system contains a connection identification number cell transmitting portion, a connection identification number cell detecting portion, and a routine correcting portion every connection, the connection identification number cell detecting portion outputs the predetermined control signal to the routine correcting portion which corresponds to own connection when it confirms in response to notification from other connection identification number cell detecting portion that a communication path for own connection is extended in sequence over "the cell switching system, the audio transmission system, the switching system, the audio transmission system, and the cell switching system", and the routine correcting portion corrects the routine of the audio band signal from the up line in response to the predetermined control signal to then transmit the audio band signal to the down line without intervention of the audio transmission system and the switching system.

Therefore, according to the audio band signal transmission system set forth in the nineteenth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal can be transmitted to the down line, without the intervention of the audio transmission system and the switching system. As a result, the delay time of the audio band signal can be suppressed to the lowest minimum among the audio band signal transmission systems by omitting useless processes such as the cell transmitting process, the cell multiplexing process, the cell delay variation absorbing process, and the cell disassembling/assembling processes in the audio transmission system, the process generated in the switching system, etc., and in addition degradation of the audio quality of the audio band signal can be prevented without fail. In this case, the similar advantage can also be achieved by the audio band signal transmission method set forth in the thirty-ninth aspect of the present invention.

In an audio band signal transmission system set forth in the twentieth aspect of the present invention, in addition to a configuration according to the nineteenth aspect of the invention, the audio transmission system includes a compressed coding portion for compressed-coding the audio band signal which is transmitted from the switching system via the down line, and a compressed decoding portion for compressed-decoding the audio band signal which is delayed-read by the cell delay variation absorbing buffer.

Therefore, according to the audio band signal transmission system set forth in the twentieth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal can be transmitted to the down line, without the intervention of the audio transmission system and the switching system. As a result, the delay time of the audio band signal can be suppressed to the lowest minimum among the audio band signal transmission systems by omitting useless processes such as the audio compressed coding/decoding processes in the audio transmission system, the process generated in the switching system, etc., and also degradation of the audio quality of the audio band signal can be prevented without fail. In this case, the similar advantage can also be achieved by the audio band signal transmission method set forth in the fortieth aspect of the present invention.

DETAILED DESCRIPTION OF THE PREFERRED EMBODIMENTS

Figure 1:
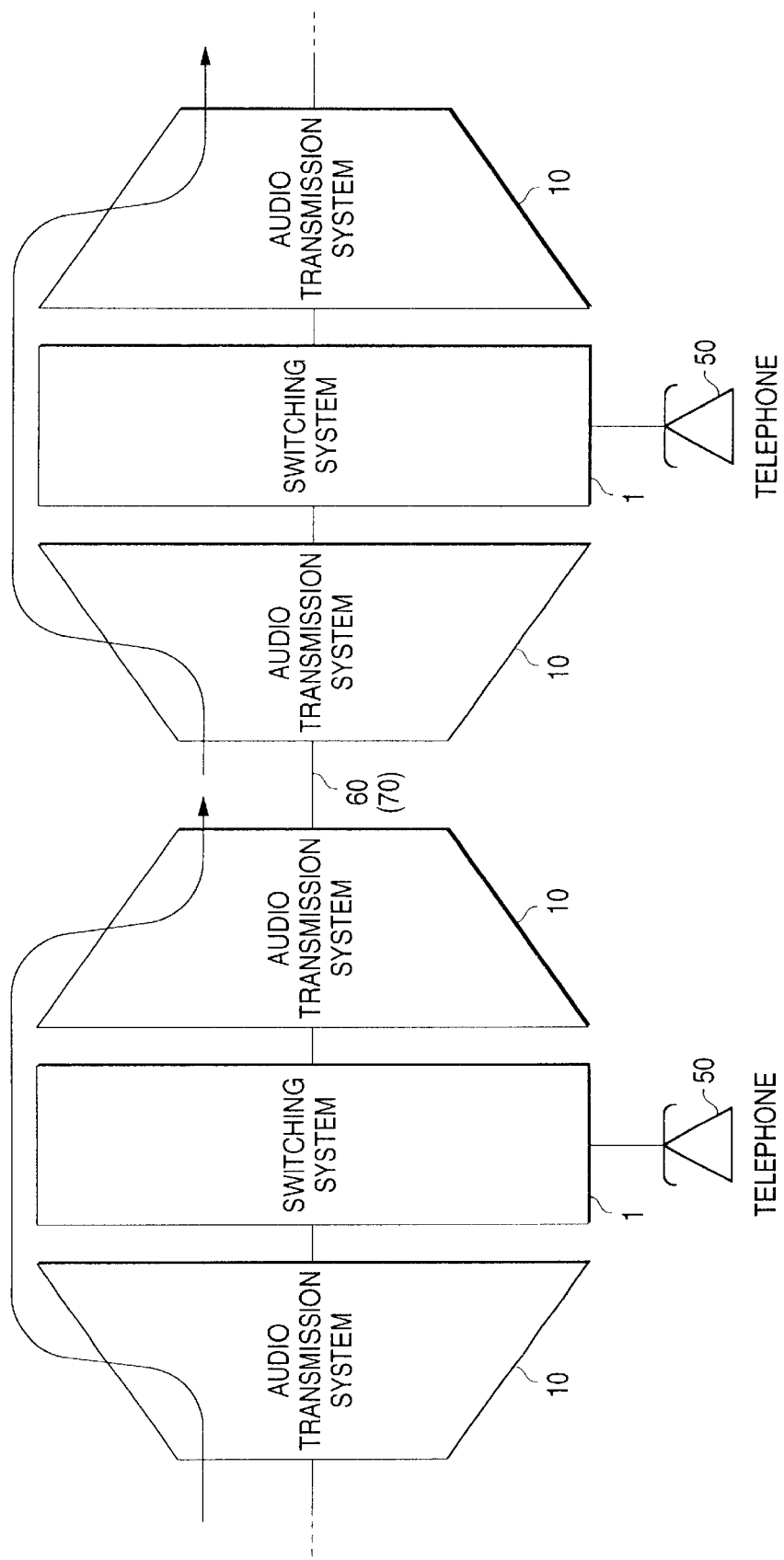
FIG. 1 is a block diagram showing a schematic configuration of an audio band signal transmission system according to embodiments of the present invention.

Therefore, audio band signal transmission systems according to embodiments of the present invention will be explained with reference to the accompanying drawings hereinafter. FIG. 1 is a block diagram showing a schematic configuration of an overall audio band signal transmission system according to the embodiments of the present invention.

When the audio band signal is transmitted via a plurality of switching systems 1 each of which is connected to a plurality of telephones 50, the audio band signal transmission system shown in FIG. 1 can omit internal processes of the switching systems 1 by short-circuiting a line 60 (70) in audio transmission systems 10 at an inlet and an outlet of the switching system 1 respectively.

Figure 2:
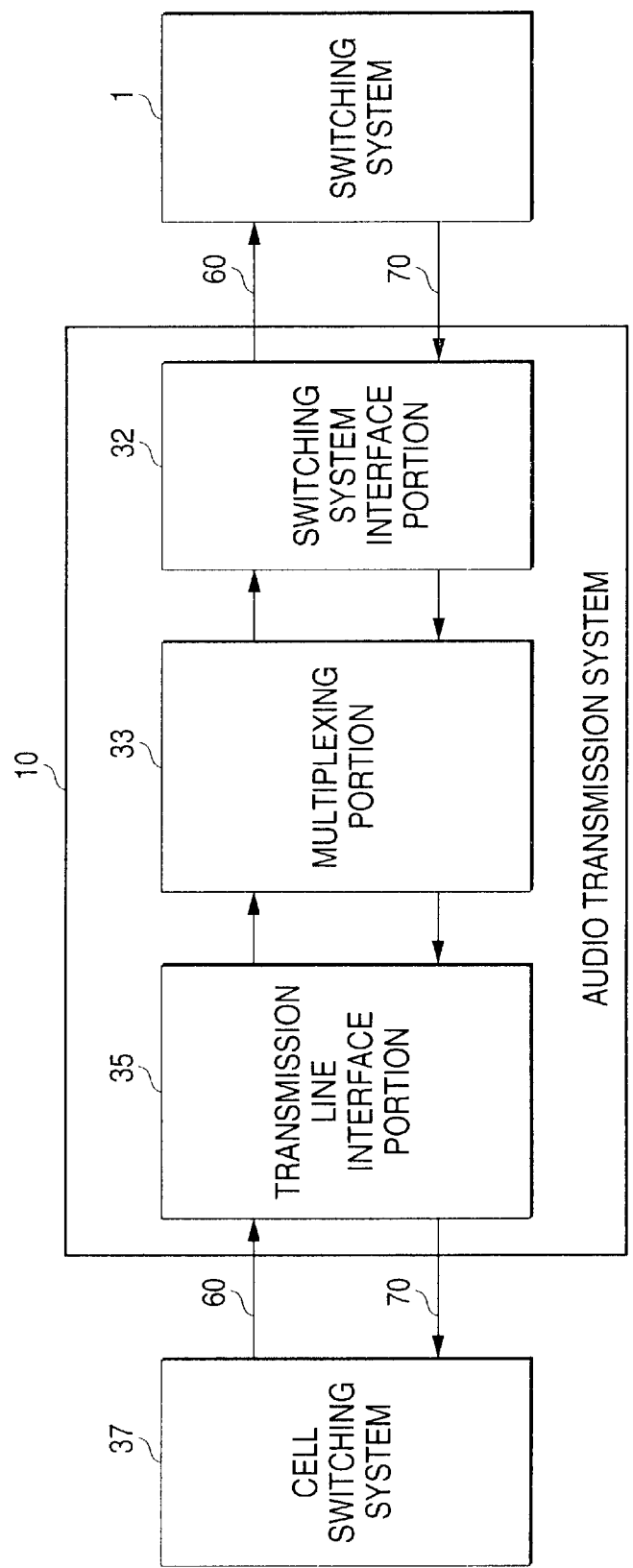
FIG. 2 is a block diagram showing details of the audio band signal transmission system according to the embodiments of the present invention.

Next, details of the audio band signal transmission system will be explained hereinbelow. FIG. 2 is a block diagram showing the details of the audio band signal transmission system.

The audio band signal transmission system shown in FIG. 2 comprises a switching system 1 for applying the audio switching process, a cell switching system 37 for applying the audio cell switching process, and an audio transmission system 10 arranged between the switching system 1 and the cell switching system 37 to transmit an audio band signal via an up line 60 from the cell switching system 37 to the switching system 1 and a down line 70 from the switching system 1 to the cell switching system 37 every connection.

The audio transmission system 10 includes a switching system interface portion 32 which applies the cell delay variation absorbing process, cell assembling/disassembling processes, etc. to the audio band signal received/transmitted from/to the switching system 1 to transmit the signal, a transmission line interface portion 35 which transmits/receives the audio band signal to/from the cell switching system 37, and a multiplexing portion 33 which is arranged between the switching system interface portion 32 and the transmission line interface portion 35 to apply the cell multiplexing process to the audio band signal between the switching system 1 and the cell switching system 37 to transmit the signal. A cell delay variation absorbing buffer 41 which delayed-read the audio band signal transmitted via the up line 60 and is described later is provided in the switching system interface portion 32.

Then, respective embodiments of the audio band signal transmission system having such overall configuration will be explained hereinafter.

Embodiment 1

Figure 3:
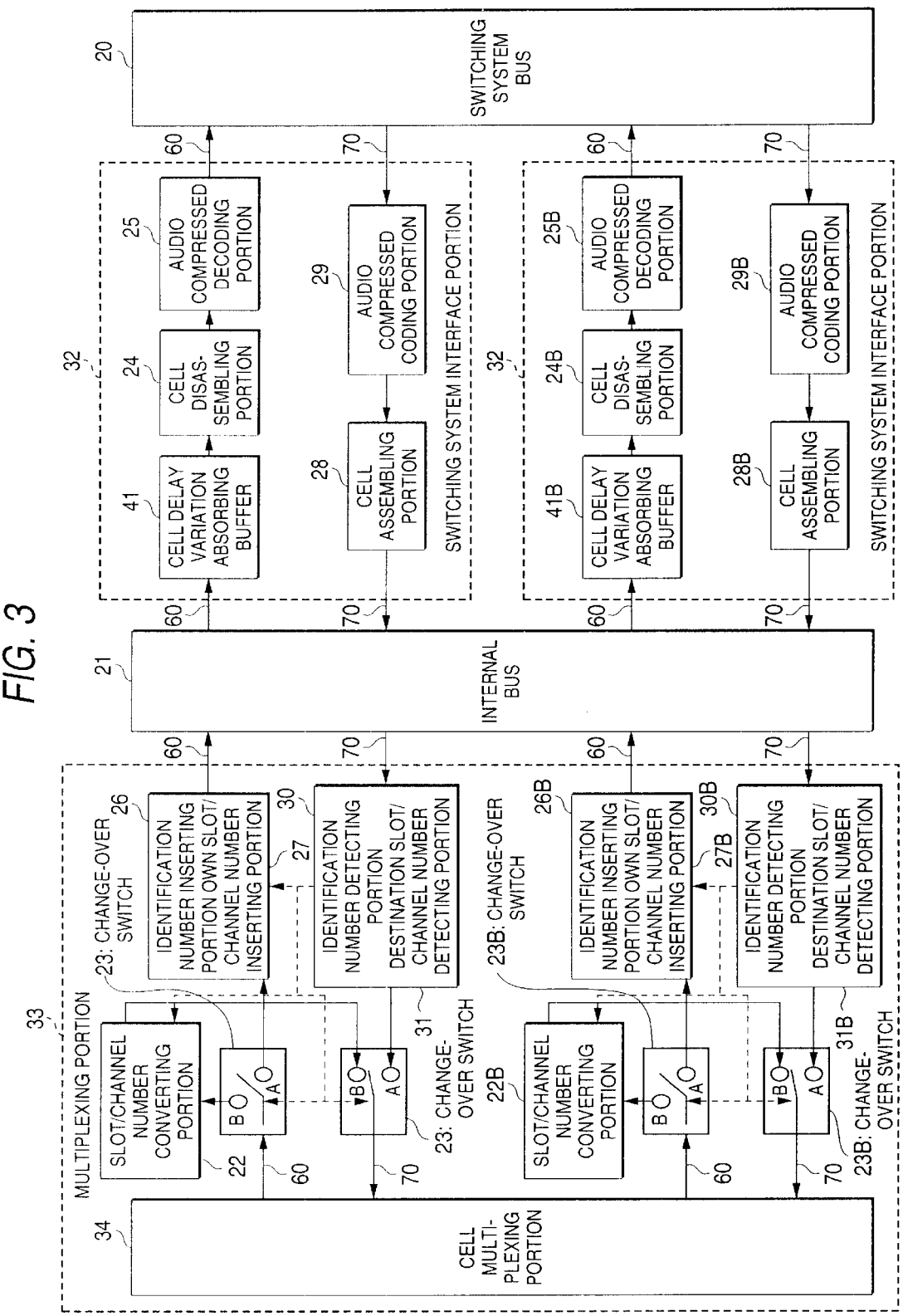
FIG. 3 is a block diagram showing a partially schematic configuration of an audio transmission system of an audio band signal transmission system according to a first embodiment.

FIG. 3 is a block diagram showing a partially schematic configuration of an audio transmission system of an audio band signal transmission system according to a first embodiment. Here the first embodiment corresponds to an audio band signal transmission system set forth in the first and fourth aspect of the invention.

As described above, the audio transmission system 10 shown in FIG. 3 comprises the switching system interface portion 32, the transmission line interface portion 35, and the multiplexing portion 33. The switching system interface portion 32, the transmission line interface portion 35, and the multiplexing portion 33 are connected via internal buses 21 respectively. Also, the switching system interface portion 32 is connected to the switching system 1 via a switching system bus 20. Further, the transmission line interface portion 35 is connected to the cell switching system 37 via a transmission line bus 36 described later.

The switching system bus 20 is a bus which receives the audio band signal from the switching system 1 to then transmit to the switching system interface portion 32, and also applies time-division multiplex to the digitized audio band signal being transmitted from the switching system interface portion 32 to then transmit to the switching system 1.

The multiplexing portion 33 contains an identification number inserting portion 26 (26B) having an own slot/channel number inserting portion 27 (27B), an identification number detecting portion 30 (30B) having a destination slot/channel number detecting portion 31 (31B), a slot/channel number converting portion 22 (22B), and a change-over switch 23 (23B) in each connection, and contains a cell multiplexing portion 34 for multiplexing the cells in the audio transmission system 10.

The identification number inserting portion 26 (26B), which is provided in each connection, sets the connection identification number to be identified every connection, and then inserts own connection identification number into the audio band signal cell which is transmitted from the cell multiplexing portion 34 to the switching system 1 via the up line 60 for own connection.

The identification number detecting portion 30 (30B), which is provided in each connection, detects the connection identification number contained in the audio band signal cells which are transmitted from the switching system 1 via the down line 70 for own connection.

When the connection identification number concerning to own connection is detected by the identification number detecting portion 30 (30B), own slot/channel number inserting portion 27 (27B) can inform the destination slot/channel number detecting portion 31B (31) of own slot/channel number.

When the destination slot/channel number detecting portion 31B (31) detects own slot/channel number from other own slot/channel number inserting portion 27B (27), it informs the slot/channel number converting portion 22B (22) of the detected own slot/channel number as a predetermined control signal. Such control signal can cause the change-over switch 23B (23) to perform a switching operation, and also cause the audio band signal cells obtained by this switching operation to execute the routine correction.

The slot/channel number converting portion 22 (22B) is provided for every connection. Because the routine correction can be applied to the audio band signal cell before the audio band signal cell is input into the identification number inserting portion 26 (26B) corresponding to the connection, the slot/channel number converting portion 22 (22B) can transmit the audio band signal cells, which are transmitted from the cell multiplexing portion 34 to the switching system 1 via the up line 60 for own connection in response to own slot/channel number being detected by the destination slot/channel number detecting portion 31 (31B), via the down line 70 corresponding to own connection, without the intervention of the switching system 1, the cell delay variation absorbing buffer 41, etc.

The switching system interface portion 32 contains the cell delay variation absorbing buffer 41, a cell disassembling portion 24, and an audio compressed decoding portion 25 on the up line 60 and contains a cell assembling portion 28, and an audio compressed coding portion 29 on the down line 70 every connection.

The cell delay variation absorbing buffer 41 delayed-reads the audio band signal cells, which are received from the cell multiplexing portion 34 via the up line 60, after a predetermined delay time has been lapsed.

The cell disassembling portion 24 disassembles the cells, which are delayed-read by the cell delay variation absorbing buffer 41, into supplementary information and the audio compressed signal.

The audio compressed decoding portion 25 includes one or plural audio compressing systems, and performs the audio compressed decoding by switching the audio compressing system in accordance with contents of the header of the cell.

The audio compressed coding portion 29 includes one or plural audio compressing systems, and performs the compressed coding of the audio signal.

The cell assembling portion 28 assembles the cells by dividing the compressed-coded audio signal into frames and then attaching the header as the supplementary information such as the compressing system, etc. to the frames.

The connection identification number inserting portion set forth in the first aspect of the invention corresponds to the identification number inserting portion 26. The connection identification number detecting portion corresponds to the identification number detecting portion 30, the own slot/channel number inserting portion 27 and the destination slot/channel number detecting portion 31. The routine correcting portion corresponds to the slot/channel number converting portion 22.

Figure 20:
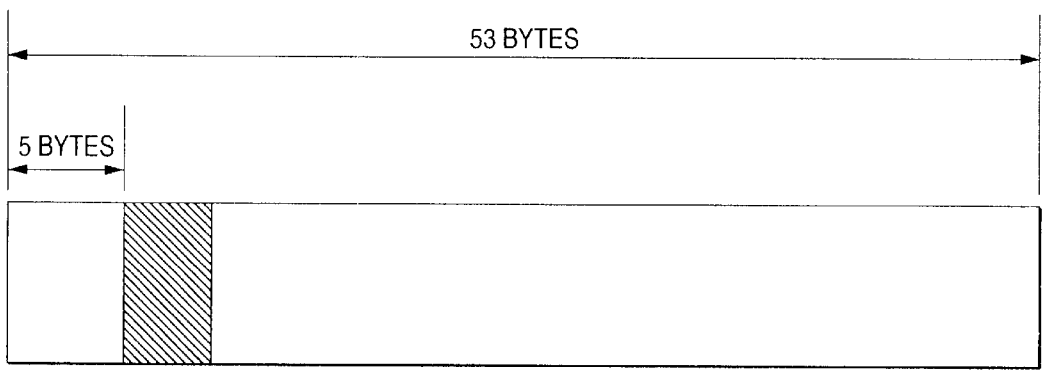
FIG. 20 is a view showing a cell format used when the audio is compressed.

Next, an operation of the audio transmission system in the audio band signal transmission system according to the first embodiment will be explained hereunder. FIG. 20 shows an example of a cell format used when the audio is compressed.

In the initial state of the audio transmission system 10 shown in FIG. 3, the change-over switches 23 arranged on the up line 60 and the down line 70 are switched to the contact A side respectively.

In other words, the identification number inserting portion 26 arranged on the up line 60 inserts own connection identification number into a part of the cell which is transmitted from the cell multiplexing portion 34 via the up line 60.

The cell into which the connection identification number is inserted is transmitted in sequence to the internal bus 21, the cell delay variation absorbing buffer 41, the cell disassembling portion 24, the audio compressed decoding portion 25, the switching system bus 20, and the switching system 1 via the up line 60. Then, the audio data which are passed through the switching system 1 are transmitted in sequence to the switching system bus 20, the audio compressed coding portion 29B, the cell assembling portion 28B, the internal bus 21, and the identification number detecting portion 30B via the down line 70.

At this time, the identification number detecting portion 30B detects whether or not the connection identification number is contained in the cell, and then transmits the cell to the cell multiplexing portion 34 via the change-over switch 23B.

Then, when the audio transmission systems 10 (connections) are connected by the switching system 1, i.e., when the identification number detecting portion 30B detects the connection identification number which is inserted by the identification number inserting portion 26, such identification number detecting portion 30B instructs the own slot/channel number inserting portion 27B to output own slot/channel number to other destination slot/channel number detecting portion 31 corresponding to the connection identification number.

When detects own slot/channel number supplied from the own slot/channel number inserting portion 27B, this destination slot/channel number detecting portion 31 confirms that a communication path for own connection is extended over "the audio transmission system 10, the switching system 1, and the audio transmission system 10" in sequence, then informs the slot/channel number converting portion 22, which corresponds to own connection, of own slot/channel number, and then sets the change-over switch 23 to the contact B side.

After the change-over switch 23 has been set to the contact B side, the cell which is transmitted from the cell multiplexing portion 34 via the up line 60 can be transmitted without the intervention of the internal bus 21, the switching system interface portion 32, the switching system bus 20, and the switching system 1 since such cell can be passed through a routine which consists of the change-over switch 23 arranged on the up line 60, the slot/channel number converting portion 22, the change-over switch 23 arranged on the down line 70, and the cell multiplexing portion 34. More particularly, besides the processes performed in both the switching system bus 20 and the switching system 1, the cell delay variation absorbing process performed by the cell delay variation absorbing buffer 41, the cell disassembling/assembling processes performed by the cell disassembling portion 24 and the cell assembling portion 28, and the audio compressed decoding/coding processes performed by the audio compressed decoding portion 25 and the audio compressed coding portion 29 in the switching system interface portion 32 are not applied to the cell.

According to the first embodiment, when the destination slot/channel number detecting portion 31 (31B) detects own slot/channel number supplied from other own slot/channel number inserting portion 27B (27), it confirms that the communication path for own connection is extended over "the audio transmission system 10, the switching system 1, and the audio transmission system 10" in sequence, and then corrects the routine before the audio band signal cell which is to be transmitted to the switching system 1 via the up line 60 for own connection is input into the identification number inserting portion 26 which corresponds to this connection. Therefore, the audio band signal cell can be transmitted via the down line 70 corresponding to this own connection, without the intervention of the internal bus 21, the switching system interface portion 32, the switching system bus 20, and the switching system 1. As a result, since useless processes such as the cell delay variation absorbing process, the cell disassembling/assembling processes, and the audio compressed decoding/coding processes in the switching system interface portion 32, the process in the switching system 1, etc. can be omitted, the process delay time can be suppressed to the lowest minimum without degradation of the audio quality of the audio band signal.

Embodiment 2

Figure 4:
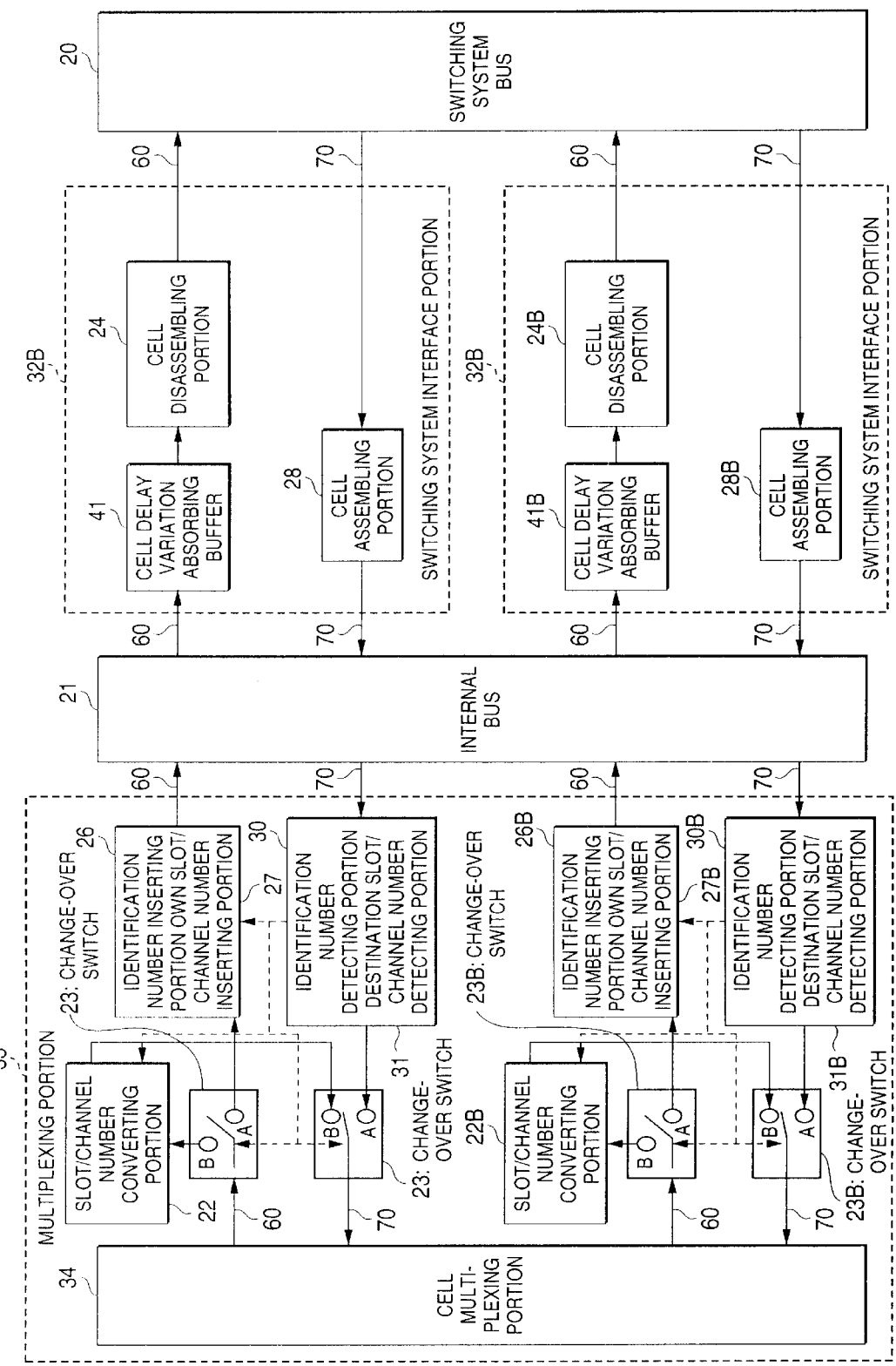
FIG. 4 is a block diagram showing a partially schematic configuration of an audio transmission system of an audio band signal transmission system according to a second embodiment.

FIG. 4 is a block diagram showing a partially schematic configuration of an audio transmission system of an audio band signal transmission system according to a second embodiment. The second embodiment corresponds to an audio band signal transmission system set forth in the first and third aspect of the invention. In this case, in the second embodiment, the same references are affixed to constituent parts which are overlapped with those in the audio band signal transmission system according to the first embodiment, and their redundant explanation of the overlapped configuration and operation will be omitted hereunder.

The audio transmission system shown in FIG. 4 is different from the audio transmission system shown in FIG. 3 in that the switching system interface portion 32 is replaced by a switching system interface portion 32B which does not include the audio compressed decoding portion 25 and the audio compressed coding portion 29.

Figure 19:
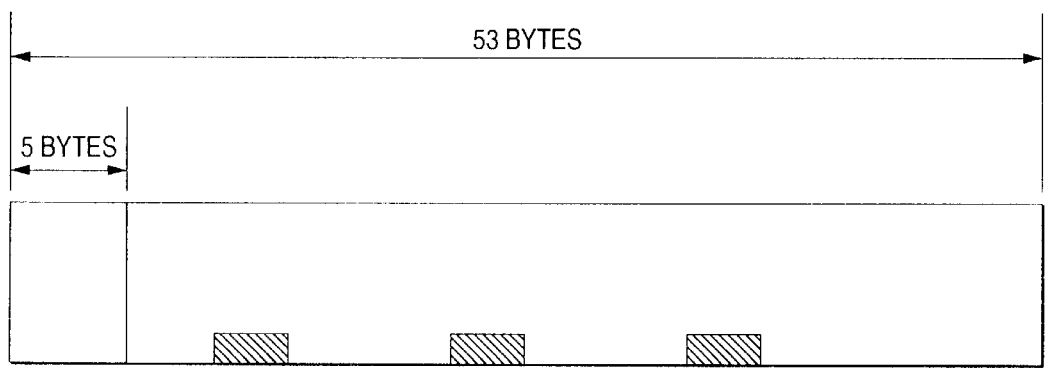
FIG. 19 is a view showing a cell format used when the audio is not compressed.

If the audio band signal is not compressed in this manner, the identification number inserting portion 26 (26B) can insert the connection identification number for own connection by using a cell area to such an extent that no problem is caused in reproduction of the audio, as shown in FIG. 19.

According to the second embodiment, when the destination slot/channel number detecting portion 31 (31B) detects own slot/channel number supplied from other own slot/channel number inserting portion 27B (27), it confirms that the communication path for own connection is extended over "the audio transmission system 10, the switching system 1, and the audio transmission system 10" in sequence, and then corrects the routine before the audio band signal cell which is to be transmitted to the switching system 1 via the up line 60 for own connection is input into the identification number inserting portion 26 which corresponds to this connection. Therefore, the audio band signal cell can be transmitted via the down line 70 corresponding to this own connection, without the intervention of the internal bus 21, the switching system interface portion 32, the switching system bus 20, and the switching system 1. As a result, since useless processes such as the cell delay variation absorbing process, the cell disassembling/assembling processes, and the audio compressed decoding/coding processes in the switching system interface portion 32, the process performed in the switching system 1, etc. can be omitted, the process delay time can be suppressed to the lowest minimum without degradation of the audio quality of the audio band signal.

Embodiment 3

Figure 5:
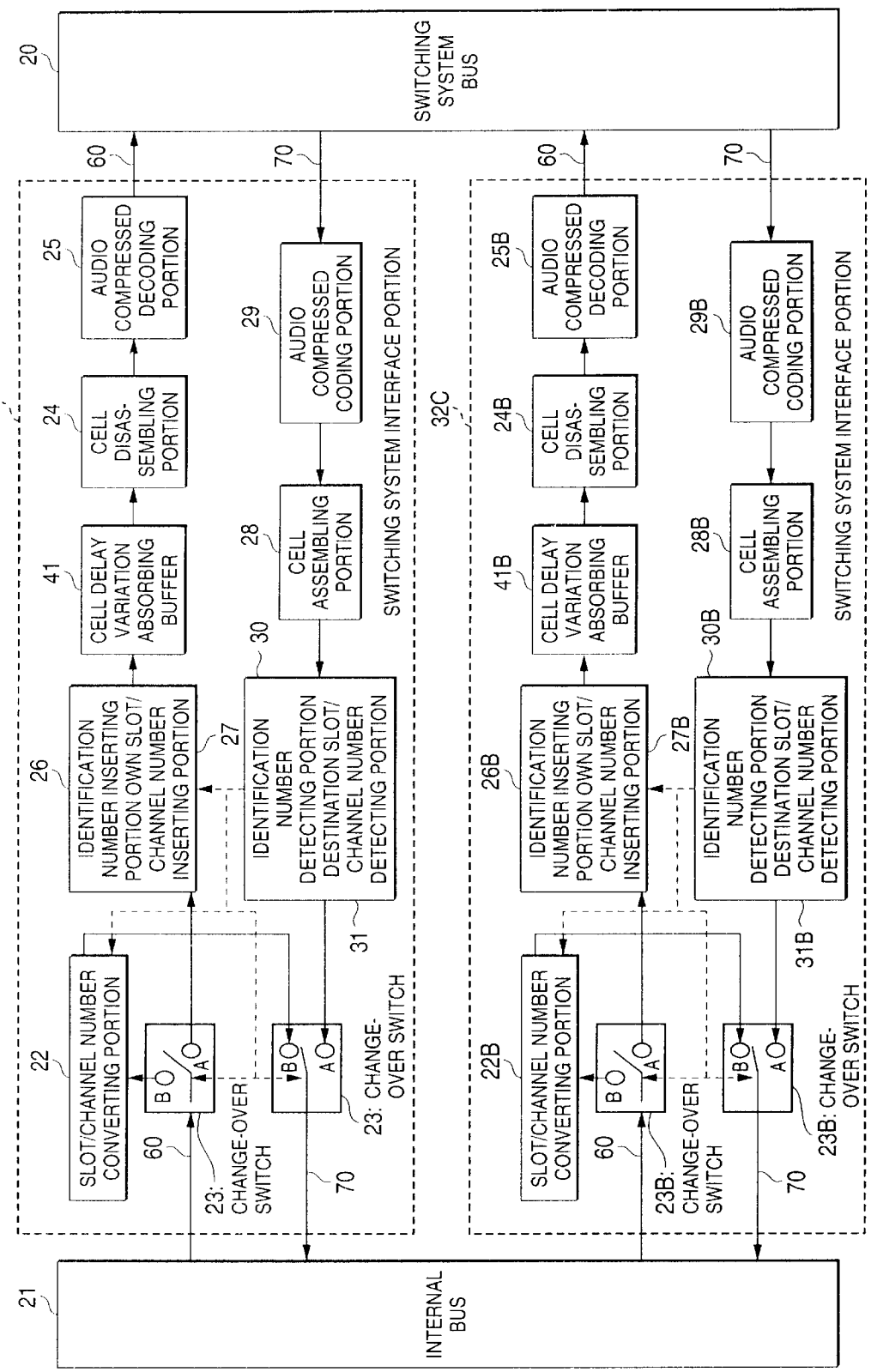
FIG. 5 is a block diagram showing a partially schematic configuration of an audio transmission system of an audio band signal transmission system according to a third embodiment.

FIG. 5 is a block diagram showing a partially schematic configuration of an audio transmission system of an audio band signal transmission system according to a third embodiment. The third embodiment corresponds to an audio band signal transmission system set forth in the first and sixth aspect of the invention. In this case, in the third embodiment, the same references are affixed to constituent parts which are overlapped with those in the audio band signal transmission system according to the first embodiment, and their redundant explanation of the overlapped configuration and operation will be omitted hereunder.

The audio transmission system shown in FIG. 5 is different from the audio transmission system shown in FIG. 3 in that, in the audio transmission system shown in FIG. 3, the identification number inserting portion 26 (26B) having the own slot/channel number inserting portion 27 (27B), the identification number detecting portion 30 (30B) having the destination slot/channel number detecting portion 31 (31B), the slot/channel number converting portion 22 (22B), and the change-over switch 23 (23B) are provided in the multiplexing portion 33 to achieve the audio band signal transmission system whereas, in the audio transmission system shown in FIG. 5, the switching system interface portion 32C which contains the identification number inserting portion 26 (26B) having the own slot/channel number inserting portion 27 (27B), the identification number detecting portion 30 (30B) having the destination slot/channel number detecting portion 31 (31B), the slot/channel number converting portion 22 (22B), and the change-over switch 23 (23B) is provided in place of the multiplexing portion 33 to achieve the audio band signal transmission system.

In the audio transmission system shown in FIG. 5, the change-over switch 23 (23B) and the identification number inserting portion 26 (26B) are arranged on the up line 60 which is extended from the internal bus 21 connected to the multiplexing portion 33 (not shown), and then the identification number inserting portion 26 (26B) is connected to the cell delay variation absorbing buffer 41 (41B).

Also, the change-over switch 23 (23B) and the identification number detecting portion 30 (30B) are arranged on the down line 70, and then the identification number detecting portion 30 (30B) is connected to the cell assembling portion 28 (28B).

Next, an operation of the audio band signal transmission system according to the third embodiment will be explained hereunder.

When the audio transmission systems 10 (connections) are connected by the switching system 1, i.e., when the identification number detecting portion 30B detects the connection identification number which is inserted by the identification number inserting portion 26, such identification number detecting portion 30B instructs the own slot/channel number inserting portion 27B to output own slot/channel number to other destination slot/channel number detecting portion 31 corresponding to the connection identification number.

When the destination slot/channel number detecting portion 31 detects own slot/channel number supplied from the own slot/channel number inserting portion 27B, it confirms that a communication path for own connection is extended over "the audio transmission system 10, the switching system 1 and the audio transmission system 10" in sequence, then informs the slot/channel number converting portion 22, which corresponds to own connection, of own slot/channel number, and then sets the change-over switch 23 to the contact B side.

After the change-over switch 23 has been set to the contact B side, the cell which is transmitted from the cell multiplexing portion 34 via the up line 60 can be transmitted without the intervention of the switching system bus 20 and the switching system 1 since such cell can be passed through a routine which consists of the change-over switch 23 arranged on the up line 60, the slot/channel number converting portion 22, the change-over switch 23 arranged on the down line 70, and the cell multiplexing portion 34. More particularly, besides the processes performed in both the switching system bus 20 and the switching system 1, the cell delay variation absorbing process performed by the cell delay variation absorbing buffer 41, the cell disassembling/assembling processes performed by the cell disassembling portion 24 and the cell assembling portion 28, and the audio compressed decoding/coding processes performed by the audio compressed decoding portion 25 and the audio compressed coding portion 29 in the switching system interface portion 32C are not applied to the cell.

According to the third embodiment, when the destination slot/channel number detecting portion 31 (31B) detects own slot/channel number supplied from other own slot/channel number inserting portion 27B (27), it confirms that the communication path for own connection is extended over "the audio transmission system 10, the switching system 1, and the audio transmission system 10" in sequence, and then corrects the routine before the audio band signal cell which is to be transmitted to the switching system 1 via the up line 60 for own connection is input into the identification number inserting portion 26 which corresponds to this connection. Therefore, the audio band signal cell can be transmitted via the down line 70 corresponding to this own connection, without the intervention of the cell delay variation absorbing buffer 41, the cell disassembling portion 24, the cell assembling portion 28, the audio compressed decoding portion 25 and the audio compressed coding portion 29 in the switching system interface portion 32C, the switching system bus 20, and the switching system 1. As a result, since useless processes such as the cell delay variation absorbing process, the cell disassembling/assembling processes, and the audio compressed decoding/coding processes in the switching system interface portion 32C, the process performed in the switching system 1, etc. can be omitted, the process delay time can be suppressed to the lowest minimum without degradation of the audio quality of the audio band signal.

In addition, if this function is attached to the switching system interface portion 32C in place of the multiplexing portion 33 serving as a control system of the audio band signal transmission system, the switching system interface portion 32C can be disconnected easily from the system at the time of failure or maintenance.

Embodiment 4

Figure 6:
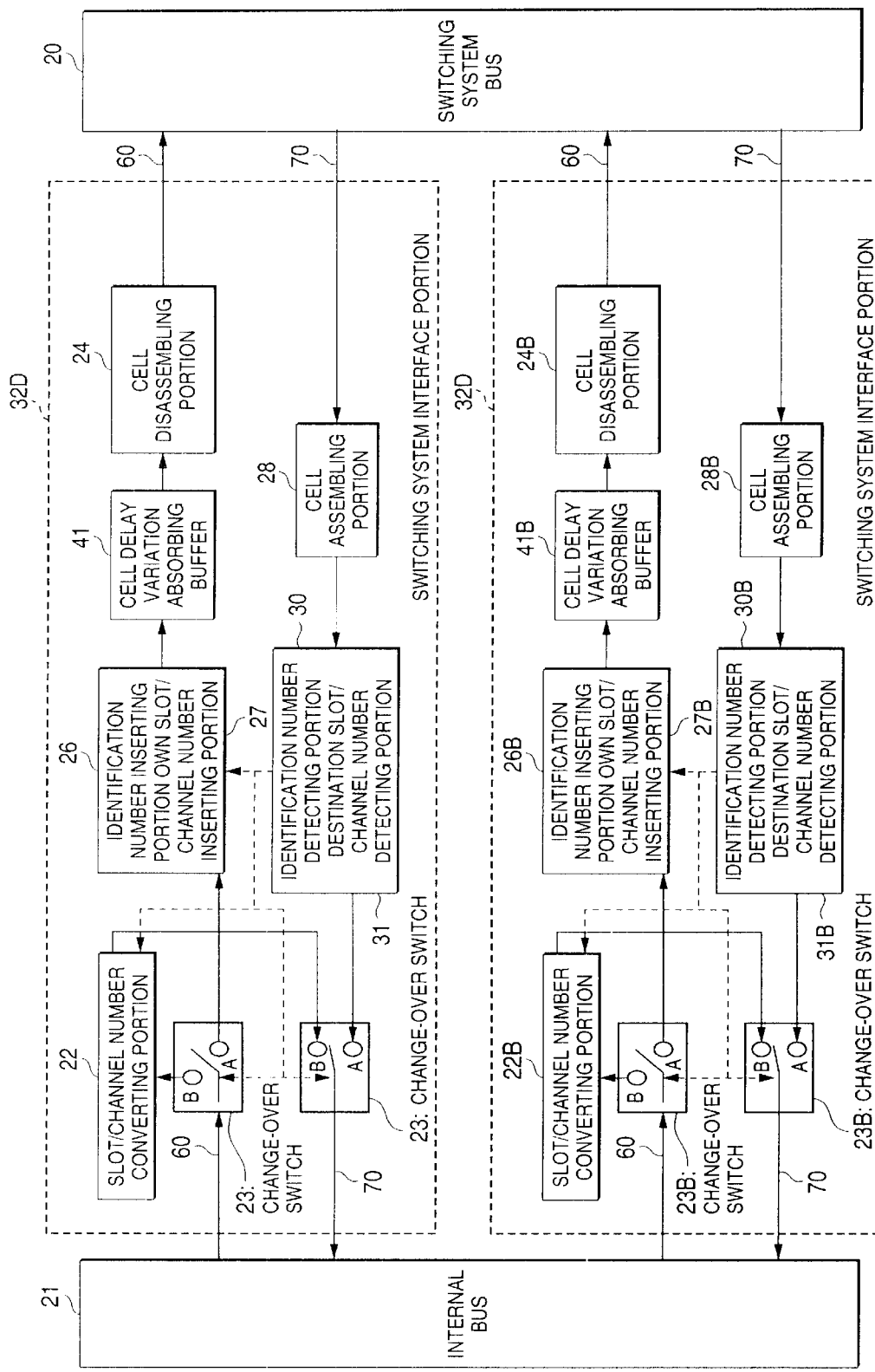
FIG. 6 is a block diagram showing a partially schematic configuration of an audio transmission system of an audio band signal transmission system according to a fourth embodiment.

FIG. 6 is a block diagram showing a partially schematic configuration of an audio transmission system of an audio band signal transmission system according to a fourth embodiment. The fourth embodiment corresponds to an audio band signal transmission system set forth in the first and fifth aspect of the invention. In this case, in the fourth embodiment, the same references are affixed to constituent parts which are overlapped with those in the audio band signal transmission system according to the third embodiment, and their redundant explanation of the overlapped configuration and operation will be omitted hereunder.

The audio transmission system shown in FIG. 6 is different from the audio transmission system shown in FIG. 5 in that the switching system interface portion 32C is replaced by a switching system interface portion 32D which does not include the audio compressed decoding portion 25 and the audio compressed coding portion 29.

If the audio band signal is not compressed in this way, the identification number inserting portion 26 (26B) can insert the connection identification number for own connection by using the cell area to such an extent that no problem is caused in reproduction of the audio, as shown in FIG. 19.

According to the fourth embodiment, when the destination slot/channel number detecting portion 31 (31B) detects own slot/channel number supplied from other own slot/channel number inserting portion 27B (27), it confirms that the communication path for own connection is extended over "the audio transmission system 10, the switching system 1, and the audio transmission system 10" in sequence, and then corrects the routine before the audio band signal cell which is to be transmitted to the switching system 1 via the up line 60 for own connection is input into the identification number inserting portion 26 corresponding to this connection. Therefore, the audio band signal cell can be transmitted via the down line 70 corresponding to this own connection, without the intervention of the cell delay variation absorbing buffer 41, the cell disassembling portion 24, and the cell assembling portion 28 in the switching system interface portion 32D, the switching system bus 20, and the switching system 1. As a result, since useless processes such as the cell delay variation absorbing process, the cell disassembling/assembling processes, and the audio compressed decoding/coding processes in the switching system interface portion 32D, the process performed in the switching system 1, etc. can be omitted, the process delay time can be suppressed to the lowest minimum without degradation of the audio quality of the audio band signal.

Further, if this function is attached to the switching system interface portion 32D in place of the multiplexing portion 33 serving as the control system of the audio band signal transmission system, the switching system interface portion 32D can be disconnected easily from the system at the time of failure or maintenance.

Embodiment 5

Figure 7:
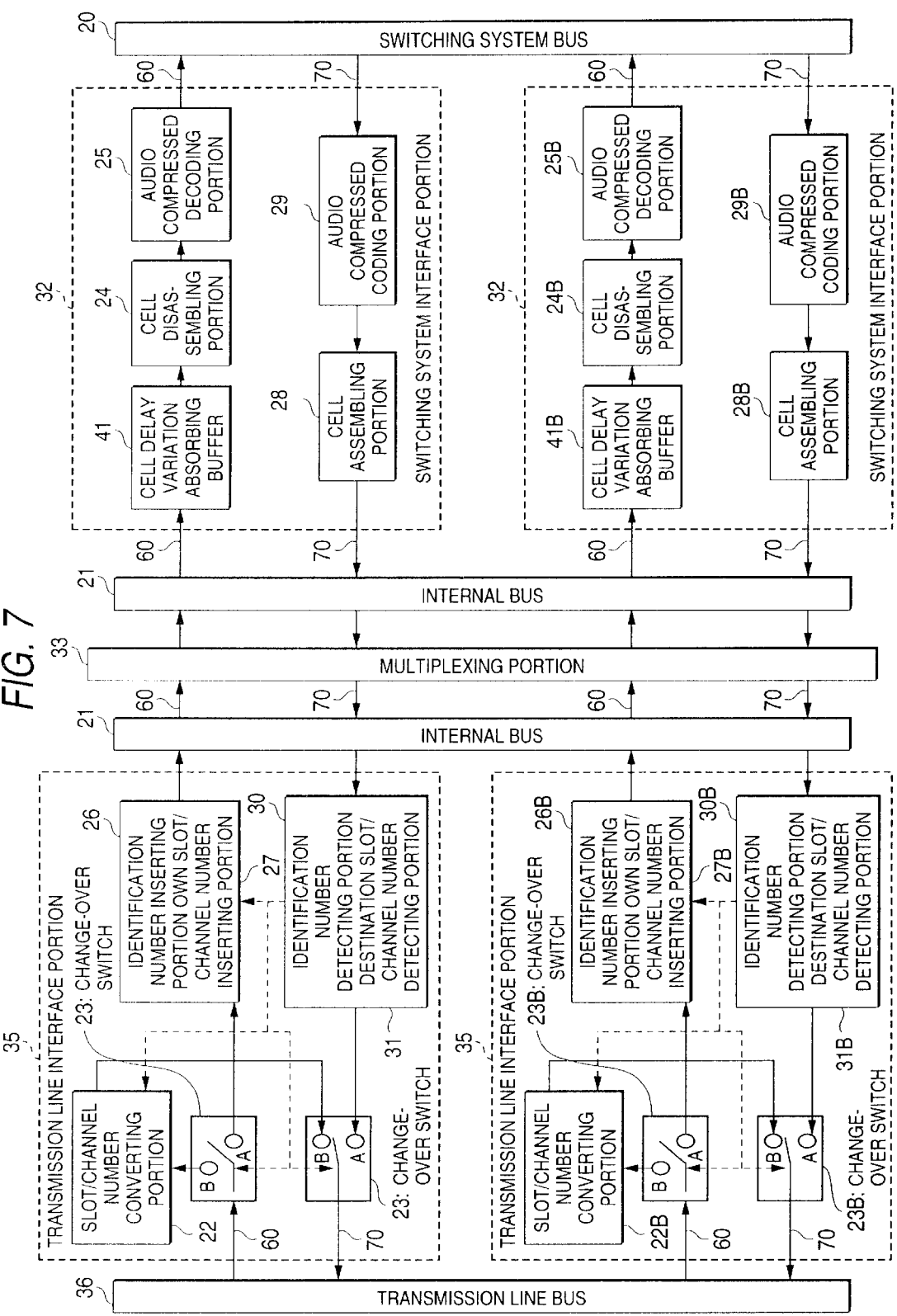
FIG. 7 is a block diagram showing a partially schematic configuration of an audio transmission system of an audio band signal transmission system according to a fifth embodiment.

FIG. 7 is a block diagram showing a partially schematic configuration of an audio transmission system of an audio band signal transmission system according to a fifth embodiment. The fifth embodiment corresponds to an audio band signal transmission system set forth in the first and eighth aspect of the invention. In this case, in the fifth embodiment, the same references are affixed to constituent parts which are overlapped with those in the audio band signal transmission system according to the first embodiment, and their redundant explanation of the overlapped configuration and operation will be omitted hereunder.

The audio transmission system shown in FIG. 7 is different from the audio transmission system shown in FIG. 3 in that, in the audio transmission system shown in FIG. 3, the identification number inserting portion 26 (26B) having the own slot/channel number inserting portion 27 (27B), the identification number detecting portion 30 (30B) having the destination slot/channel number detecting portion 31 (31B), the slot/channel number converting portion 22 (22B), and the change-over switch 23 (23B) are provided in the multiplexing portion 33 to achieve the audio band signal transmission system whereas, in the audio transmission system shown in FIG. 7, the identification number inserting portion 26 (26B) having the own slot/channel number inserting portion 27 (27B), the identification number detecting portion 30 (30B) having the destination slot/channel number detecting portion 31 (31B), the slot/channel number converting portion 22 (22B), and the change-over switch 23 (23B) are provided in the transmission line interface portion 35 instead of the multiplexing portion 33 to achieve the audio band signal transmission system.

In the audio transmission system shown in FIG. 7, the change-over switch 23 (23B) and the identification number inserting portion 26 (26B) are arranged on the up line 60 which is extended from the transmission line bus 36 connected to the cell switching system 37 (not shown), and then the identification number inserting portion 26 (26B) is connected to the internal bus 21 which is connected to the multiplexing portion 33.

Also, the change-over switch 23 (23B) and the identification number detecting portion 30 (30B) are arranged on the down line 70, and then the identification number detecting portion 30 (30B) is connected to the internal bus 21 which is connected to the multiplexing portion 33.

Next, an operation of the audio band signal transmission system according to the fifth embodiment will be explained hereunder.

The identification number inserting portion 26 arranged on the up line 60 inserts own connection identification number into a part of the cell which is transmitted from the transmission line bus 36 via the up line 60.

The cell into which the connection identification number is inserted is transmitted in sequence to the internal bus 21, the multiplexing portion 33, the internal bus 21, the cell delay variation absorbing buffer 41, the cell disassembling portion 24, the audio compressed decoding portion 25, the switching system bus 20, and the switching system 1 via the up line 60. Then, the audio data which are passed through the switching system 1 are transmitted in sequence to the switching system bus 20, the audio compressed coding portion 29B, the cell assembling portion 28B, the internal bus 21, the multiplexing portion 33, the internal bus 21, and the identification number detecting portion 30B via the down line 70.

At this time, the identification number detecting portion 30B detects whether or not the connection identification number is contained in the cell, and then transmits the cell to the transmission line bus 36 via the change-over switch 23B.

Then, when the audio transmission systems 10 (connections) are connected by the switching system 1, i.e., when the identification number detecting portion 30B detects the connection identification number which is inserted by the identification number inserting portion 26, such identification number detecting portion 30B instructs the own slot/channel number inserting portion 27B to output own slot/channel number to other destination slot/channel number detecting portion 31 corresponding to the connection identification number.

When the destination slot/channel number detecting portion 31 detects own slot/channel number supplied from the own slot/channel number inserting portion 27B, such destination slot/channel number detecting portion 31 confirms that the communication path for own connection is extended over "the audio transmission system 10, the switching system 1, and the audio transmission system 10" in sequence, then informs the slot/channel number converting portion 22, which corresponds to own connection, of own slot/channel number, and then sets the change-over switch 23 to the contact B side.

After the change-over switch 23 has been set to the contact B side, the cell which is transmitted from the transmission line bus 36 via the up line 60 can be transmitted without the intervention of the internal bus 21, the multiplexing portion 33, the switching system interface portion 32, the switching system bus 20, and the switching system 1 since such cell can be passed through a routine which consists of the change-over switch 23 arranged on the up line 60, the slot/channel number converting portion 22, the change-over switch 23 arranged on the down line 70, and the transmission line bus 36. More particularly, the cell can be transmitted not to receive the cell multiplexing process performed by the multiplexing portion 33, the cell delay variation absorbing process performed by the cell delay variation absorbing buffer 41, the cell disassembling/assembling processes performed by the cell disassembling portion 24 and the cell assembling portion 28, and the audio compressed decoding/coding processes performed by the audio compressed decoding portion 25 and the audio compressed coding portion 29 in the switching system interface portion 32.

According to the fifth embodiment, when the destination slot/channel number detecting portion 31 (31B) detects own slot/channel number supplied from other own slot/channel number inserting portion 27B (27), it confirms that the communication path for own connection is extended over "the audio transmission system 10, the switching system 1, and the audio transmission system 10" in sequence, and then corrects the routine before the audio band signal cell which is to be transmitted to the switching system 1 via the up line 60 for own connection is input into the identification number inserting portion 26 corresponding to this connection. Therefore, the audio band signal cell can be transmitted via the down line 70 corresponding to this own connection, without the intervention of the internal bus 21, the multiplexing portion 33, the internal bus 21, the switching system interface portion 32, the switching system bus 20, and the switching system 1. As a result, since useless processes such as the cell multiplexing process performed by the multiplexing portion 33, the cell delay variation absorbing process, the cell disassembling/assembling processes, and the audio compressed decoding/coding processes performed in the switching system interface portion 32, the process performed in the switching system 1, etc. can be omitted, the process delay time of the audio band signal can be suppressed to the lowest minimum among the audio transmission systems (first to fourth embodiments) to which the present invention is applied and also degradation of the audio quality can be prevented without fail.

Embodiment 6

Figure 8:
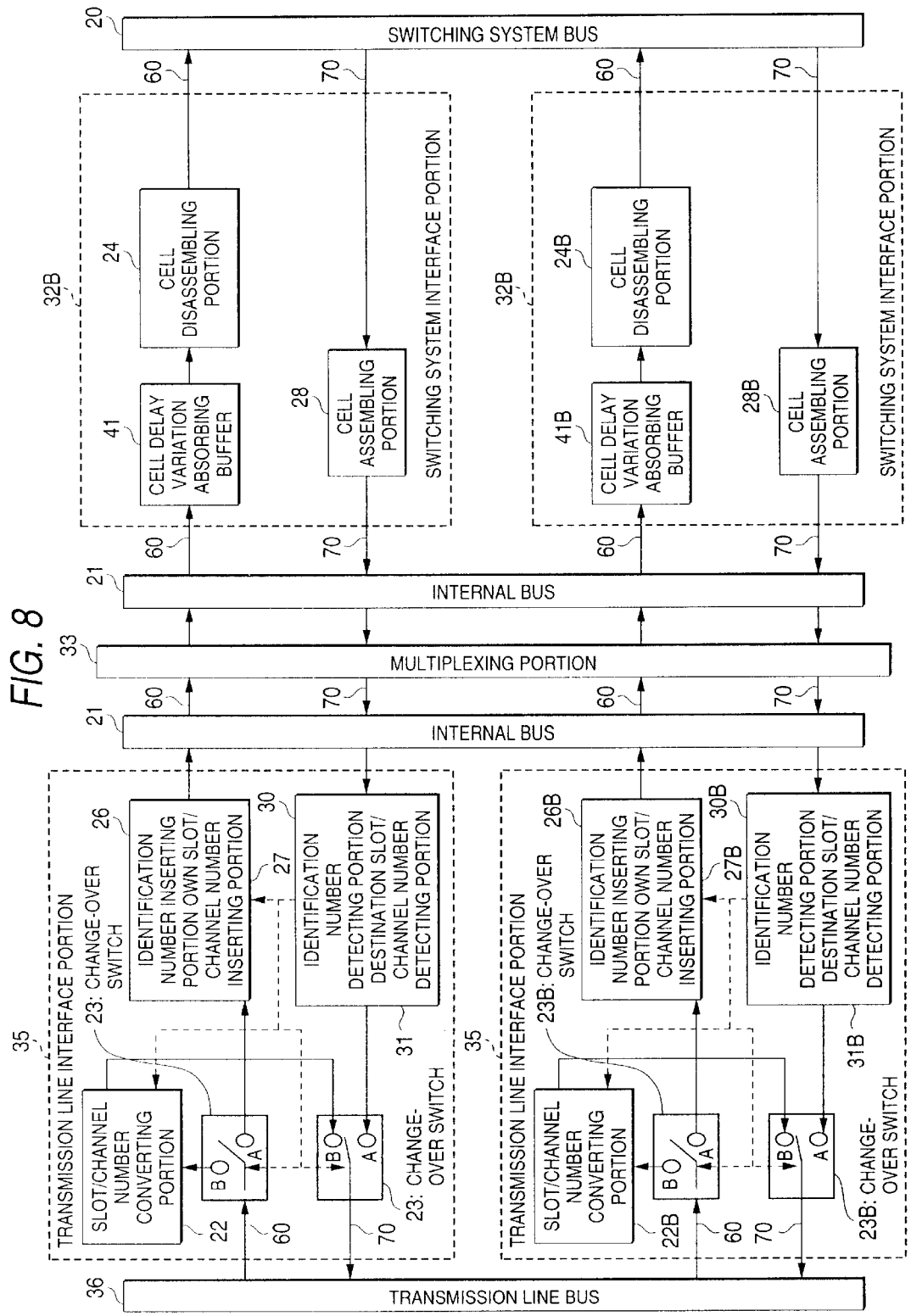
FIG. 8 is a block diagram showing a partially schematic configuration of an audio transmission system of an audio band signal transmission system according to a sixth embodiment.

FIG. 8 is a block diagram showing a partially schematic configuration of an audio transmission system of an audio band signal transmission system according to a sixth embodiment. The sixth embodiment corresponds to an audio band signal transmission system set forth in the first and seventh aspects of the invention. In this case, in the sixth embodiment, the same references are affixed to constituent parts which are overlapped with those in the audio band signal transmission system according to the fifth embodiment, and their redundant explanation of the overlapped configuration and operation will be omitted hereunder.

The audio transmission system shown in FIG. 8 is different from the audio transmission system shown in FIG. 7 in that the switching system interface portion 32 is replaced by a switching system interface portion 32B which does not include the audio compressed decoding portion 25 and the audio compressed coding portion 29.

If the audio band signal is not compressed in this manner, the identification number inserting portion 26 (26B) can insert the connection identification number for own connection by using the cell area to such an extent that no problem is caused in reproduction of the audio, as shown in FIG. 19.

According to the sixth embodiment, when the destination slot/channel number detecting portion 31 (31B) detects own slot/channel number supplied from other own slot/channel number inserting portion 27B (27), such destination slot/channel number detecting portion 31 (31B) confirms that the communication path for own connection is extended over "the audio transmission system 10, the switching system 1, and the audio transmission system 10" in sequence, and then corrects the routine before the audio band signal cell which is to be transmitted to the switching system 1 via the up line 60 for own connection is input into the identification number inserting portion 26 which corresponds to this connection. Therefore, the audio band signal cell can be transmitted via the down line 70 corresponding to this own connection, without the intervention of the internal bus 21, the multiplexing portion 33, the internal bus 21, the switching system interface portion 32B, the switching system bus 20, and the switching system 1. As a result, since useless processes such as the cell multiplexing process performed by the multiplexing portion 33, the cell delay variation absorbing process, the cell disassembling/assembling processes, etc. performed in the switching system interface portion 32B, the process performed in the switching system 1, etc. can be omitted, the process delay time of the audio band signal can be suppressed to the lowest minimum among the audio transmission systems (first to fourth embodiments) to which the present invention is applied and also degradation of the audio quality can be prevented without fail.

Embodiment 7

Figure 9:
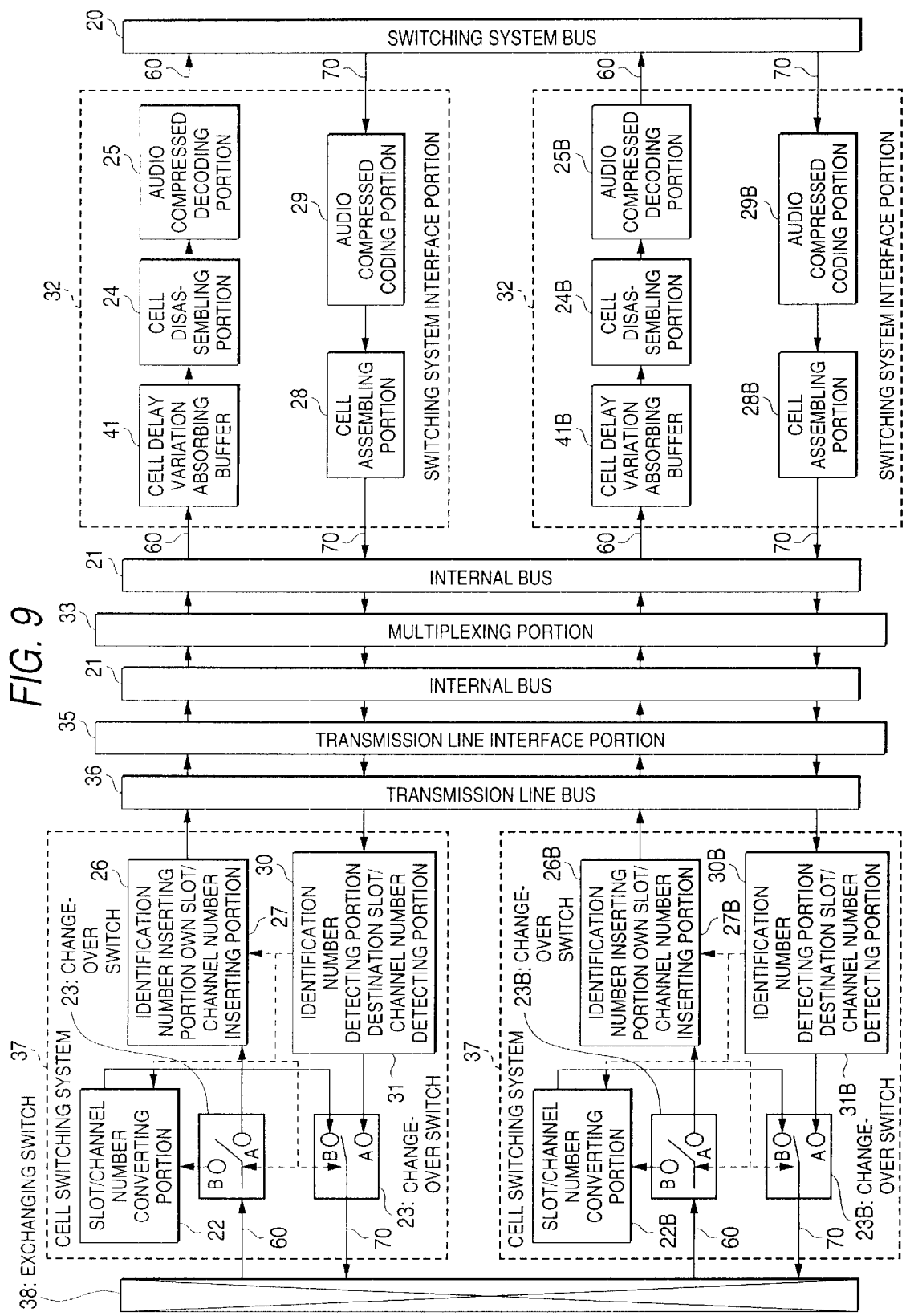
FIG. 9 is a block diagram showing a partially schematic configuration of an audio transmission system of an audio band signal transmission system according to a seventh embodiment.

FIG. 9 is a block diagram showing a partially schematic configuration of an audio transmission system and a cell switching system of an audio band signal transmission system according to a seventh embodiment. The seventh embodiment corresponds to an audio band signal transmission system set forth in the first and tenth aspect of the invention. In this case, in the seventh embodiment, the same references are affixed to constituent parts which are overlapped with those in the audio band signal transmission system according to the first embodiment, and their redundant explanation of the overlapped configuration and operation will be omitted hereunder.

The audio band signal transmission system shown in FIG. 9 is different from the audio band signal transmission system shown in FIG. 3 in that, in the audio transmission system shown in FIG. 3, the identification number inserting portion 26 (26B) having the own slot/channel number inserting portion 27 (27B), the identification number detecting portion 30 (30B) having the destination slot/channel number detecting portion 31 (31B), the slot/channel number converting portion 22 (22B), and the change-over switch 23 (23B) are provided in the multiplexing portion 33 of the audio transmission system 10 to achieve the audio band signal transmission system whereas, in the audio band signal transmission system shown in FIG. 9, the identification number inserting portion 26 (26B) having the own slot/channel number inserting portion 27 (27B), the identification number detecting portion 30 (30B) having the destination slot/channel number detecting portion 31 (31B), the slot/channel number converting portion 22 (22B), and the change-over switch 23 (23B) are provided in the cell switching system 37 instead of the multiplexing portion 33 to achieve the audio band signal transmission system.

In the cell switching system 37 shown in FIG. 9, the switching system 38 which applies the cell switching process is arranged, and the change-over switch 23 (23B) and the identification number inserting portion 26 (26B) are arranged on the up line 60 which is connected to the switching system 38, and then the identification number inserting portion 26 (26B) is connected to the transmission line bus 36 in the audio transmission system 10.

Also, the change-over switch 23 (23B) and the identification number detecting portion 30 (30B) are arranged on the down line 70, and then the identification number detecting portion 30 (30B) is connected to the transmission line bus 36.

Next, operations of the cell switching system 37 and the audio transmission system 10 in the audio band signal transmission system according to the seventh embodiment will be explained hereunder.

In the initial state of the cell switching system 37 shown in FIG. 9, the change-over switches 23 arranged on the up line 60 and the down line 70 are switched to the contact A side respectively.

In other words, the identification number inserting portion 26 arranged on the up line 60 inserts own connection identification number into a part of the cell which is transmitted from the exchanging switch 38 via the up line 60.

The cell into which the connection identification number is inserted in this fashion is transmitted in sequence to the transmission line bus 36, the transmission line interface portion 35, the internal bus 21, the multiplexing portion 33, the internal bus 21, the cell delay variation absorbing buffer 41, the cell disassembling portion 24, the audio compressed decoding portion 25, the switching system bus 20, and the switching system 1 via the up line 60. Then, the audio data which are passed through the switching system 1 are transmitted in sequence to the switching system bus 20, the audio compressed coding portion 29B, the cell assembling portion 28B, the internal bus 21, the multiplexing portion 33, the internal bus 21, the transmission line interface portion 35, the transmission line bus 36, and the identification number detecting portion 30B via the down line 70.

At this time, the identification number detecting portion 30B detects whether or not the connection identification number is contained in the cell, and then transmits the cell to the exchanging switch 38 via the change-over switch 23B.

Then, when the identification number detecting portion 30B detects the connection identification number which is inserted by the identification number inserting portion 26 in the event that the audio transmission systems 10 (connections) are connected by the switching system 1, such identification number detecting portion 30B instructs the own slot/channel number inserting portion 27B to output own slot/channel number to other destination slot/channel number detecting portion 31 corresponding to the connection identification number.

When the destination slot/channel number detecting portion 31 detects own slot/channel number supplied from the own slot/channel number inserting portion 27B, it confirms that the communication path for own connection is extended over "the cell switching system 37, the audio transmission system 10, the switching system 1, the audio transmission system 10, and the cell switching system 37" in sequence, then informs the slot/channel number converting portion 22, which corresponds to own connection, of own slot/channel number, and then sets the change-over switch 23 to the contact B side.

After the change-over switch 23 has been set to the contact B side, the cell which is transmitted from the exchanging switch 38 via the up line 60 can be transmitted without the intervention of the transmission line bus 36, the transmission line interface portion 35, the internal bus 21, the multiplexing portion 33, the internal bus 21, the switching system interface portion 32, the switching system bus 20, and the switching system 1 since such cell can be passed through a routine which consists of the change-over switch 23 arranged on the up line 60, the slot/channel number converting portion 22, the change-over switch 23 arranged on the down line 70, and the exchanging switch 38. More particularly, in addition to the processes performed in both the switching system bus 20 and the switching system 1, the cell transmitting process in the transmission line interface portion 35, the cell multiplexing process in the multiplexing portion 33, the cell delay variation absorbing process performed by the cell delay variation absorbing buffer 41, the cell disassembling/assembling processes performed by the cell disassembling portion 24 and the cell assembling portion 28, and the audio compressed decoding/coding processes performed by the audio compressed decoding portion 25 and the audio compressed coding portion 29 in the switching system interface portion 32 are not applied to the cell.

According to the seventh embodiment, when the destination slot/channel number detecting portion 31 (31B) detects own slot/channel number supplied from other own slot/channel number inserting portion 27B (27), it confirms that the communication path for own connection is extended over "the cell switching system 37, the audio transmission system 10, the switching system 1, the audio transmission system 10, and the cell switching system 37" in sequence, and then corrects the routine of the audio band signal which is transmitted from the up line 60 for own connection. Therefore, the audio band signal can be transmitted over the down line 70 without the intervention of the audio transmission system 10 and the switching system 1. As a result, since useless processes such as the cell transmitting process, the cell multiplexing process, the cell delay variation absorbing process, the cell disassembling/assembling processes, and the audio compressed decoding/coding processes in the audio transmission system 10, the process in the switching system 1, etc. can be omitted, the delay time of the audio band signal can be suppressed to the lowest minimum among the audio band signal transmission system to which the present invention is applied and also degradation of the audio quality can be prevented surely.

Embodiment 8

Figure 10:
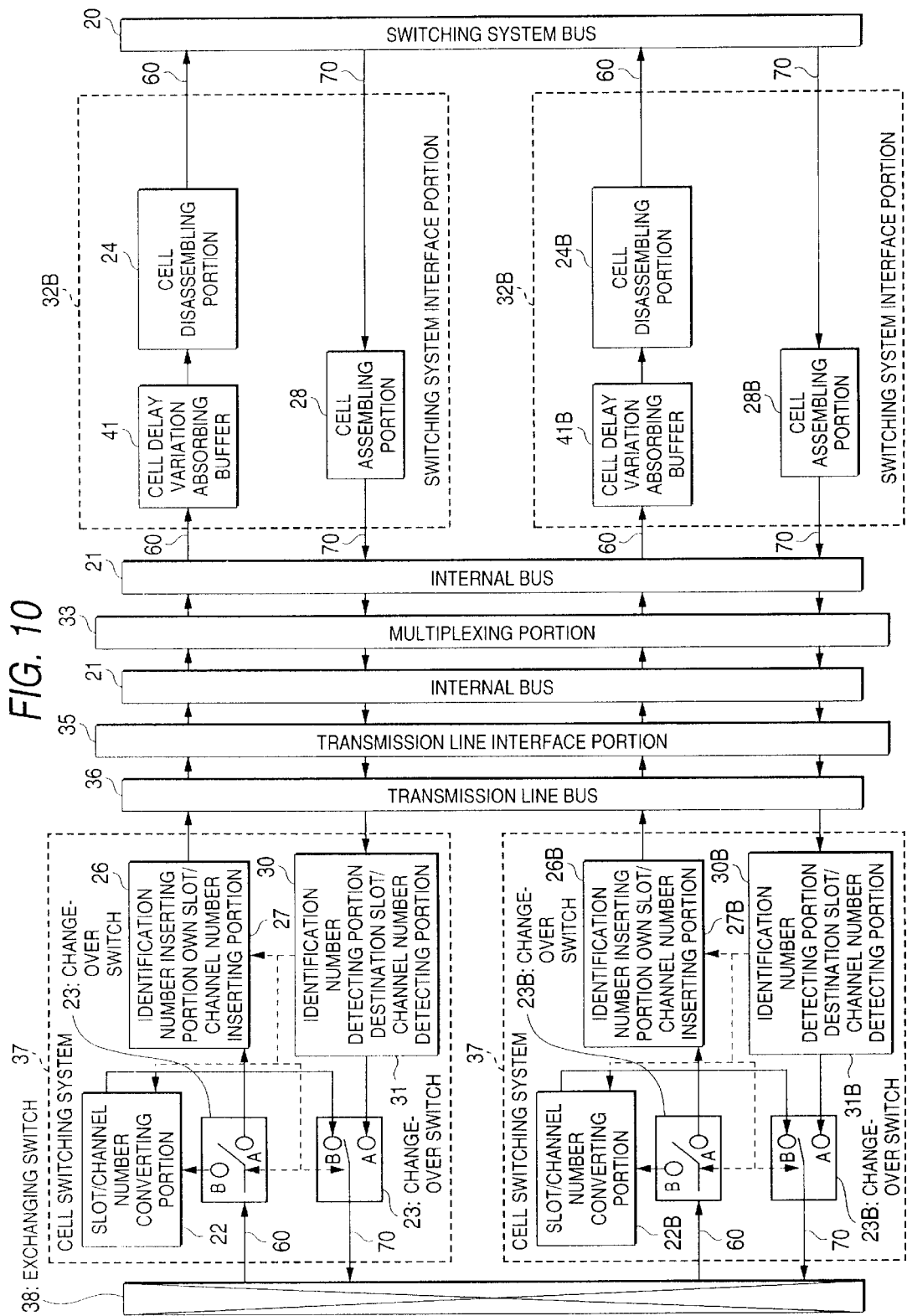
FIG. 10 is a block diagram showing a partially schematic configuration of an audio transmission system of an audio band signal transmission system according to an eighth embodiment.

FIG. 10 is a block diagram showing a partially schematic configuration of an audio transmission system of an audio band signal transmission system according to an eighth embodiment. The eighth embodiment corresponds to an audio band signal transmission system set forth in the first and nineth aspect of the invention. In this case, in the eighth embodiment, the same references are affixed to constituent parts which are overlapped with those in the audio band signal transmission system according to the seventh embodiment, and their redundant explanation of the overlapped configuration and operation will be omitted hereunder.

The audio band signal transmission system shown in FIG. 10 is different from the audio band signal transmission system shown in FIG. 9 in that the switching system interface portion 32 is replaced by a switching system interface portion 32B which does not include the audio compressed decoding portion 25 and the audio compressed coding portion 29.

If the audio band signal is not compressed in this manner, the identification number inserting portion 26 (26B) can insert the connection identification number for own connection by using the cell area to such an extent that no problem is caused in reproduction of the audio, as shown in FIG. 19.

According to the eighth embodiment, when the destination slot/channel number detecting portion 31 (31B) detects own slot/channel number supplied from other own slot/channel number inserting portion 27B (27), it confirms that the communication path for own connection is extended over "the cell switching system 37, the audio transmission system 10, the switching system 1, the audio transmission system 10, and the cell switching system 37" in sequence, and then corrects the routine of the audio band signal which transmitted from the up line 60 for own connection. Therefore, the audio band signal can be transmitted to the down line 70 without the intervention of the audio transmission system 10 and the switching system 1. As a result, since useless processes such as the cell transmitting process, the cell multiplexing process, the cell delay variation absorbing process, the cell disassembling/assembling processes in the audio transmission system 10, the process performed in the switching system 1, etc. can be omitted, the delay time of the audio band signal can be suppressed to the lowest minimum among the audio band signal transmission systems to which the present invention is applied and also degradation of the audio quality can be prevented without fail.

Embodiment 9

Figure 11:
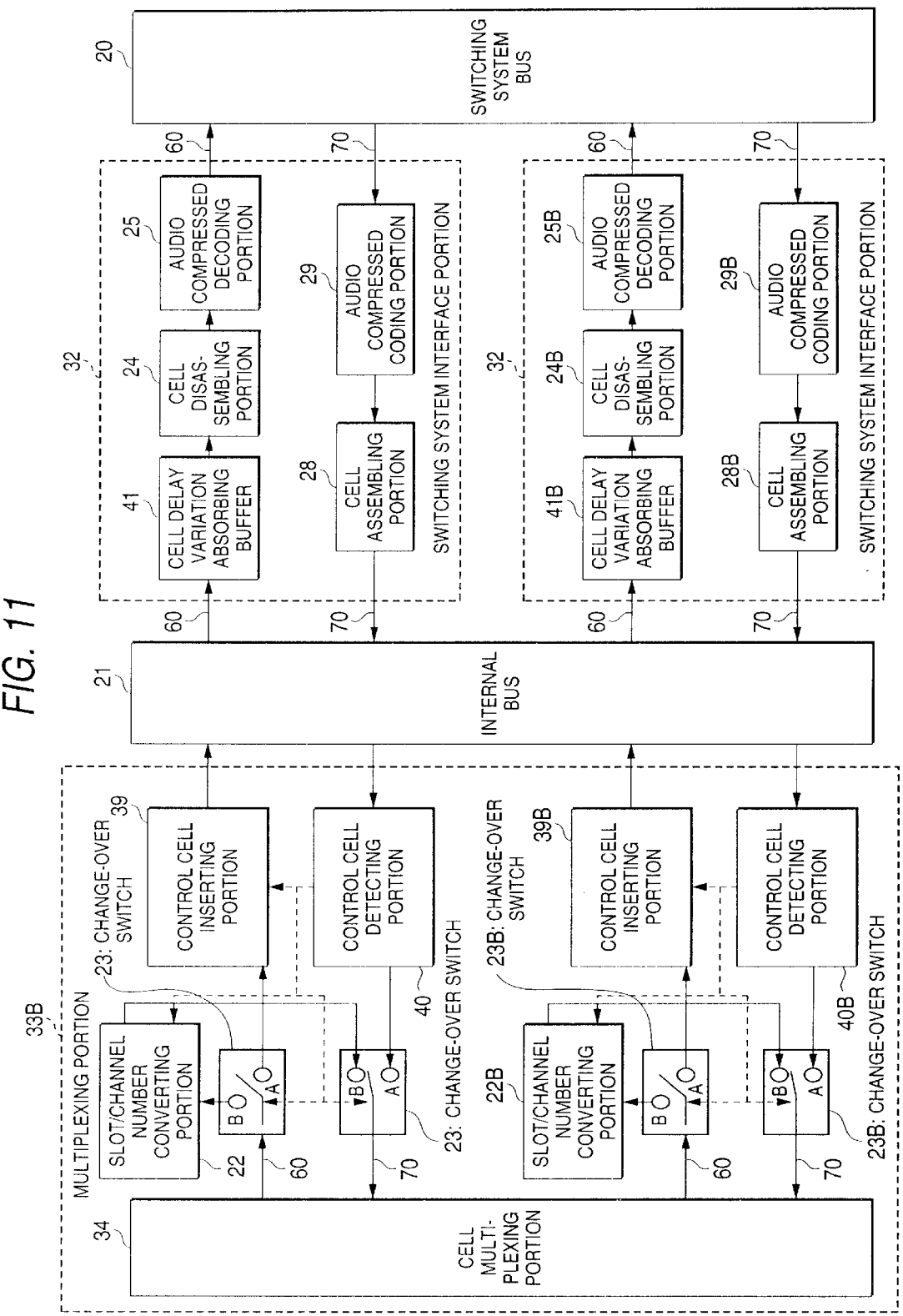
FIG. 11 is a block diagram showing a partially schematic configuration of an audio transmission system of an audio band signal transmission system according to a ninth embodiment.

FIG. 11 is a block diagram showing a partially schematic configuration of an audio transmission system of an audio band signal transmission system according to a ninth embodiment. The ninth embodiment corresponds to an audio band signal transmission system set forth in the eleventh and fourteenth aspects of the invention. In this case, in the ninth embodiment, the same references are affixed to constituent parts which are overlapped with those in the audio band signal transmission system according to the first embodiment, and their redundant explanation of the overlapped configuration and operation will be omitted hereunder.

The audio band signal transmission system shown in FIG. 11 is different from the audio band signal transmission system shown in FIG. 3 in that the multiplexing portion 33B in which the identification number inserting portion 26 (26B) is replaced by a control cell inserting portion 39 (39B) and also the identification number detecting portion 30 (30B) is replaced by a control cell detecting portion 40, (40B) is provided.

The control cell inserting portion 39 (39B) is provided for every connection. The control cell inserting portion 39 (39B) transmits a control cell separately from the audio band signal cell which is transmitted to the switching system 1 via the up line 60 for own connection. Such control cell is paired with the audio band signal cell, and contains own connection identification number.

The control cell detecting portion 40 (40B) is provided for every connection. The control cell detecting portion 40 (40B) detects the control cell which is paired with the audio band signal cell being transmitted from the switching system 1 via the down line 70 for own connection and also detects the connection identification number contained in the control cell, and then instructs the control cell inserting portion 39 (39B) to output the control cell containing own slot/channel number to other control cell detecting portion 40B (40) which corresponds to the connection identification number.

In addition, when the control cell detecting portion 40B (40) detects own slot/channel number contained in the control cell supplied from other control cell inserting portion 39 (39B), it carries out a switching operation of the change-over switch 23B (23), and then informs the own slot/channel number converting portion 22 (22B) of the detected own slot/channel number as a predetermined control signal so as to execute the routine correction of the audio band signal cell obtained by this switching operation.

The own slot/channel number converting portion 22 (22B) is provided for every connection. In response to the slot/channel number which is contained in the control cell detected by the control cell detecting portion 40B (40), the own slot/channel number converting portion 22 (22B) corrects the routine before the audio band signal cell, which is transmitted from the cell multiplexing portion 34 to the switching system 1 via the up line 60 for own connection, is input into the control cell inserting portion 39 (39B) corresponding to this connection. Therefore, the audio band signal cell can be transmitted via the down line 70, which corresponds to own connection, without the intervention of the switching system 1 and the switching system interface portion 32.

In this case, a connection identification number cell transmitting portion set forth in eleventh aspect of the invention corresponds to the control cell inserting portion 39 (39B), a connection identification number cell detecting portion corresponds to the control cell detecting portion 40 (40B), and a routine correcting portion corresponds to the slot/channel number converting portion 22 (22B).

Figure 21:
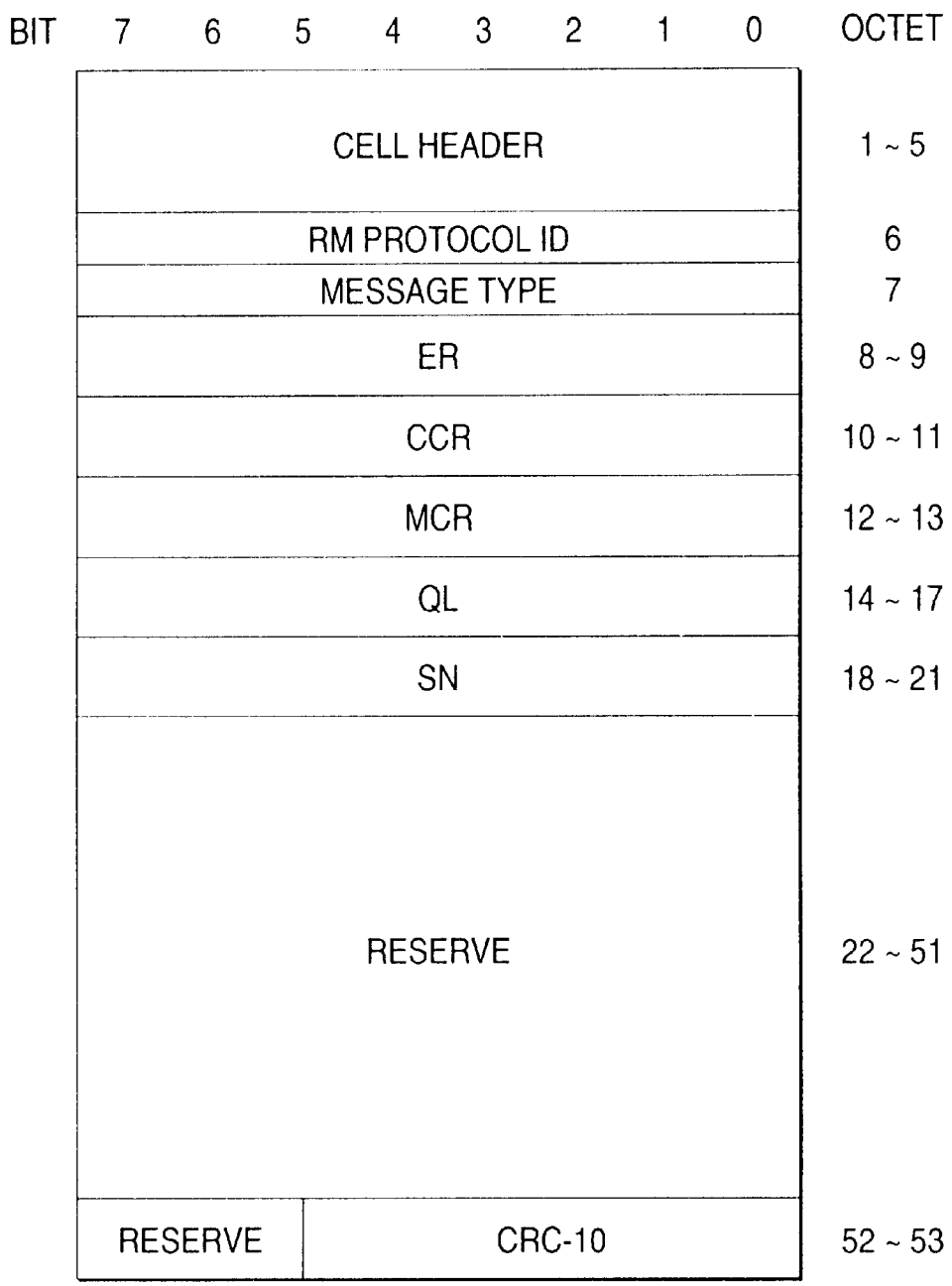
FIG. 21 is a view showing a cell format of a control cell.
Figure 22:
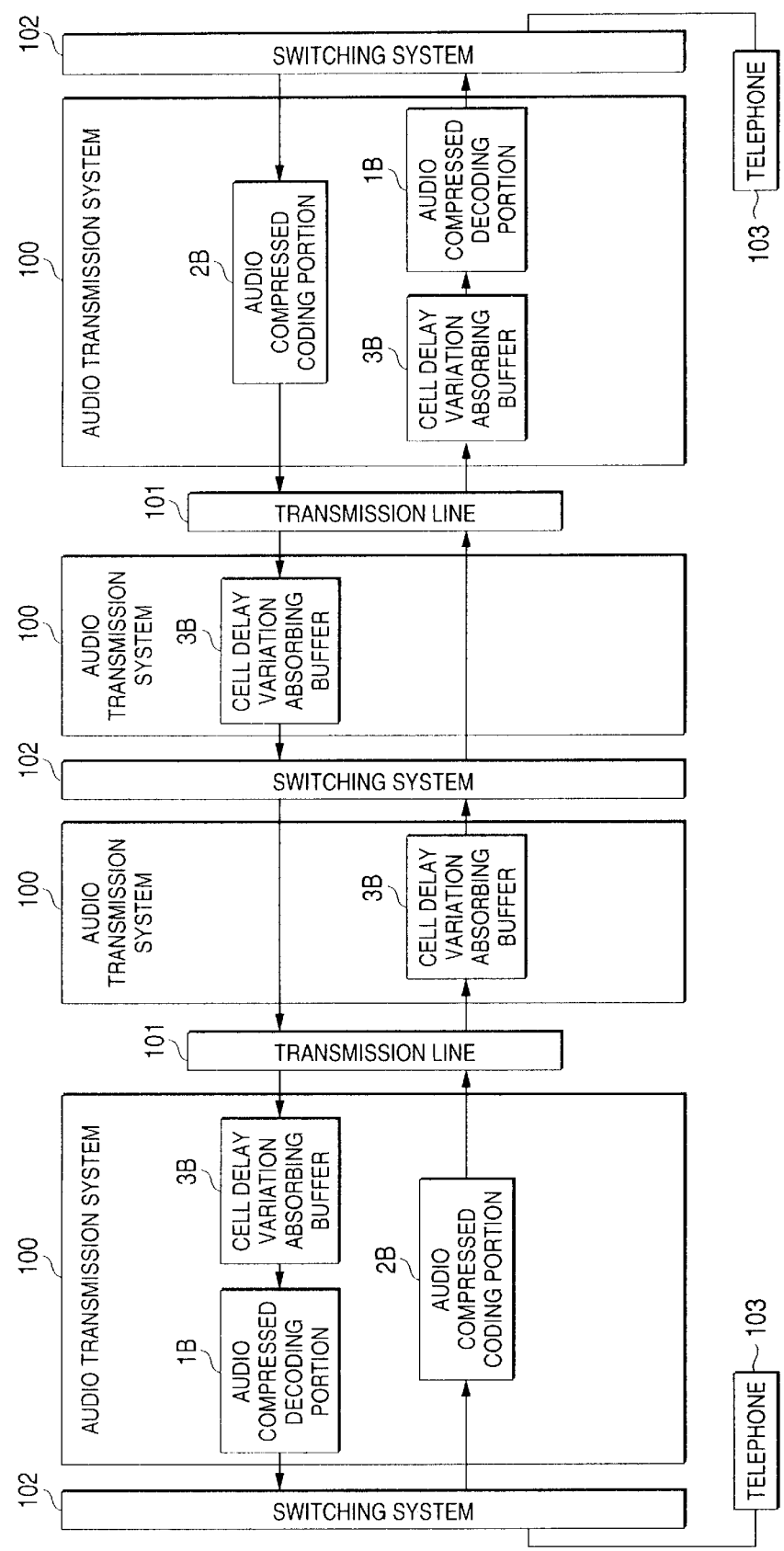
FIG. 22 is a block diagram showing an example of an audio band signal transmission system in the prior art.

An operation of the audio band signal transmission system according to the ninth embodiment will be explained hereunder. FIG. 21 shows a RM cell format of the control cell.

Like the first embodiment, in the initial state of the audio transmission system 10 shown in FIG. 11, the change-over switches 23 arranged on the up line 60 and the down line 70 are switched to the contact A side.

In other words, the control cell inserting portion 39 arranged on the up line 60 stores own connection identification number, which is paired with the cell, into a reserve area R of the control cell, as shown in FIG. 21, separately from the cell which is transmitted from the cell multiplexing portion 34 via the up line 60.

The control cell into which the connection identification number is inserted in this manner is transmitted in sequence to the internal bus 21, the cell delay variation absorbing buffer 41, the cell disassembling portion 24, the audio compressed decoding portion 25, the switching system bus 20, and the switching system 1 via the up line 60. Then, the audio data which are passed through the switching system 1 are transmitted in sequence to the switching system bus 20, the audio compressed coding portion 29B, the cell assembling portion 28B, the internal bus 21, and the control cell detecting portion 40B via the down line 70.

At this time, the control cell detecting portion 40B detects whether or not the connection identification number is contained in the control cell, and then transmits the cell to the cell multiplexing portion 34 via the change-over switch 23B.

Then, when the audio transmission systems 10 (connections) are connected by the switching system 1, i.e., when the control cell detecting portion 40B detects the connection identification number which is inserted by the control cell inserting portion 39, such control cell detecting portion 40B instructs the control cell inserting portion 39B to output the control cell containing own slot/channel number to other control cell detecting portion 40 which corresponds to this connection identification number.

When the control cell detecting portion 40 detects own slot/channel number contained in the control cell supplied from the control cell inserting portion 39B, it confirms that the communication path for own connection is extended over "the audio transmission system 10, the switching system 1, and the audio transmission system 10" in sequence, then informs the slot/channel number converting portion 22 which corresponds to own connection of own slot/channel number, and then sets the change-over switch 23 to the contact B side.

After the change-over switch 23 has been set to the contact B side, the cell which is transmitted from the cell multiplexing portion 34 via the up line 60 can be transmitted without the intervention of the internal bus 21, the switching system interface portion 32, the switching system bus 20, and the switching system 1 since such cell can be passed through a routine which consists of the change-over switch 23 arranged on the up line 60, the slot/channel number converting portion 22, the change-over switch 23 arranged on the down line 70, and the cell multiplexing portion 34. More particularly, the cell can be transmitted not to receive the cell delay variation absorbing process performed by the cell delay variation absorbing buffer 41, the cell disassembling/assembling processes performed by the cell disassembling portion 24 and the cell assembling portion 28, and the audio compressed decoding/coding processes performed by the audio compressed decoding portion 25 and the audio compressed coding portion 29 in the switching system interface portion 32.

According to the ninth embodiment, when the control cell detecting portion 40 detects own slot/channel number contained in the control cell supplied from other control cell inserting portion 39B (39), it confirms that the communication path for own connection is extended over "the audio transmission system 10, the switching system 1, and the audio transmission system 10" in sequence, and then corrects the routine before the audio band signal cell, which is transmitted to the switching system 1 via the up line 60 for own connection, is input into the control cell inserting portion 39 (39B) which corresponds to this connection. Therefore, the audio band signal cell can be transmitted over the down line 70 which corresponds to own connection, without the intervention of the internal bus 21, the switching system interface portion 32, the switching system bus 20, and the switching system 1. As a result, since useless processes such as the cell delay variation absorbing process, the cell disassembling/assembling processes, and the audio compressed decoding/coding processes in the switching system interface portion 32, the process in the switching system 1, etc. can be omitted, the process delay time can be suppressed to the lowest minimum without degradation of the audio quality of the audio band signal.

Embodiment 10

Figure 12:
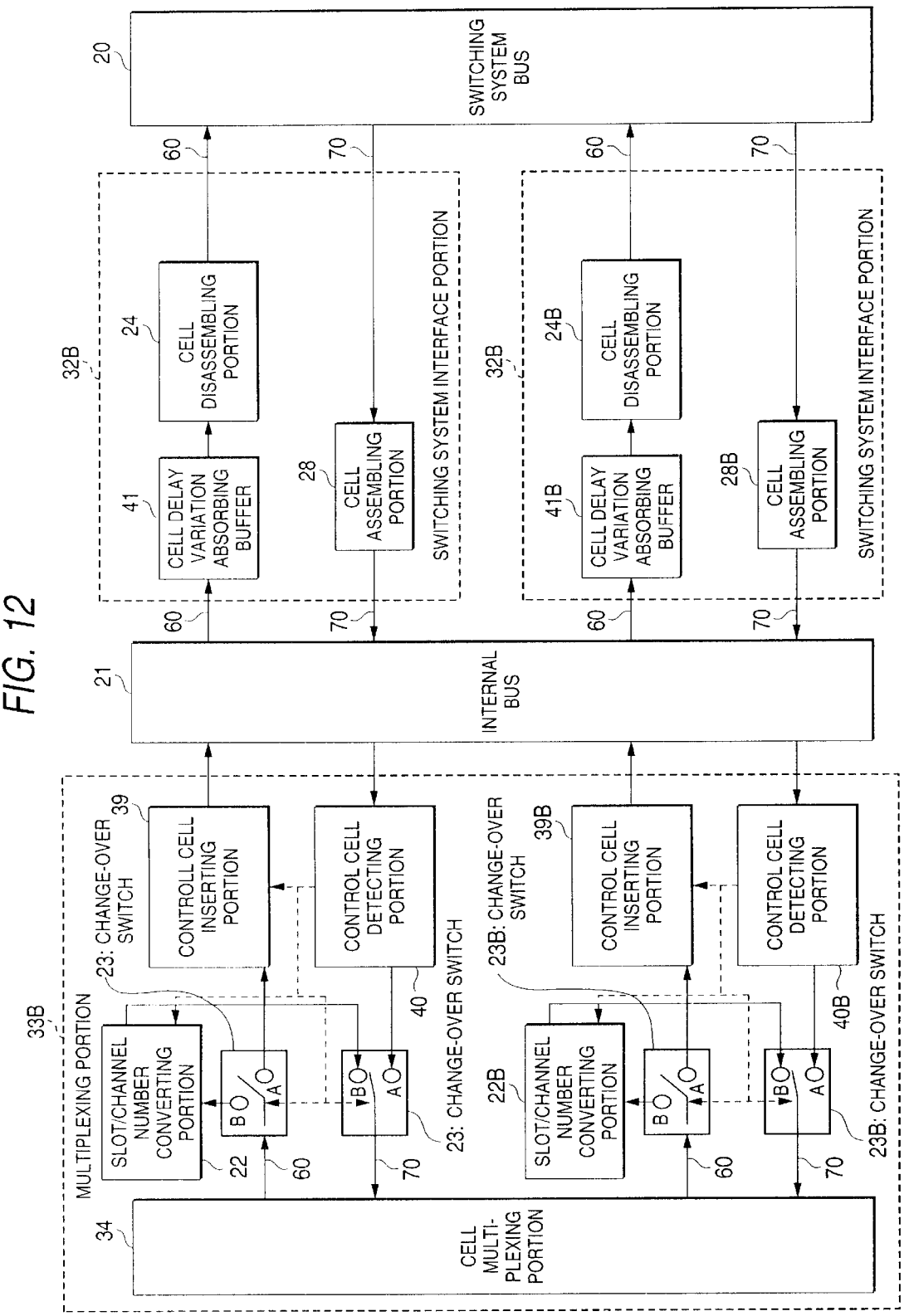
FIG. 12 is a lock diagram showing a partially schematic configuration of an audio transmission system of an audio band signal transmission system according to a tenth embodiment.

FIG. 12 is a block diagram showing a partially schematic configuration of an audio transmission system of an audio band signal transmission system according to a tenth embodiment. The tenth embodiment corresponds to an audio band signal transmission system set forth in the eleventh and thirteenth aspects of the invention. In this case, in the tenth embodiment, the same references are affixed to constituent parts which are overlapped with those in the audio band signal transmission system according to the ninth embodiment, and their redundant explanation of the overlapped configuration and operation will be omitted hereunder.

The audio transmission system shown in FIG. 12 is different from the audio transmission system shown in FIG. 11 in that the switching system interface portion 32 is replaced by the switching system interface portion 32B which does not include the audio compressed decoding portion 25 and the audio compressed coding portion 29.

According to the tenth embodiment, when the control cell detecting portion 40 (40B) detects own slot/channel number contained in the control cell supplied from other control cell inserting portion 39B (39), it confirms that the communication path for own connection is extended over "the audio transmission system 10, the switching system 1, and the audio transmission system 10" in sequence, and then corrects the routine before the audio band signal cell, which is transmitted to the switching system 1 via the up line 60 for own connection, is input into the control cell inserting portion 39 (39B) which corresponds to this connection. Therefore, the audio band signal cell can be transmitted over the down line 70 which corresponds to own connection, without the intervention of the internal bus 21, the switching system interface portion 32B, the switching system bus 20, and the switching system 1. As a consequence, since wasteful processes such as the cell delay variation absorbing process and the cell disassembling/assembling processes in the switching system interface portion 32B, the process in the switching system 1, etc. can be omitted, the process delay time can be suppressed to the lowest minimum without degradation of the audio quality of the audio band signal.

Embodiment 11

Figure 13:
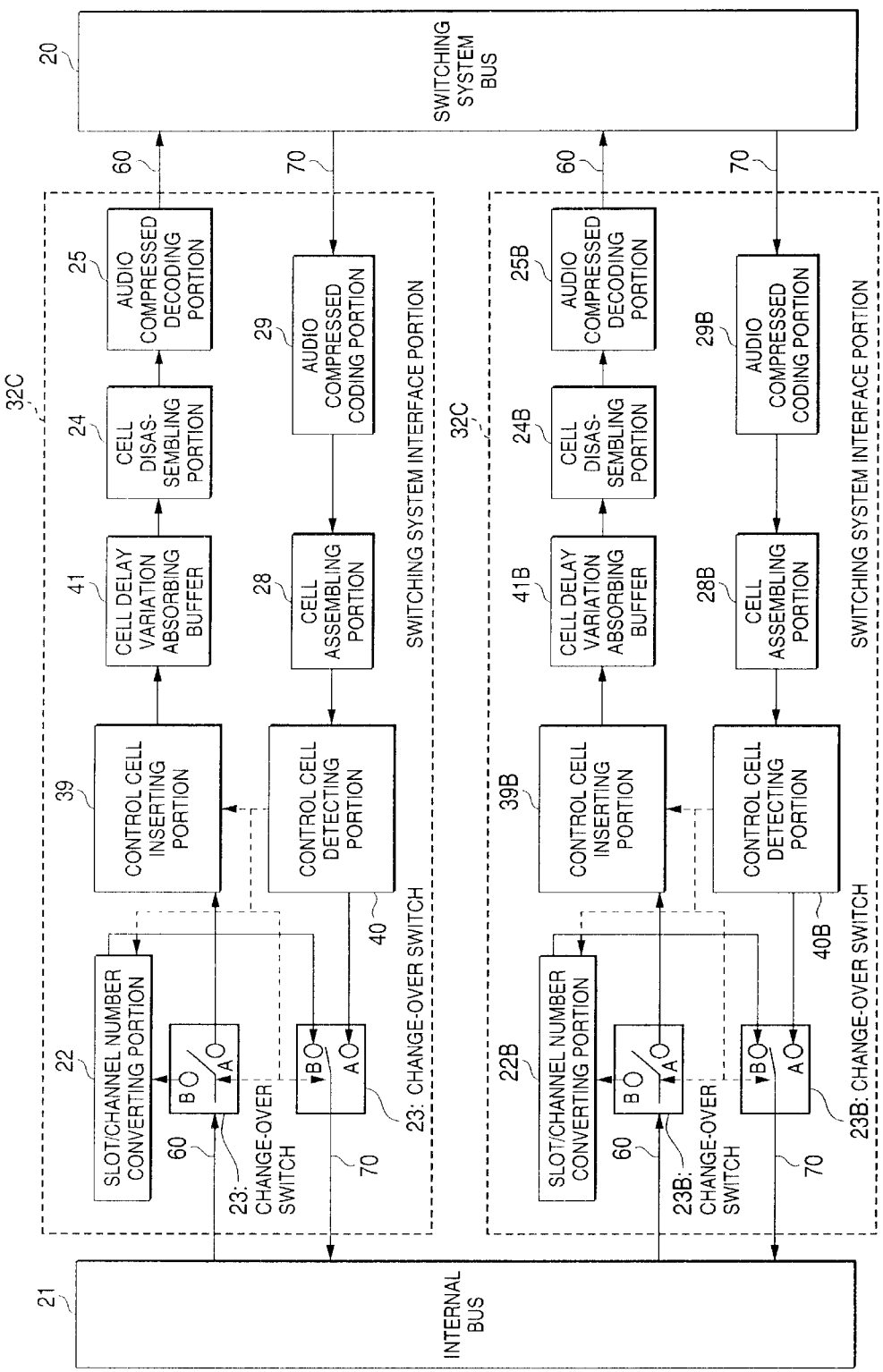
FIG. 13 is a block diagram showing a partially schematic configuration of an audio transmission system of an audio band signal transmission system according to an eleventh embodiment.

FIG. 13 is a block diagram showing a partially schematic configuration of an audio transmission system of an audio band signal transmission system according to an eleventh embodiment. The eleventh embodiment corresponds to an audio band signal transmission system set forth in the eleventh and sixteenth aspects of the invention. In this case, in the eleventh embodiment, the same references are affixed to constituent parts which are overlapped with those in the audio band signal transmission system according to the ninth embodiment, and their redundant explanation of the overlapped configuration and operation will be omitted hereunder.

The audio transmission system shown in FIG. 13 is different from the audio transmission system shown in FIG. 11 in that, in the audio transmission system shown in FIG. 11, the control cell inserting portion 39 (39B), the control cell detecting portion 40 (40B), the slot/channel number converting portion 22 (22B), and the change-over switch 23 (23B) are provided in the multiplexing portion 33B to achieve the audio band signal transmission system whereas, in the audio transmission system shown in FIG. 13, the switching system interface portion 32C which contains the control cell inserting portion 39 (39B), the control cell detecting portion 40 (40B), the slot/channel number converting portion 22 (22B), and the change-over switch 23 (23B) is provided instead of the multiplexing portion 33B to achieve the audio band signal transmission system.

In the switching system interface portion 32C of the audio transmission system shown in FIG. 13, the change-over switch 23 (23B), the control cell inserting portion 39 (39B), the cell delay variation absorbing buffer 41, the cell disassembling portion 24 (24B), and the audio compressed decoding portion 25 (25B) are arranged on the up line 60 which is connected to the internal bus 21 connected to the multiplexing portion 33 (not shown).

Also, in the switching system interface portion 32C, the change-over switch 23 (23B), the control cell detecting portion 40 (40B), the cell assembling portion 28 (28B), and the audio compressed coding portion 29 (29B) are arranged on the down line 70.

Next, an operation of the audio band signal transmission system according to the eleventh embodiment will be explained hereunder.

When the audio transmission systems 10 (connections) are connected by the switching system 1, i.e., when the control cell detecting portion 40B detects the connection identification number which is inserted by the control cell inserting portion 39, such control cell detecting portion 40B instructs the control cell inserting portion 39B to output the control cell containing own slot/channel number to other control cell detecting portion 40 which corresponds to this connection identification number.

When the control cell detecting portion 40 detects own slot/channel number contained in the control cell supplied from the control cell inserting portion 39B, it confirms that the communication path for own connection is extended over "the audio transmission system 10, the switching system 1, and the audio transmission system 10" in sequence, then informs the slot/channel number converting portion 22, which corresponds to own connection, of own slot/channel number, and then sets the change-over switch 23 to the contact B side.

After the change-over switch 23 has been set to the contact B side, the cell which is transmitted from the cell multiplexing portion 34 via the internal bus 21 over the up line 60 can be transmitted without the intervention of the cell delay variation absorbing buffer 41, the cell disassembling portion 24 and the cell assembling portion 28, and the audio compressed decoding portion 25 and the audio compressed coding portion 29 in the switching system interface portion 32C, the switching system bus 20, and the switching system 1 because such cell can be passed through a routine which consists of the change-over switch 23 arranged on the up line 60, the slot/channel number converting portion 22, the change-over switch 23 arranged on the down line 70, and the internal bus 21. More particularly, the cell can be transmitted not to accept the cell delay variation absorbing process performed by the cell delay variation absorbing buffer 41, the cell disassembling/assembling processes performed by the cell disassembling portion 24 and the cell assembling portion 28, and the audio compressed decoding/coding processes performed by the audio compressed decoding portion 25 and the audio compressed coding portion 29 in the switching system interface portion 32.

According to the eleventh embodiment, when the control cell detecting portion 40 (40B) detects own slot/channel number contained in the control cell supplied from other control cell inserting portion 39B (39), it confirms that the communication path for own connection is extended over "the audio transmission system 10, the switching system 1, and the audio transmission system 10" in sequence, and then corrects the routine before the audio band signal cell, which is transmitted to the switching system 1 via the up line 60 for own connection, is input into the control cell inserting portion 39 (39B) which corresponds to this connection. Therefore, the audio band signal cell can be transmitted over the down line 70 which corresponds to own connection, without the intervention of the cell delay variation absorbing buffer 41, the cell disassembling portion 24 and the cell assembling portion 28, and the audio compressed decoding portion 25 and the audio compressed coding portion 29 in the switching system interface portion 32C, the switching system bus 20, and the switching system 1. As a result, since useless processes such as the cell delay variation absorbing process, the cell disassembling/assembling processes, and the audio compressed decoding/coding processes in the switching system interface portion 32C, the process in the switching system 1, etc. can be omitted, the process delay time can be suppressed to the lowest minimum without degradation of the audio quality of the audio band signal.

In addition, if this function is attached to the switching system interface portion 32C in place of the multiplexing portion 33 serving as a control system of the audio band signal transmission system, the switching system interface portion 32C can be disconnected easily from the system at the time of failure or maintenance.

Embodiment 12

Figure 14:
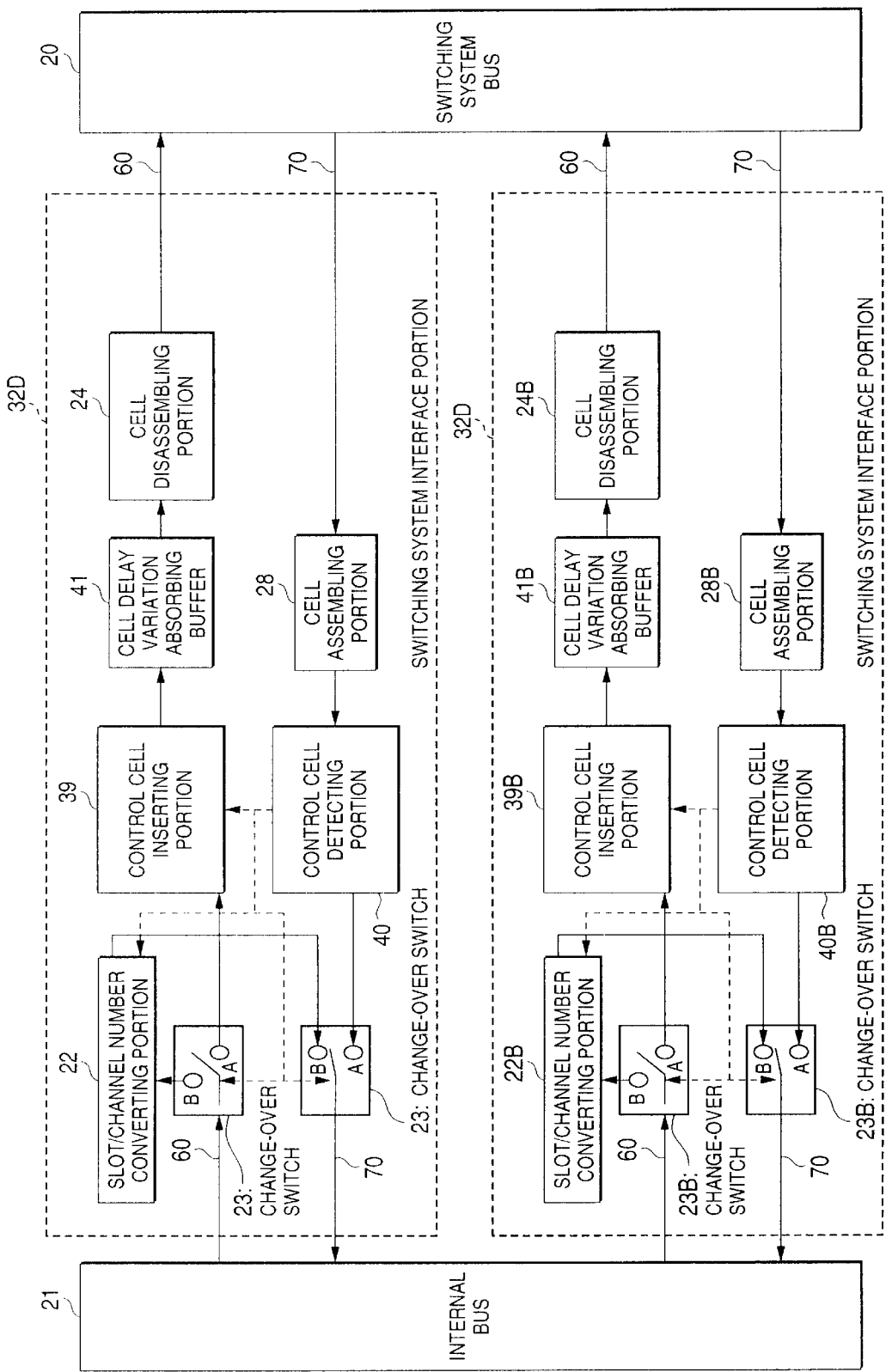
FIG. 14 is a block diagram showing a partially schematic configuration of an audio transmission system of an audio band signal transmission system according to a twelfth embodiment.

FIG. 14 is a block diagram showing a partially schematic configuration of an audio transmission system of an audio band signal transmission system according to a twelfth embodiment. The twelfth embodiment corresponds to an audio band signal transmission system set forth in eleventh and fifteenth aspects of the invention. In this case, in the twelfth embodiment, the same references are affixed to constituent parts which are overlapped with those in the audio band signal transmission system according to the eleventh embodiment, and their redundant explanation of the overlapped configuration and operation will be omitted hereunder.

The audio transmission system shown in FIG. 14 is different from the audio transmission system shown in FIG. 13 in that the switching system interface portion 32C is replaced by a switching system interface portion 32D which does not include the audio compressed decoding portion 25 and the audio compressed coding portion 29.

According to the twelfth embodiment, when the control cell detecting portion 40 (40B) detects own slot/channel number contained in the control cell supplied from other control cell inserting portion 39B (39), it confirms that the communication path for own connection is extended over "the audio transmission system 10, the switching system 1, and the audio transmission system 10" in sequence, and then corrects the routine before the audio band signal cell, which is transmitted to the switching system 1 via the up line 60 for own connection, is input into the control cell inserting portion 39 (39B) which corresponds to this connection. Therefore, the audio band signal cell can be transmitted over the down line 70 which corresponds to own connection, without the intervention of the cell disassembling portion 24 and the cell assembling portion 28 in the switching system interface portion 32D, the switching system bus 20, and the switching system 1. As a consequence, since useless processes such as the cell disassembling/assembling processes in the switching system interface portion 32D, the process in the switching system 1, etc. can be omitted, the process delay time can be suppressed to the lowest minimum without degradation of the audio quality of the audio band signal.

Furthermore, if this function is attached to the switching system interface portion 32D in place of the multiplexing portion 33 serving as a control system of the audio band signal transmission system, the switching system interface portion 32D can be disconnected easily from the system at the time of failure or maintenance.

Embodiment 13

Figure 15:
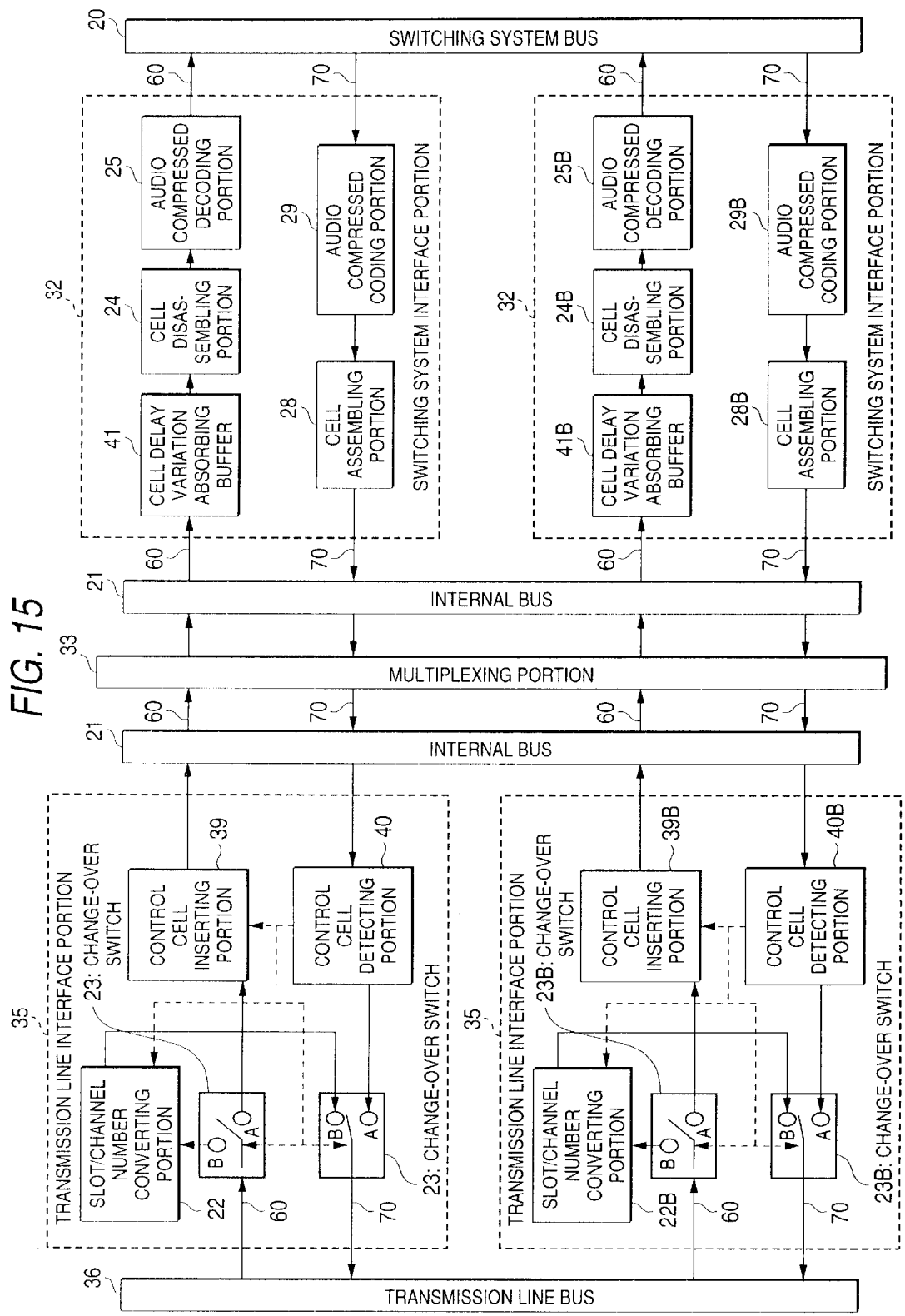
FIG. 15 is a block diagram showing a partially schematic configuration of an audio transmission system of an audio band signal transmission system according to a thirteenth embodiment.

FIG. 15 is a block diagram showing a partially schematic configuration of an audio transmission system of an audio band signal transmission system according to a thirteenth embodiment. The thirteenth embodiment corresponds to an audio band signal transmission system set forth in the eleventh and eighteenth aspects of the invention. In this case, in the thirteenth embodiment, the same references are affixed to constituent parts which are overlapped with those in the audio band signal transmission system according to the ninth embodiment, and their redundant explanation of the overlapped configuration and operation will be omitted hereunder.

The audio transmission system shown in FIG. 15 is different from the audio transmission system shown in FIG. 11 in that, in the audio transmission system shown in FIG. 11, the control cell inserting portion 39 (39B), the control cell detecting portion 40 (40B), the slot/channel number converting portion 22 (22B), and the change-over switch 23 (23B) are provided in the multiplexing portion 33B to achieve the audio band signal transmission system whereas, in the audio transmission system shown in FIG. 15, the control cell inserting portion 39 (39B), the control cell detecting portion 40 (40B), the slot/channel number converting portion 22 (22B), and the change-over switch 23 (23B) is provided in the transmission line interface portion 35B instead of the multiplexing portion 33B to achieve the audio band signal transmission system.

In the audio transmission system shown in FIG. 15, the change-over switch 23 (23B) and the control cell inserting portion 39 (39B) are arranged on the up line 60 which is connected to the transmission line bus 36 connected to the cell switching system 37 (not shown), and then the control cell inserting portion 39 (39B) is connected to the internal bus 21 which is connected to the multiplexing portion 33.

Also, the change-over switch 23 (23B) and the control cell detecting portion 40 (40B) are arranged on the down line 70, and then the control cell detecting portion 40 (40B) is connected to the internal bus 21 which is connected to the multiplexing portion 33.

Next, an operation of the audio band signal transmission system according to the thirteenth embodiment will be explained hereunder.

The control cell inserting portion 39 arranged on the up line 60 stores own connection identification number and own slot/channel number, which are paired with the cell, into the reserve area R of the control cell, as shown in FIG. 21, separately from the cell which is transmitted from the cell multiplexing portion 34 via the up line 60.

The control cell into which the connection identification number and the own slot/channel number are inserted in this manner is transmitted in sequence to the internal bus 21, the multiplexing portion 33, the internal bus 21, the cell delay variation absorbing buffer 41, the cell disassembling portion 24, the audio compressed decoding portion 25, the switching system bus 20, and the switching system 1 via the up line 60. Then, the audio data which are passed through the switching system 1 are transmitted in sequence to the switching system bus 20, the audio compressed coding portion 29B, the cell assembling portion 28B, the internal bus 21, the multiplexing portion 33, the internal bus 21, and the control cell detecting portion 40B via the down line 70.

At this time, the control cell detecting portion 40B detects whether or not the control cell which contains the connection identification number and the slot/channel number is contained in the cell, and then transmits the cell to the transmission line bus 36 via the change-over switch 23B.

Then, when the audio transmission systems 10 (connections) are connected by the switching system 1, i.e., when the control cell detecting portion 40B detects the connection identification number which is inserted by the control cell inserting portion 39, such control cell detecting portion 40B instructs the control cell inserting portion 39B to output the control cell containing own slot/channel number to other control cell detecting portion 40 which corresponds to this connection identification number.

When the control cell detecting portion 40 detects own slot/channel number contained in the control cell supplied from the control cell inserting portion 39B, it confirms that the communication path for own connection is extended over "the audio transmission system 10, the switching system 1, and the audio transmission system 10" in sequence, then informs the slot/channel number converting portion 22 which corresponds to own connection, and then sets the change-over switch 23 to the contact B side.

After the change-over switch 23 has been set to the contact B side, the cell which is transmitted from the transmission line bus 36 via the up line 60 can be transmitted without the intervention of the internal bus 21, the multiplexing portion 33, the internal bus 21, the switching system interface portion 32, the switching system bus 20, and the switching system 1 since such cell can be passed through a routine which consists of the change-over switch 23 arranged on the up line 60, the slot/channel number converting portion 22, the change-over switch 23 arranged on the down line 70, and the cell multiplexing portion 34. More particularly, the cell can be transmitted not to receive the cell multiplexing process in the multiplexing portion 33, and the cell delay variation absorbing process performed by the cell delay variation absorbing buffer 41, the cell disassembling/assembling processes performed by the cell disassembling portion 24 and the cell assembling portion 28, and the audio compressed decoding/coding processes performed by the audio compressed decoding portion 25 and the audio compressed coding portion 29 in the switching system interface portion 32.

According to the thirteenth embodiment, when the control cell detecting portion 40 (40B) detects own slot/channel number contained in the control cell supplied from other control cell inserting portion 39B (39), it confirms that the communication path for own connection is extended over "the audio transmission system 10, the switching system 1, and the audio transmission system 10" in sequence, and then corrects the routine before the audio band signal cell, which is transmitted to the switching system 1 via the up line 60 associated with own connection, is input into the control cell inserting portion 39 which corresponds to this connection. Therefore, the audio band signal cell can be transmitted over the down line 70 which corresponds to own connection, without the intervention of the internal bus 21, the multiplexing portion 33, the internal bus 21, the switching system interface portion 32, the switching system bus 20, and the switching system 1. As a result, since useless processes such as the cell multiplexing process in the multiplexing portion 33, the cell delay variation absorbing process, the cell disassembling/assembling processes, and the audio compressed decoding/coding processes in the switching system interface portion 32, the process in the switching system 1, etc. can be omitted, this thirteenth embodiment can deal with the delay of the audio band signal rather than the above-mentioned ninth to twelfth embodiments to achieve the present invention in the audio transmission system and also can prevent degradation of the audio quality without fail.

Embodiment 14

Figure 16:
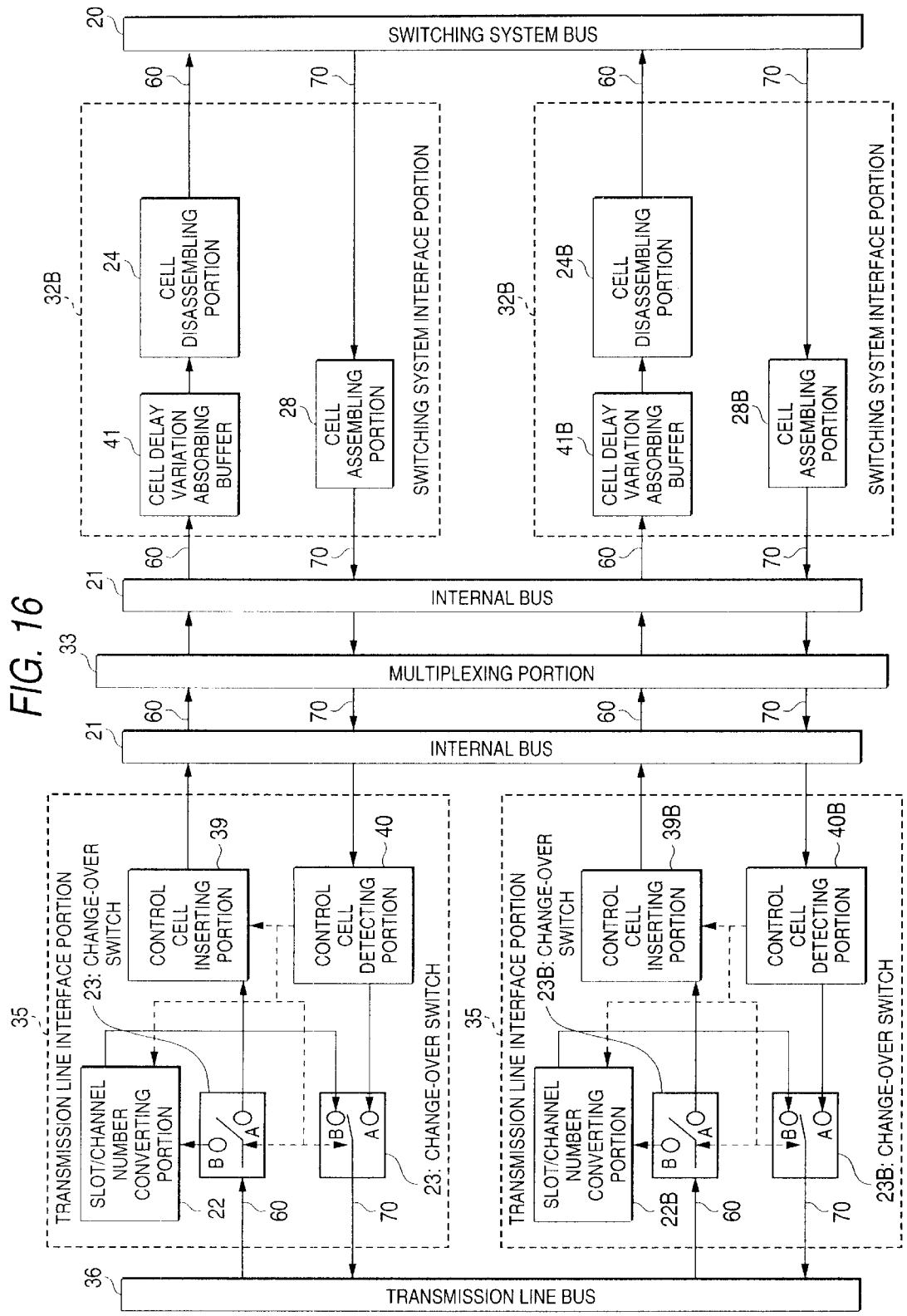
FIG. 16 is a block diagram showing a partially schematic configuration of an audio transmission system of an audio band signal transmission system according to a fourteenth embodiment.

FIG. 16 is a block diagram showing a partially schematic configuration of an audio transmission system of an audio band signal transmission system according to a fourteenth embodiment. The fourteenth embodiment corresponds to an audio band signal transmission system set forth in the eleventh and seventeenth aspects of the invention. In this case, in the fourteenth embodiment, the same references are affixed to constituent parts which are overlapped with those in the audio band signal transmission system according to the thirteenth embodiment, and their redundant explanation of the overlapped configuration and operation will be omitted hereunder.

The audio transmission system shown in FIG. 16 is different from the audio transmission system shown in FIG. 15 in that the switching system interface portion 32 is replaced by the switching system interface portion 32B which does not include the audio compressed decoding portion 25 and the audio compressed coding portion 29.

According to the fourteenth embodiment, when the control cell detecting portion 40 (40B) detects own slot/channel number contained in the control cell from other control cell inserting portion 39B (39), it confirms that the communication path for own connection is extended over "the audio transmission system 10, the switching system 1, and the audio transmission system 10" in sequence, and then corrects the routine before the audio band signal cell, which is transmitted to the switching system 1 via the up line 60 for own connection, is input into the control cell inserting portion 39 which corresponds to this connection. Therefore, the audio band signal cell can be transmitted over the down line 70 which corresponds to own connection, without the intervention of the internal bus 21, the multiplexing portion 33, the internal bus 21, the switching system interface portion 32B, the switching system bus 20, and the switching system 1. As a result, since useless processes such as the cell disassembling/assembling processes in the switching system interface portion 32D, the process in the switching system 1, etc. can be omitted, this fourteenth embodiment can deal with the delay of the audio band signal rather than the above-mentioned ninth to twelfth embodiments to achieve the present invention in the audio transmission system and also can prevent degradation of the audio quality firmly.

Embodiment 15

Figure 17:
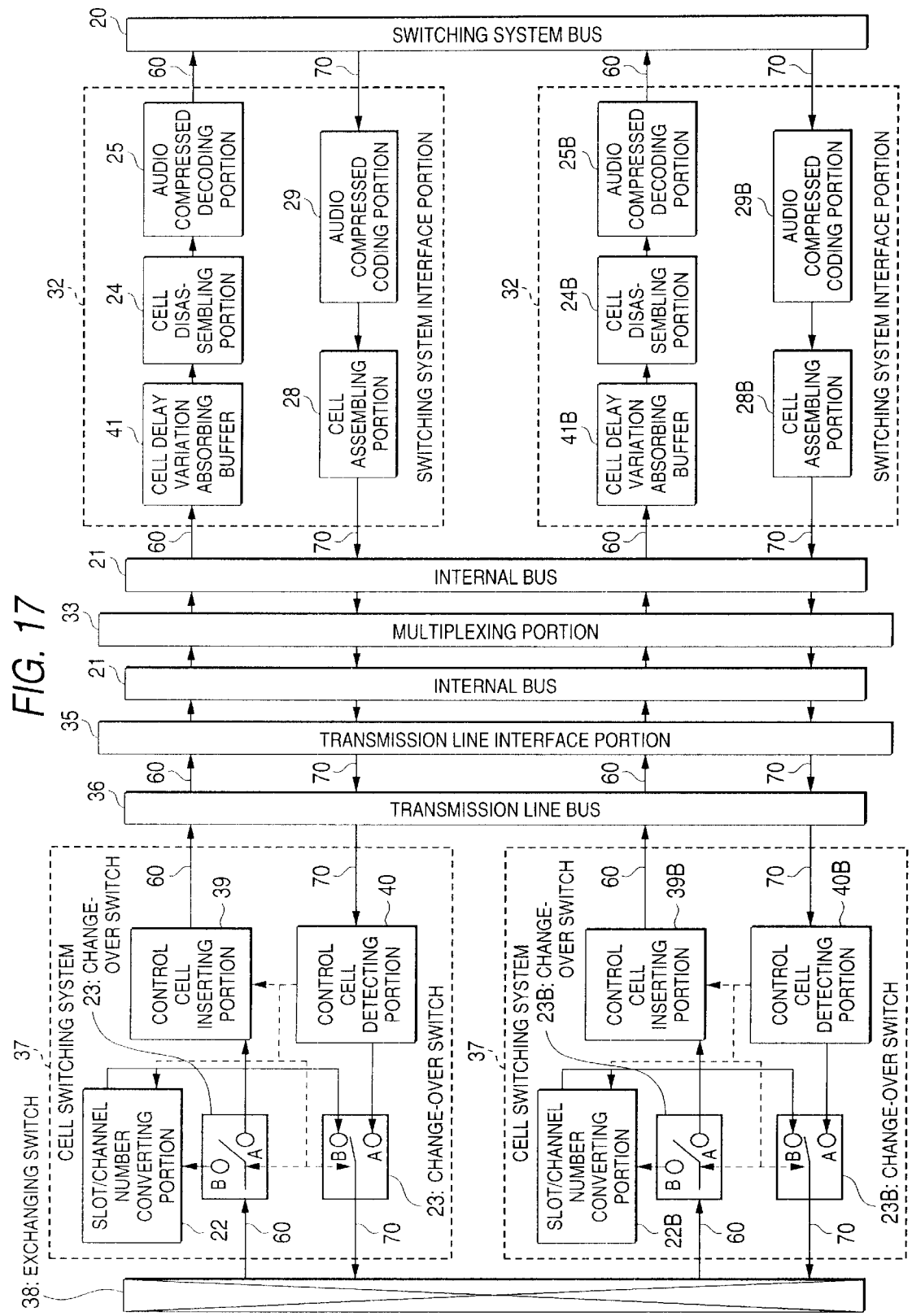
FIG. 17 is a block diagram showing a partially schematic configuration of an audio transmission system of an audio band signal transmission system according to a fifteenth embodiment.

FIG. 17 is a block diagram showing a partially schematic configuration of an audio transmission system and a cell switching system of an audio band signal transmission system according to a fifteenth embodiment. The fifteenth embodiment corresponds to an audio band signal transmission system set forth in the eleventh and twentieth aspects of the invention. In this case, in the fifteenth embodiment, the same references are affixed to constituent parts which are overlapped with those in the audio band signal transmission system according to the ninth embodiment, and their redundant explanation of the overlapped configuration and operation will be omitted hereunder.

The audio band signal transmission system shown in FIG. 17 is different from the audio band signal transmission system shown in FIG. 11 in that, in the audio band signal transmission system shown in FIG. 11, the control cell inserting portion 39 (39B), the control cell detecting portion 40 (40B), the slot/channel number converting portion 22 (22B), and the change-over switch 23 (23B) are provided in the multiplexing portion 33B of the audio transmission system to achieve the audio band signal transmission system whereas, in the audio band signal transmission system shown in FIG. 17, the control cell inserting portion 39 (39B), the control cell detecting portion 40 (40B), the slot/channel number converting portion 22 (22B), and the change-over switch 23 (23B) is provided in the cell switching system 37 in lieu of the multiplexing portion 33B to achieve the audio band signal transmission system.

In the cell switching system 37 shown in FIG. 17, the change-over switch 23 (23B), which is connected to the exchanging switch 38 for applying the cell switching process, and the control cell inserting portion 39 (39B) are arranged on the up line 60, and then the control cell inserting portion 39 (39B) is connected to the transmission line bus 36 in the audio transmission system.

Also, the change-over switch 23 (23B) and the control cell detecting portion 40 (40B) are arranged on the down line 70, and then the control cell detecting portion 40 (40B) is connected to the transmission line bus 36.

Next, operations of the cell switching system 37 and the audio transmission system 10 in the audio band signal transmission system according to the fifteenth embodiment will be explained hereunder.

In the initial state of the cell switching system 37 shown in FIG. 17, the change-over switches 23 arranged on the up line 60 and the down line 70 are switched to the contact A side.

The control cell inserting portion 39 arranged on the up line 60 stores the own connection identification number and the own slot/channel number, which are paired with the cell, into the reserve area R of the control cell, as shown in FIG. 21, separately from the cell which is transmitted from the exchanging switch 38 via the up line 60.

The cell into which the connection identification number and the own slot/channel number are inserted in this manner is transmitted in sequence to the transmission line bus 36, the transmission line interface portion 35, the internal bus 21, the multiplexing portion 33, the internal bus 21, the cell delay variation absorbing buffer 41, the cell disassembling portion 24, the audio compressed decoding portion 25, the switching system bus 20, and the switching system 1 via the up line 60. Then, the audio data which are passed through the switching system 1 are transmitted sequentially to the switching system bus 20, the audio compressed coding portion 29B, the cell assembling portion 28B, the internal bus 21, the multiplexing portion 33, the internal bus 21, the transmission line interface portion 35, the transmission line bus 36, and the control cell detecting portion 40B via the down line 70.

At this time, the control cell detecting portion 40B detects whether or not the control cell which contains the connection identification number is contained in the cell, and then transmits the cell to the exchanging switch 38 via the change-over switch 23B.

Then, when the audio transmission systems 10 (connections) are connected by the switching system 1, i.e., when the control cell detecting portion 40B detects the connection identification number which is inserted by the control cell inserting portion 39, such control cell detecting portion 40B instructs the control cell inserting portion 39B to output the control cell containing the own slot/channel number to other control cell detecting portion 40 which corresponds to this connection identification number.

When the control cell detecting portion 40 detects the own slot/channel number contained in the control cell being supplied from the control cell inserting portion 39B, it confirms that the communication path for own connection is extended over "the cell switching system 37, the audio transmission system 10, the switching system 1, the audio transmission system 10, and the cell switching system 37" in sequence, then informs the slot/channel number converting portion 22 which corresponds to own connection of the own slot/channel number, and then sets the change-over switch 23 to the contact B side.

After the change-over switch 23 has been set to the contact B side, the cell which is transmitted from the exchanging switch 38 via the up line 60 can be transmitted without the intervention of the transmission line bus 36, the transmission line interface portion 35, the internal bus 21, the multiplexing portion 33, the internal bus 21, the switching system interface portion 32, the switching system bus 20, and the switching system 1 because such cell can be passed through a routine which consists of the change-over switch 23 arranged on the up line 60, the slot/channel number converting portion 22, the change-over switch 23 arranged on the down line 70, and the exchanging switch 38. More particularly, the cell transmitting process in the transmission line interface portion 35, the cell multiplexing process in the multiplexing portion 33, and the cell delay variation absorbing process performed by the cell delay variation absorbing buffer 41, the cell disassembling/assembling processes performed by the cell disassembling portion 24 and the cell assembling portion 28, and the audio compressed decoding/coding processes performed by the audio compressed decoding portion 25 and the audio compressed coding portion 29 in the switching system interface portion 32 are not applied in transmitting the cell.

According to the fifth embodiment, when the control cell detecting portion 40 (40B) detects the own slot/channel number contained in the control cell supplied from other control cell inserting portion 39B (39), it confirms that the communication path for own connection is extended over "the cell switching system 37, the audio transmission system 10, the switching system 1, and the audio transmission system 10, the cell switching system 37" in sequence, and then corrects the routine of the audio band signal cell supplied from the up line 60 associated with own connection. Therefore, the audio band signal can be transmitted over the down line 70 without the intervention of the audio transmission system 10 and the switching system 1. As a result, since useless processes such as the cell transmitting process, the cell multiplexing process, the cell delay variation absorbing process, the cell disassembling/assembling processes, and the audio compressed decoding/coding processes in the audio transmission system 10, the process in the switching system 1, etc. can be omitted, this fifteenth embodiment can deal with the delay of the audio band signal in the audio band signal transmission system and also can prevent degradation of the audio quality without fail.

Embodiment 16

Figure 18:
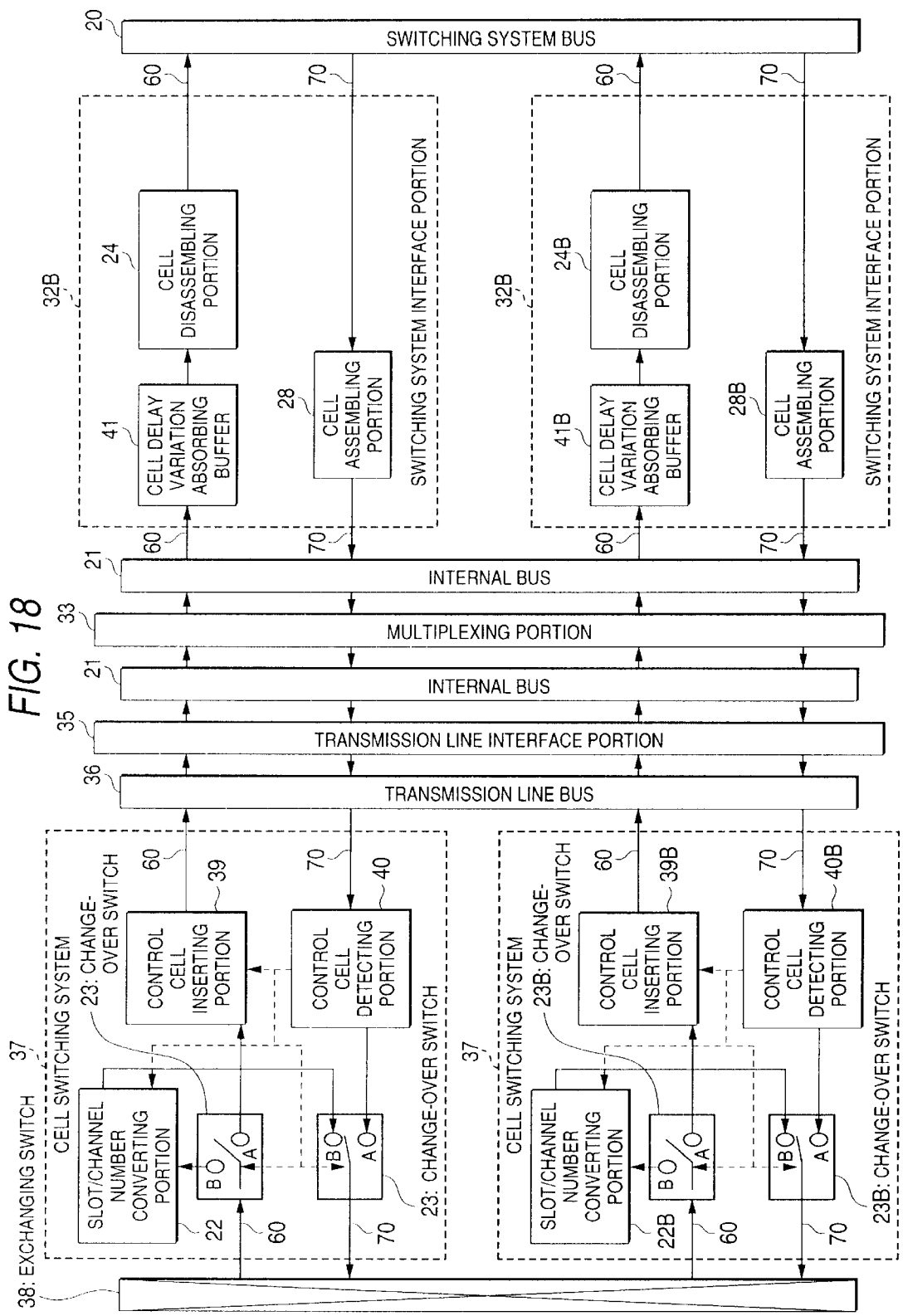
FIG. 18 is a block diagram showing a partially schematic configuration of an audio transmission system of an audio band signal transmission system according to a sixteenth embodiment.

FIG. 18 is a block diagram showing a partially schematic configuration of an audio transmission system of an audio band signal transmission system according to a sixteenth embodiment. The sixteenth embodiment corresponds to an audio band signal transmission system set forth in the eleventh and nineteenth aspects of the invention. In this case, in the sixteenth embodiment, the same references are affixed to constituent parts which are overlapped with those in the audio band signal transmission system according to the fifteenth embodiment, and their redundant explanation of the overlapped configuration and operation will be omitted hereunder.

The audio band signal transmission system shown in FIG. 18 is different from the audio band signal transmission system shown in FIG. 17 in that the switching system interface portion 32 is replaced by the switching system interface portion 32B which does not include the audio compressed decoding portion 25 and the audio compressed coding portion 29.

According to the sixteenth embodiment, when the control cell detecting portion 40 (40B) detects the own slot/channel number from other control cell inserting portion 39B (39), it confirms that the communication path for own connection is extended in sequence over "the cell switching system 37, the audio transmission system 10, the switching system 1, the audio transmission system 10, and the cell switching system 37", and then corrects the routine of the audio band signal cell, which is transmitted from the up line 60 for own connection. Therefore, the audio band signal can be transmitted over the down line 70 without the intervention of the audio transmission system 10 and the switching system 1. As a result, since useless processes such as the cell transmitting process, the cell multiplexing process, the cell delay variation absorbing process, the cell disassembling/assembling processes in the audio transmission system 10, the process in the switching system 1, etc. can be omitted, this sixteenth embodiment can deal with the delay of the audio band signal in the audio band signal transmission system and also can prevent degradation of the audio quality firmly.

Therefore, according to the audio band signal transmission system set forth in the first aspect of the present invention, when it is decided in response to notification issued from other connection identification number detecting portion that the audio band signal cell which is to be transmitted to own connection is transmitted via the communication path which is extended over "the audio transmission system, the switching system, and the audio transmission system" in sequence, the routine of the cell is corrected before the audio band signal cell which is to be transmitted to the switching system and the cell delay variation absorbing buffer via the up line for own connection is input into the connection identification number inserting portion which corresponds to this connection. Hence, the audio band signal cell can be transmitted via the down line corresponding to this own connection, without intervention of the switching system and the cell delay variation absorbing buffer. As a result, a process delay time can be suppressed to the lowest minimum without degradation of the audio quality of the audio band signal by omitting useless processes such as cell disassembling/assembling processes, etc. generated when the cell is transmitted to the switching system, cell delay variation absorbing process by the cell delay variation absorbing buffer, etc. In this case, the similar advantage can also be achieved by the audio band signal transmission method set forth in the twenty-first aspect of the present invention.

According to the audio band signal transmission system set forth in the second aspect of the present invention, the audio transmission system consists of three portions of the switching system interface portion, the transmission line interface portion, and the multiplexing portion. In this case, the similar advantage can also be achieved by the audio band signal transmission method set forth in the twenty-second aspect of the present invention.

According to the audio band signal transmission system set forth in the third aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system interface portion and the switching system. As a result, the process delay time can be suppressed to the lowest minimum without degradation of the audio quality of the audio band signal by omitting useless processes such as the cell disassembling/assembling processes, the cell delay variation absorbing process, etc. generated in the switching system interface portion, the process generated in the switching system, etc. In this case, the similar advantage can also be achieved by the audio band signal transmission method set forth in the twenty-third aspect of the present invention.

According to the audio band signal transmission system set forth in the fourth aspect of the present invention, in addition to the advantage achieved by the third aspect of the invention, the process delay time can be suppressed to the lowest minimum without degradation of the audio quality of the audio band signal by omitting useless processes such as the audio compressed coding/decoding processes in the switching system interface portion, etc. In this case, the similar advantage can also be achieved by the audio band signal transmission method set forth in the twenty-fourth aspect of the present invention.

According to the audio band signal transmission system set forth in the fifth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system and the cell delay variation absorbing buffer. As a result, the process delay time can be suppressed to the lowest minimum without degradation of the audio quality of the audio band signal, and also the switching system interface portion can be disconnected easily from the system at the time of failure or maintenance if this function is attached to the switching system interface portion in place of the multiplexing portion serving as a control system of the audio band signal transmission system. In this case, the similar advantage can also be achieved by the audio band signal transmission method set forth in the twenty-fifth aspect of the present invention.

According to the audio band signal transmission system set forth in the sixth aspect of the present invention, in addition to the advantage achieved by the fifth aspect of the invention, the process delay time can be suppressed to the lowest minimum without degradation of the audio quality of the audio band signal, and also the switching system interface portion can be disconnected easily from the system at the time of failure or maintenance if this function is attached to the switching system interface portion in place of the multiplexing portion serving as a control system of the audio band signal transmission system. In this case, the similar advantage can also be achieved by the audio band signal transmission method set forth in the twenty-sixth aspect of the present invention.

According to the audio band signal transmission system set forth in the seventh aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the multiplexing portion, the switching system interface portion and the switching system. As a result, the process delay time can be suppressed to the lowest minimum without degradation of the audio quality of the audio band signal by omitting useless processes such as the multiplexing process in the multiplexing portion, the cell disassembling/assembling processes and the cell delay variation absorbing process in the switching system interface portion, the process generated in the switching system, etc. In this case, the similar advantage can also be achieved by the audio band signal transmission method set forth in twenty-seventh aspect of the present invention.

According to the audio band signal transmission system set forth in the eighth aspect of the present invention, in addition to the advantage achieved by the seventh aspect of the invention, the delay time of the audio band signal can be suppressed to the lowest minimum among the audio transmission systems by omitting the audio compressed coding/decoding processes in the switching system interface portion, etc., and in addition degradation of the audio quality of the audio band signal can be prevented without fail. In this case, the similar advantage can also be achieved by the audio band signal transmission method set forth in the twenty-eighth aspect of the present invention.

According to the audio band signal transmission system set forth in the ninth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal can be transmitted to the down line, without the intervention of the audio transmission system and the switching system. As a result, the delay time of the audio band signal can be suppressed to the lowest minimum among the audio band signal transmission systems by omitting useless processes such as the cell transmitting process, the cell multiplexing process, the cell delay variation absorbing process, and the cell disassembling/assembling processes in the audio transmission system, the process generated in the switching system, etc., and in addition degradation of the audio quality of the audio band signal can be prevented without fail. In this case, the similar advantage can also be achieved by the audio band signal transmission method set forth in the twenty-ninth aspect of the present invention.

According to the audio band signal transmission system set forth in the tenth aspect of the present invention, in addition to the advantage achieved by the ninth aspect of the invention, the delay time of the audio band signal can be suppressed to the lowest minimum among the audio band signal transmission systems by omitting useless processes such as the audio compressed coding/decoding processes in the audio transmission system, the process generated in the switching system, etc., and also degradation of the audio quality of the audio band signal can be prevented without fail. In this case, the similar advantage can also be achieved by the audio band signal transmission method set forth in the thirtieth aspect of the present invention.

According to the audio band signal transmission system set forth in the eleventh aspect of the present invention, when it is decided in response to notification issued from other connection identification number detecting portion that the audio band signal cell which is to be transmitted to own connection is transmitted via the communication path which is extended over "the audio transmission system, the switching system, and the audio transmission system" in sequence, the routine of the cell is corrected before the audio band signal cell which is to be transmitted to the switching system and the cell delay variation absorbing buffer via the up line for own connection is input into the connection identification number inserting portion which corresponds to this connection. Hence, the audio band signal cell can be transmitted via the down line corresponding to this own connection, without intervention of the switching system and the cell delay variation absorbing buffer. As a result, a process delay time can be suppressed to the lowest minimum without degradation of the audio quality of the audio band signal by omitting useless processes such as cell disassembling/assembling processes, etc. generated when the cell is transmitted to the switching system, cell delay variation absorbing process by the cell delay variation absorbing buffer, etc. In this case, the similar advantage can also be achieved by the audio band signal transmission method set forth in the thirty-first aspect of the present invention.

According to the audio band signal transmission system set forth in the twelfth aspect of the present invention, the audio transmission system consists of three portions of the switching system interface portion, the transmission line interface portion, and the multiplexing portion. In this case, the similar advantage can also be achieved by the audio band signal transmission method set forth in the thirty-second aspect of the present invention.

According to the audio band signal transmission system set forth in the thirteenth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system interface portion and the switching system. As a result, the process delay time can be suppressed to the lowest minimum without degradation of the audio quality of the audio band signal by omitting useless processes such as the cell disassembling/assembling processes, the cell delay variation absorbing process, etc. generated in the switching system interface portion, the process generated in the switching system, etc. In this case, the similar advantage can also be achieved by the audio band signal transmission method set forth in the thirty-third aspect of the present invention.

According to the audio band signal transmission system set forth in the fourteenth aspect of the present invention, in addition to the advantage achieved by the thirteenth aspect of the invention, the process delay time can be suppressed to the lowest minimum without degradation of the audio quality of the audio band signal by omitting the audio compressed coding/decoding processes in the switching system interface portion, etc. In this case, the similar advantage can also be achieved by the audio band signal transmission method set forth in the thirty-fourth aspect of the present invention.

According to the audio band signal transmission system set forth in the fifteenth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the switching system and the cell delay variation absorbing buffer. As a result, the process delay time can be suppressed to the lowest minimum without degradation of the audio quality of the audio band signal, and also the switching system interface portion can be disconnected easily from the system at the time of failure or maintenance if this function is attached to the switching system interface portion in place of the multiplexing portion serving as a control system of the audio band signal transmission system. In this case, the similar advantage can also be achieved by the audio band signal transmission method set forth in the thirty-fifth aspect of the present invention.

According to the audio band signal transmission system set forth in the sixteenth aspect of the present invention, in addition to the advantage achieved by the fifteenth aspect of the invention, the process delay time can be suppressed to the lowest minimum without degradation of the audio quality of the audio band signal, and also the switching system interface portion can be disconnected easily from the system at the time of failure or maintenance if this function is attached to the switching system interface portion in place of the multiplexing portion serving as a control system of the audio band signal transmission system. In this case, the similar advantage can also be achieved by the audio band signal transmission method set forth in the thirty-sixth aspect of the present invention.

According to the audio band signal transmission system set forth in the seventeenth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal cell can be transmitted via the down line corresponding to this own connection, without the intervention of the multiplexing portion, the switching system interface portion and the switching system. As a result, the process delay time can be suppressed to the lowest minimum without degradation of the audio quality of the audio band signal by omitting useless processes such as the multiplexing process in the multiplexing portion, the cell disassembling/assembling processes and the cell delay variation absorbing process in the switching system interface portion, the process generated in the switching system, etc. In this case, the similar advantage can also be achieved by the audio band signal transmission method set forth in the thirty-seventh aspect of the present invention.

According to the audio band signal transmission system set forth in the eighteenth aspect of the present invention, in addition to the advantage achieved by the seventeenth aspect of the invention, the delay time of the audio band signal can be suppressed to the lowest minimum among the audio transmission systems by omitting useless processes such as the multiplexing process in the multiplexing portion, the cell disassembling/assembling processes, the cell delay variation absorbing process, and the audio compressed coding/decoding processes in the switching system interface portion, the process generated in the switching system, etc., and in addition degradation of the audio quality of the audio band signal can be prevented without fail. In this case, the similar advantage can also be achieved by the audio band signal transmission method set forth in the thirty-eighth aspect of the present invention.

According to the audio band signal transmission system set forth in the thirty-ninth aspect of the present invention, when it is confirmed in response to notification issued from other connection identification number detecting portion that the communication path for own connection is extended in sequence over "the audio transmission system, the switching system, and the audio transmission system", the routine of the cell is corrected before the audio band signal cell which is to be transmitted to the switching system via the up line for own connection is input into the identification number inserting portion which corresponds to this connection. Therefore, the audio band signal can be transmitted to the down line, without the intervention of the audio transmission system and the switching system. As a result, the delay time of the audio band signal can be suppressed to the lowest minimum among the audio band signal transmission systems by omitting useless processes such as the cell transmitting process, the cell multiplexing process, the cell delay variation absorbing process, and the cell disassembling/assembling processes in the audio transmission system, the process generated in the switching system, etc., and in addition degradation of the audio quality of the audio band signal can be prevented without fail. In this case, the similar advantage can also be achieved by the audio band signal transmission method set forth in the thirty-ninth aspect of the present invention.

According to the audio band signal transmission system set forth in the twentieth aspect of the present invention, in addition to the advantage achieved by the nineteenth aspect of the invention, the delay time of the audio band signal can be suppressed to the lowest minimum among the audio band signal transmission systems by omitting useless processes such as the audio compressed coding/decoding processes in the audio transmission system, the process generated in the switching system, etc., and also degradation of the audio quality of the audio band signal can be prevented without fail. In this case, the similar advantage can also be achieved by the audio band signal transmission method set forth in the fortieth aspect of the present invention.

What is claimed is:

1. An audio band signal transmission system having an audio transmission system which is arranged between a switching system and a cell switching system, and transmits an audio band signal comprising a plurality of audio band signal cells via an up line from the cell switching system to the switching system and a down line from the switching system to the cell switching system for each one of a plurality of connections, and has a cell delay variation absorbing buffer for delayed-reading the audio band signal which is transmitted via the up line, comprising, for each of said plurality of connections:

a connection identification number inserting portion of the audio transmission system for setting a connection identification number which identifies the connection, and for inserting said connection identification number into an audio band signal cell which is to be transmitted to the switching system via the up line for the connection;

a connection identification number detecting portion of the audio transmission system for detecting the connection identification number contained in the audio band signal cell which is to be transmitted from the switching system via the down line for the connection; and a routine correcting portion of the audio transmission system for correcting a routine before the audio band signal cell, which is transmitted to the switching system via the up line for the connection in response to a predetermined control signal, is input into the connection identification number inserting portion corresponding to the connection, to thus transmit the audio band signal cell via the down line corresponding to the connection without intervention of the switching system and the cell delay variation absorbing buffer;

wherein, when the connection identification number detecting portion of one of the plurality of connections detects another connection identification number of another one of the plurality of connections via the down line for the connection, the connection identification number detecting portion instructs the connection identification number detecting portion of the other connection to output the predetermined control signal.

2. An audio band signal transmission system according to claim 1, wherein the audio transmission system includes, a switching system interface portion of the audio transmission system for transmitting the audio band signal between the switching system and the audio transmission system, a transmission line interface portion of the audio transmission system for transmitting the audio band signal between the cell switching system and the audio transmission system, and a multiplexing portion of the audio transmission system arranged between the switching system interface portion and the transmission line interface portion, for transmitting the audio band signal between the switching system and the cell switching system, wherein the switching system interface portion has the cell delay variation absorbing buffer for delayed-reading the audio band signal which is transmitted via the up line.

3. An audio band signal transmission system according to claim 2, wherein the multiplexing portion of the audio transmission system contains a connection identification number inserting portion, a connection identification number detecting portion, and a routine correcting portion for each of the plurality of the connections, the connection identification number detecting portion outputs the predetermined control signal to the routine correcting portion which corresponds to the connection when it confirms in response to the instruction from the other connection identification number detecting portion that a communication path for the connection is extended in sequence over the audio transmission system, the switching system, and the audio transmission system, and the routine correcting portion corrects the routine of the audio band signal from the up line in response to the predetermined control signal to transmit the audio band signal to the down line without intervention of the switching system interface portion and the switching system.

4. An audio band signal transmission system according to claim 3, wherein the switching system interface portion of the audio transmission system includes, a compressed coding portion of the audio transmission system for compressed-coding the audio band signal transmitted from the switching system via the down line, and a compressed decoding portion of the audio transmission system for compressed-decoding the audio band signal which is delayed-read by the cell delay variation absorbing buffer.

5. An audio band signal transmission system according to claim 2, wherein the switching system interface portion of the audio transmission system contains a connection identification number inserting portion, a connection identification number detecting portion, and a routine correcting portion arranged at a preceding stage of the cell delay variation absorbing buffer for each of the plurality of connections, the connection identification number detecting portion outputs a predetermined control signal to the routine correcting portion which corresponds to the connection when it confirms that a communication path for the connection is extended in sequence over the audio transmission system, the switching system, and the audio transmission system, and the routine correcting portion corrects the routine of the audio band signal from the up line in response to the predetermined control signal to thus transmit the audio band signal to the down line without intervention of the cell delay variation absorbing buffer and the switching system.

6. An audio band signal transmission system according to claim 5, wherein the switching system interface portion of the audio transmission system includes,
- a compressed coding portion of the switching system interface for compressed-coding the audio band signal which is transmitted from the switching system via the down line to then transmit a compressed-coded audio band signal to the connection identification number detecting portion, and
- a compressed decoding portion of the switching system interface for compressed-decoding the audio band signal which is delayed-read by the cell delay variation absorbing buffer.

7. An audio band signal transmission system according to claim 2, wherein the transmission line interface portion of the audio transmission system contains a connection identification number inserting portion, a connection identification number detecting portion, and a routine correcting portion for each of the plurality of connections,
- the connection identification number detecting portion outputs the predetermined control signal to the routine correcting portion which corresponds to connection when the connection identification number detecting portion confirms in response to the instruction from the other connection identification number detecting portion that a communication path for connection is extended in sequence over the audio transmission system, the switching system, and the audio transmission system, and
- the routine correcting portion corrects the routine of the audio band signal from the up line in response to the predetermined control signal to thus transmit the audio band signal to the down line without intervention of the multiplexing portion, the switching system interface portion, and the switching system.

8. An audio band signal transmission system according to claim 7, wherein the switching system interface portion of the audio transmission system includes,
- a compressed coding portion for compressed-coding the audio band signal which is transmitted from the switching system via the down line, and
- a compressed decoding portion for compressed-decoding the audio band signal which is delayed-read by the cell delay variation absorbing buffer.

9. An audio band signal transmission system according to claim 1, wherein the cell switching system contains a connection identification number inserting portion, a connection identification number detecting portion, and a routine correcting portion for each of the plurality of connections,
- the connection identification number detecting portion outputs the predetermined control signal to the routine correcting portion which corresponds to connection when it confirms in response to the instruction from the other connection identification number detecting portion that a communication path for connection is extended in sequence over the cell switching system, the audio transmission system, the switching system, the audio transmission system, and the cell switching system, and
- the routine correcting portion corrects the routine of the audio band signal from the up line in response to the predetermined control signal to then transmit the audio band signal to the down line without intervention of the audio transmission system and the switching system.

10. An audio band signal transmission system according to claim 9, wherein the audio transmission system includes,
- a compressed coding portion for compressed-coding the audio band signal which is transmitted from the switching system via the down line, and
- a compressed decoding portion for compressed-decoding the audio band signal which is delayed-read by the cell delay variation absorbing buffer.

11. An audio band signal transmission system having an audio transmission system which is arranged between a switching system and a cell switching system, and transmits an audio band signal comprising a plurality of audio band signal cells via an up line from the cell switching system to the switching system and a down line from the switching system to the cell switching system for each of a plurality of connections, and has a cell delay variation absorbing buffer for delayed-reading the audio band signal which is transmitted via the up line, comprising, for each of the plurality of connections:
- a connection identification number cell transmitting portion of the audio transmission system setting a connection identification number which is to be identified, and transmitting a control cell containing the connection identification number, which is paired with the audio band signal cell, separately from the audio band signal cell which is to be transmitted to the switching system via the up line for the connection;
- a connection identification number cell detecting portion of the audio transmission system detecting a control cell which is paired with the audio band signal cell to be transmitted from the switching system via the down line for the connection, and then detecting the connection identification number contained in the control cell; and
- a routine correcting portion of the audio transmission system for correcting a routine before the audio band signal cell, which is transmitted to the switching system via the up line for connection in response to a predetermined control signal, is input into the connection identification number cell transmitting portion corresponding to this connection, to thus transmit the audio band signal cell via the down line corresponding to this connection without intervention of the switching system and the cell delay variation absorbing buffer;
- wherein, when the connection identification number cell detecting portion of the connection identification number detecting portion for one of the plurality of connections detects another connection identification number of another one of the plurality of connections via the down line for the connection, the connection identification number cell detecting portion instructs the connection identification number cell detecting portion of the other connection to output the predetermined control signal.

12. An audio band signal transmission system according to claim 11, wherein the audio transmission system includes,
- a switching system interface portion for transmitting the audio band signal between the switching system and the audio transmission system,
- a transmission line interface portion for transmitting the audio band signal between the cell switching system and the audio transmission system, and
- a multiplexing portion arranged between the switching system interface portion and the transmission line interface portion, for transmitting the audio band signal between the switching system and the cell switching system,
- wherein the switching system interface portion has the cell delay variation absorbing buffer for delayed-reading the audio band signal which is transmitted via the up line.

13. An audio band signal transmission system according to claim 12, wherein the multiplexing portion of the audio transmission system contains a connection identification number cell transmitting portion, a connection identification number cell detecting portion, and a routine correcting portion for each of the plurality of connections, the connection identification number cell detecting portion outputs the predetermined control signal to the routine correcting portion which corresponds to connection when it confirms in response to the instruction from the other connection identification number cell detecting portion that a communication path for connection is extended in sequence over the audio transmission system, the switching system, and the audio transmission system, and the routine correcting portion corrects the routine of the audio band signal from the up line in response to the predetermined control signal to transmit the audio band signal to the down line without intervention of the switching system interface portion and the switching system.

14. An audio band signal transmission system according to claim 13, wherein the switching system interface portion of the audio transmission system includes, a compressed coding portion for compressed-coding the audio band signal which is transmitted from the switching system via the down line, and a compressed decoding portion for compressed-decoding the audio band signal which is delayed-read by the cell delay variation absorbing buffer.

15. An audio band signal transmission system according to claim 12, wherein the switching system interface portion of the audio transmission system contains, for each of the plurality of connections, a connection identification number cell transmitting portion, a connection identification number cell detecting portion, and a routine correcting portion arranged at a preceding stage of the cell delay variation absorbing buffer, the connection identification number cell detecting portion outputs a predetermined control signal to the routine correcting portion which corresponds to connection when it confirms in answer to the instruction from the other connection identification number cell detecting portion that a communication path for connection is extended in sequence over the audio transmission system, the switching system, and the audio transmission system, and the routine correcting portion corrects the routine of the audio band signal from the up line in answer to the predetermined control signal to thus transmit the audio band signal to the down line without intervention of the cell delay variation absorbing buffer and the switching system.

16. An audio band signal transmission system according to claim 15, wherein the switching system interface portion of the audio transmission system includes, a compressed coding portion for compressed-coding the audio band signal which is transmitted from the switching system via the down line to then transmit a compressed-coded audio band signal to the connection identification number cell detecting portion, and a compressed decoding portion for compressed-decoding the audio band signal which is delayed-read by the cell delay variation absorbing buffer.

17. An audio band signal transmission system according to claim 12, wherein the transmission line interface portion of the audio transmission system contains a connection identification number cell transmitting portion, connection identification number cell detecting portion, and a routine correcting portion for each of the plurality of connections, the connection identification number cell detecting portion outputs the predetermined control signal to the routine correcting portion which corresponds to connection when it confirms in response to the instruction from the other connection identification number cell detecting portion that a communication path for connection is extended in sequence over the audio transmission system, the switching system, and the audio transmission system, and the routine correcting portion corrects the routine of the audio band signal from the up line in response to the predetermined control signal to thus transmit the audio band signal to the down line without intervention of the multiplexing portion, the switching system interface portion, and the switching system.

18. An audio band signal transmission system according to claim 17, wherein the switching system interface portion of the audio transmission system includes, a compressed coding portion for compressed-coding the audio band signal which is transmitted from the switching system via the down line, and a compressed decoding portion for compressed-decoding the audio band signal which is delayed-read by the cell delay variation absorbing buffer.

19. An audio band signal transmission system according to claim 11, wherein the cell switching system contains a connection identification number cell transmitting portion, a connection identification number cell detecting portion, and a routine correcting portion for each of the plurality of connections, the connection identification number cell detecting portion outputs the predetermined control signal to the routine correcting portion which corresponds to connection when it confirms in response to the instruction from the other connection identification number cell detecting portion that a communication path for connection is extended in sequence over the audio transmission system, the switching system, and the audio transmission system, and the routine correcting portion corrects the routine of the audio band signal from the up line in response to the predetermined control signal to then transmit the audio band signal to the down line without intervention of the audio transmission system and the switching system.

20. An audio band signal transmission system according to claim 19, wherein the audio transmission system includes, a compressed coding portion for compressed-coding the audio band signal which is transmitted from the switching system via the down line, and a compressed decoding portion for compressed-decoding the audio band signal which is delayed-read by the cell delay variation absorbing buffer.

21. An audio band signal transmission method of transmitting an audio band signal comprising a plurality of audio band signal cells via an up line from a cell switching system to a switching system and a down line from the switching system to the cell switching system for each of a plurality of connections by using an audio transmission system arranged between the switching system and the cell switching system, and then delayed-reading the audio band signal, which is transmitted via the up line, by using a cell delay variation absorbing buffer in the audio transmission system, comprising, for each of the plurality of connections, the steps of:

setting a connection identification number which identifies the connection, and inserting the connection identification number into an audio band signal cell, which is to be transmitted to the switching system via the up line for the connection, by using a connection identification number inserting portion of the audio transmission system;

detecting the connection identification number contained in the audio band signal cell, which is to be transmitted from the switching system via the down line for the connection, by using a connection identification number detecting portion of the audio transmission system;

correcting a routine before the audio band signal cell, which is transmitted to the switching system via the up line for the connection in response to a predetermined control signal, is input into the connection identification number inserting portion corresponding to the connection by using a routine correcting portion of the audio transmission system, to thus transmit the audio band signal cell via the down line corresponding to the connection without intervention of the switching system and the cell delay variation absorbing buffer; and instructing the connection identification number detecting portion of one of the plurality of connections, which corresponds to the connection identification number, to output the predetermined control signal by the connection identification number detecting portion of the connection identification number detecting portion for another one of the plurality of connections when the connection identification number detecting portion detects the connection identification number via the down line for the connection.

22. An audio band signal transmission method according to claim 21, wherein the audio transmission system includes, a switching system interface portion of the audio transmission system for transmitting the audio band signal between the switching system and the audio transmission system, a transmission line interface portion of the audio transmission system for transmitting the audio band signal between the cell switching system and the audio transmission system, and a multiplexing portion of the audio transmission system arranged between the switching system interface portion and the transmission line interface portion, for transmitting the audio band signal between the switching system and the cell switching system, wherein the switching system interface portion has the cell delay variation absorbing buffer for delayed-reading the audio band signal which is transmitted via the up line.

23. An audio band signal transmission method according to claim 22, wherein the multiplexing portion of the audio transmission system contains a connection identification number inserting portion, a connection identification number detecting portion, and a routine correcting portion for each of the plurality of connections, the connection identification number detecting portion outputs the predetermined control signal to the routine correcting portion which corresponds to connection when it confirms in response to instruction from the connection identification number detecting portion for another one of the plurality of connections that a communication path for the connection is extended in sequence over the audio transmission system, the switching system, and the audio transmission system, and the routine correcting portion corrects the routine of the audio band signal from the up line in response to the predetermined control signal to transmit the audio band signal to the down line without intervention of the switching system interface portion and the switching system.

24. An audio band signal transmission method according to claim 23, wherein the switching system interface portion of the audio transmission system includes, a compressed coding portion of the switching system interface portion for compressed-coding the audio band signal transmitted from the switching system via the down line, and a compressed decoding portion of the switching system interface portion for compressed-decoding the audio band signal which is delayed-read by the cell delay variation absorbing buffer.

25. An audio band signal transmission method according to claim 22, wherein the switching system interface portion of the audio transmission system contains, for each of the plurality of connections, a connection identification number inserting portion, a connection identification number detecting portion, and a routine correcting portion arranged at a preceding stage of the cell delay variation absorbing buffer, the connection identification number detecting portion outputs a predetermined control signal to the routine correcting portion which corresponds to connection when it confirms that a communication path for connection is extended in sequence over the audio transmission system, the switching system, and the audio transmission system, and the routine correcting portion corrects the routine of the audio band signal from the up line in response to the predetermined control signal to thus transmit the audio band signal to the down line without intervention of the cell delay variation absorbing buffer and the switching system.

26. An audio band signal transmission method according to claim 25, wherein the switching system interface portion of the audio transmission system includes, a compressed coding portion of the switching system interface portion for compressed-coding the audio band signal which is transmitted from the switching system via the down line to then transmit a compressed-coded audio band signal to the connection identification number detecting portion, and a compressed decoding portion of the switching system interface portion for compressed-decoding the audio band signal which is delayed-read by the cell delay variation absorbing buffer.

27. An audio band signal transmission method according to claim 22, wherein the transmission line interface portion of the audio transmission system contains, for each of the plurality of connections, a connection identification number inserting portion, a connection identification number detecting portion, and a routine correcting portion, the connection identification number detecting portion outputs the predetermined control signal to the routine correcting portion which corresponds to connection when it confirms in response to instruction from the other connection identification number detecting portion that a communication path for connection is extended in sequence over the audio transmission system, the switching system, and the audio transmission system, and the routine correcting portion corrects the routine of the audio band signal from the up line in response to the predetermined control signal to thus transmit the audio band signal to the down line without intervention of the multiplexing portion, the switching system interface portion, and the switching system.

28. An audio band signal transmission method according to claim 27, the switching system interface portion of the audio transmission system includes, a compressed coding portion of the switching system interface portion for compressed-coding the audio band signal which is transmitted from the switching system via the down line, and a compressed decoding portion of the switching system interface portion for compressed-decoding the audio band signal which is delayed-read by the cell delay variation absorbing buffer.

29. An audio band signal transmission method according to claim 21, wherein the cell switching system contains, for each of the plurality of connections, a connection identification number inserting portion, a connection identification number detecting portion, and a routine correcting portion, the connection identification number detecting portion outputs the predetermined control signal to the routine correcting portion which corresponds to connection when it confirms in response to the instruction from the other connection identification number detecting portion: that a communication path for connection is extended in sequence over the cell switching system, the audio transmission system, the switching system, the audio transmission system, and the cell switching system, and the routine correcting portion corrects the routine of the audio band signal from the up line in response to the predetermined control signal to then transmit the audio band signal to the down line without intervention of the audio transmission system and the switching system.

30. An audio band signal transmission method according to claim 29, wherein the audio transmission system includes, a compressed coding portion of the audio transmission system for compressed-coding the audio band signal which is transmitted from the switching system via the down line, and a compressed decoding portion of the audio transmission system for compressed-decoding the audio band signal which is delayed-read by the cell delay variation absorbing buffer.

31. An audio band signal transmission method of transmitting an audio band signal comprising a plurality of audio band signal cells via an up line from a cell switching system to a switching system and a down line from the switching system to the cell switching system for each of a plurality of connections by using an audio transmission system which is arranged between the switching system and the cell switching system, and then delayed-reading the audio band signal, which is transmitted via the up line, by using a cell delay variation absorbing buffer in the audio transmission system, comprising, for each of the plurality of connections, the steps of:

setting a connection identification number which identifies the connection, and then transmitting a control cell containing the connection identification number, which is paired with the audio band signal cell, separately from the audio band signal cell, which is to be transmitted to the switching system via the up line for the connection, by using a connection identification number cell transmitting portion of the audio transmission system;

detecting a control cell which is paired with the audio band signal cell to be transmitted from the switching system via the down line for the connection, and then detecting the connection identification number contained in the control cell, by using a connection identification number cell detecting portion of the audio transmission system;

correcting a routine before the audio band signal cell, which is transmitted to the switching system via the up line for the connection in response to a predetermined control signal, is input into the connection identification number cell transmitting portion corresponding to this connection by using a routine correcting portion of the audio transmission system, to thus transmit the audio band signal cell via the down line corresponding to this the connection without intervention of the switching system and the cell delay variation absorbing buffer; and instructing the connection identification number cell detecting portion of one of the plurality of connections, which corresponds to the connection identification number, to output the predetermined control signal by the connection identification number cell detecting portion of the connection identification number detecting portion of another one of the plurality of connections when the connection identification number cell detecting portion detects the connection identification number via the down line for the connection.

32. An audio band signal transmission method according to claim 31, wherein the audio transmission system includes, a switching system interface portion for transmitting the audio band signal between the switching system and the audio transmission system, a transmission line interface portion of the audio transmission system for transmitting the audio band signal between the cell switching system and the audio transmission system, and a multiplexing portion of the audio transmission system arranged between the switching system interface portion and the transmission line interface portion, for transmitting the audio band signal between the switching system and the cell switching system, wherein the switching system interface portion has the cell delay variation absorbing buffer for delayed-reading the audio band signal which is transmitted via the up line.

33. An audio band signal transmission method according to claim 32, wherein the multiplexing portion of the audio transmission system contains, for each of the plurality of connections, a connection identification number cell transmitting portion, a connection identification number cell detecting portion, and a routine correcting portion, the connection identification number cell detecting portion outputs the predetermined control signal to the routine correcting portion which corresponds to connection when it confirms in response to instruction from the other connection identification number cell detecting portion that a communication path for connection is extended in sequence over the audio transmission system, the switching system, and the audio transmission system, and the routine correcting portion corrects the routine of the audio band signal from the up line in response to the predetermined control signal to transmit the audio band signal to the down line without intervention of the switching system interface portion and the switching system.

34. An audio band signal transmission method according to claim 33, wherein the switching system interface portion of the audio transmission system includes, a compressed coding portion of the audio transmission system for compressed-coding the audio band signal which is transmitted from the switching system via the down line, and a compressed decoding portion of the audio transmission system for compressed-decoding the audio band signal which is delayed-read by the cell delay variation absorbing buffer.

35. An audio band signal transmission method according to claim 32, wherein the switching system interface portion of the audio transmission system contains, for each of the plurality of connections, a connection identification number cell transmitting portion, a connection identification number cell detecting portion, and a routine correcting portion, all are arranged at a preceding stage of the cell delay variation absorbing buffer, the connection identification number cell detecting portion outputs a predetermined control signal to the routine correcting portion which corresponds to connection when it confirms in answer to the instruction from the other connection identification number cell detecting portion that a communication path for connection is extended in sequence over the audio transmission system, the switching system, and the audio transmission system, and the routine correcting portion corrects the routine of the audio band signal from the up line in answer to the predetermined control signal to thus transmit the audio band signal to the down line without intervention of the cell delay variation absorbing buffer and the switching system.

36. An audio band signal transmission method according to claim 35, wherein the switching system interface portion of the audio transmission system includes, a compressed coding portion of the switching system portion for compressed-coding the audio band signal which is transmitted from the switching system via the down line to then transmit a compressed-coded audio band signal to the connection identification number cell detecting portion, and a compressed decoding portion of the switching system portion for compressed-decoding the audio band signal which is delayed-read by the cell delay variation absorbing buffer.

37. An audio band signal transmission method according to claim 32, wherein the transmission line interface portion of the audio transmission system contains a connection identification number cell transmitting portion, a connection identification number cell detecting portion, and a routine correcting portion for each of the plurality of connections, the connection identification number cell detecting portion outputs the predetermined control signal to the routine correcting portion which corresponds to connection when it confirms in response to the instruction from the other connection identification number cell detecting portion that a communication path for connection is extended in sequence over the audio transmission system, the switching system, and the audio transmission system, and the routine correcting portion corrects the routine of the audio band signal from the up line in response to the predetermined control signal to thus transmit the audio band signal to the down line without intervention of the multiplexing portion, the switching system interface portion, and the switching system.

38. An audio band signal transmission method according to claim 37, wherein the switching system interface portion of the audio transmission system includes, a compressed coding portion of the switching system portion for compressed-coding the audio band signal which is transmitted from the switching system via the down line, and a compressed decoding portion of the switching system portion for compressed-decoding the audio band signal which is delayed-read by the cell delay variation absorbing buffer.

39. An audio band signal transmission method according to claim 31, wherein the cell switching system contains a connection identification number cell transmitting portion, a connection identification number cell detecting portion, and a routine correcting portion for each of the plurality of connections, the connection identification number cell detecting portion outputs the predetermined control signal to the routine correcting portion which corresponds to connection when it confirms in response to the instruction from the other connection identification number cell detecting portion that a communication path for connection is, extended in sequence over the cell switching system, the audio transmission system, the switching system, the audio transmission system, and the cell switching system, and the routine correcting portion corrects the routine of the audio band signal from the up line in response to the predetermined control signal to then transmit the audio band signal to the down line without intervention of the audio transmission system and the switching system.

40. An audio band signal transmission method according to claim 39, wherein the audio transmission system includes, a compressed coding portion of the audio transmission system for compressed-coding the audio band signal which is transmitted from the switching system via the down line, and a compressed decoding portion of the audio transmission system for compressed-decoding the audio band signal which is delayed-read by the cell delay variation absorbing buffer.

* * * * *

UNITED STATES PATENT AND TRADEMARK OFFICE
CERTIFICATE OF CORRECTION

PATENT NO.    : 6,751,215 B1
DATED         : June 15, 2004
INVENTOR(S)   : Takeshi Kawanobe et al.

It is certified that error appears in the above-identified patent and that said Letters Patent is hereby corrected as shown below:

<u>Title page,</u>
Item [57], ABSTRACT,
Line 11, after "over" please delete "37".

<u>Column 53,</u>
Line 5, after "line for" please insert therefor -- avert --.
Line 30, after "identification number" plesae delete "detecting portion detects the connection identification number".

Signed and Sealed this

Seventh Day of September, 2004

JON W. DUDAS
*Director of the United States Patent and Trademark Office*